United States Patent
Hauke et al.

(10) Patent No.: US 10,052,566 B2
(45) Date of Patent: Aug. 21, 2018

(54) PURIFICATION DEVICE FOR A LIQUID-CRYSTAL MIXTURE

(71) Applicant: MERCK PATENT GMBH, Darmstadt (DE)

(72) Inventors: Guenter Hauke, Muehltal (DE); Sebastien Marie, Weiterstadt (DE); Leticia Garcia Diez, Darmstadt (DE); Michael Ukelis, Riedstadt (DE); Andreas Beirau, Darmstadt (DE); Michael Haeberl, Dieburg (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/759,029

(22) PCT Filed: Dec. 2, 2014

(86) PCT No.: PCT/EP2014/003207
§ 371 (c)(1),
(2) Date: Jul. 2, 2015

(87) PCT Pub. No.: WO2015/086125
PCT Pub. Date: Jun. 18, 2015

(65) Prior Publication Data
US 2016/0317948 A1    Nov. 3, 2016

(30) Foreign Application Priority Data

Dec. 10, 2013   (DE) .................. 10 2013 020 400

(51) Int. Cl.
*B01D 15/22*   (2006.01)
*B01D 15/14*   (2006.01)
(Continued)

(52) U.S. Cl.
CPC ............. *B01D 15/22* (2013.01); *B01D 15/08* (2013.01); *B01D 15/14* (2013.01); *B01D 15/206* (2013.01);
(Continued)

(58) Field of Classification Search
CPC ...... B01D 15/125; B01D 24/12; B01D 15/08; B01D 15/14; B01D 15/22; B01D 15/206;
(Continued)

(56) References Cited

U.S. PATENT DOCUMENTS

| | | | |
|---|---|---|---|
| 4,582,608 A | 4/1986 | Ritacco et al. | |
| 5,043,062 A * | 8/1991 | Bale ................... | B01D 15/3804 210/198.2 |

(Continued)

FOREIGN PATENT DOCUMENTS

| | | |
|---|---|---|
| CN | 2090988 U | 12/1991 |
| CN | 101119797 A | 2/2008 |

(Continued)

OTHER PUBLICATIONS

Machine Translation of CN202052437U (Fan et al) Nov. 2011, retrieved on Nov. 8, 2016. Retrieved from the internet <URL:https://worldwide.espacenet.com/>. 4 pages.*

(Continued)

*Primary Examiner* — Matthew O Savage
(74) *Attorney, Agent, or Firm* — Millen, White, Zelano, Branigan, P.C.

(57) ABSTRACT

A purification device (1), for the purification of a liquid-crystal mixture, has a flow chamber (2) which has an inlet opening (3) and an outlet opening (4), arranged opposite the inlet opening, in order to be able to introduce the liquid-crystal mixture into the flow chamber (2) and discharge it from the latter, and at least one flow distribution element (5) which is arranged in the flow chamber (2) in the region of (Continued)

the inlet opening (3), and at least one filter element (6) which is arranged in the region of the outlet opening (4), where a length of the flow chamber (2) measured in the flow direction is at least a factor of 2 greater than a greatest internal dimension of the flow chamber (2) transverse to the flow direction.

14 Claims, 5 Drawing Sheets

(51) Int. Cl.
| | |
|---|---|
| B01D 15/08 | (2006.01) |
| B01D 15/20 | (2006.01) |
| C09K 19/34 | (2006.01) |
| C09K 19/54 | (2006.01) |
| C09K 19/04 | (2006.01) |
| C09K 19/30 | (2006.01) |

(52) U.S. Cl.
CPC ...... *C09K 19/3003* (2013.01); *C09K 19/3066* (2013.01); *C09K 19/3402* (2013.01); *C09K 19/542* (2013.01); *B01D 2201/302* (2013.01); *B01D 2201/304* (2013.01); *B01D 2201/347* (2013.01); *C09K 2019/0448* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3422* (2013.01); *C09K 2019/548* (2013.01); *C09K 2219/00* (2013.01)

(58) Field of Classification Search
CPC ........ B01D 2201/302; B01D 2201/304; B01D 2201/306; B01D 2201/347; B01J 2208/00884; C09K 19/3066; C09K 19/542; C09K 19/3402; C09K 19/3003; C09K 2019/3004; C09K 2019/3009; C09K 2019/3027; C09K 2219/00; C09K 2019/3016; C09K 2019/301; C09K 2019/0466; C09K 2019/548; C09K 2019/3422; C09K 2019/0448

USPC ...................................................... 210/198.2
See application file for complete search history.

(56) References Cited

U.S. PATENT DOCUMENTS

| | | | | |
|---|---|---|---|---|
| 5,540,857 | A * | 7/1996 | Hirai ................ | C09K 19/52 252/299.01 |
| 5,985,140 | A * | 11/1999 | Dewaele ............. | B01D 15/08 210/198.2 |
| 6,056,892 | A | 5/2000 | Yoshioka et al. | |
| 6,458,273 | B1 * | 10/2002 | Krakover ............ | B01D 15/08 210/198.2 |
| 6,514,578 | B1 * | 2/2003 | Farrand .............. | C07C 69/92 252/299.61 |
| 2003/0172724 | A1 | 9/2003 | Petro et al. | |
| 2003/0205515 | A1 * | 11/2003 | Purdom .............. | G01N 30/6026 210/198.2 |
| 2008/0017579 | A1 | 1/2008 | Hermansson et al. | |
| 2008/0090995 | A1 | 4/2008 | Andersson et al. | |
| 2010/0278695 | A1 * | 11/2010 | Piper .................. | B01D 15/161 422/70 |
| 2011/0049030 | A1 * | 3/2011 | Nickerson .......... | G01N 30/6026 210/198.2 |

FOREIGN PATENT DOCUMENTS

| | | |
|---|---|---|
| CN | 101173172 A | 5/2008 |
| CN | 101381604 A | 3/2009 |
| CN | 202052347 U | 11/2011 |
| DE | 3939854 A1 | 6/1990 |
| EP | 0863127 A2 | 9/1998 |
| EP | 2081659 B1 | 1/2012 |
| WO | 9419687 A1 | 9/1994 |
| WO | 2006085806 A1 | 8/2006 |

OTHER PUBLICATIONS

International Search Report dated Mar. 2, 2015 issued in corresponding PCT/EP2014/003207 application (pp. 1-6).
Chinese Office Action dated Apr. 10, 2017 issued in corresponding CN 201480067042.5 application (10 pages).
English Abstract of CN 2090988 U published Dec. 18, 1991.
English Abstract of CN 101381604 A published Mar. 11, 2009.
English Abstract of CN 202052347 U published Nov. 30, 2011.

* cited by examiner

Purification agent (13) is arranged in the flow chamber, and can be a sorbent or a surface-active sorbent, or an aluminium oxide, modified silica gel, magnesium silicate, silica gel and/or zeolite.

PURIFICATION DEVICE FOR A LIQUID-CRYSTAL MIXTURE

The invention describes a purification device, in particular for the purification of a liquid-crystal mixture, and the use thereof.

Owing to the increasing spread of liquid-crystal displays, the demand for liquid-crystal mixtures is increasing. Liquid-crystal mixtures are generally prepared in mixing devices in which various starting materials, i.e. two or more mesogenic compounds, optionally one or more stabilisers, a dopant, etc., are mixed with one another and homogenised. The purification of liquid-crystal mixtures is generally carried out by means of a stirring operation, where a sorbent, with the aid of which the purification operation is carried out, is added to the starting mixture to be purified. The amount of sorbent is dependent, inter alia, on the amount of liquid-crystal mixture and the mixture type. The sorbent is introduced into the mixing device and mixed with the liquid-crystal mixture to be purified by means of a stirrer and, if necessary, during additional exposure to heat. The suspension prepared in this way is subsequently filtered using a filter unit, for example a plate filter, so that the sorbent with the components adhering thereto or adsorbed therein is separated off from the liquid-crystal mixture. The purification is thus carried out by means of at least two steps: sorption and subsequent filtering. However, it has been found that this type of purification is not very efficient and residues of solvents or polar compounds which were intended to be removed by the sorption remain in the liquid-crystal mixture. These residues often result in losses of function in the liquid-crystal displays.

The object of the invention is to provide a purification device for the purification of liquid-crystal mixtures which achieves efficient purification of the liquid-crystal mixture in a manner with a simple design. It should be possible to carry out the purification of the liquid-crystal mixture as rapidly and effectively as possible. In addition, the purification operation should if possible be capable of integration with low design complexity into mixing or filling operations which are necessary for the preparation of the liquid-crystal mixtures.

This object is achieved by the provision of a purification device for the purification of a liquid-crystal mixture having a flow chamber which has an inlet opening and an outlet opening, arranged opposite the inlet opening, in order to be able to introduce the liquid-crystal mixture into the flow chamber and discharge it from the latter, having at least one flow distribution element which is arranged in the flow chamber in the region of the inlet opening, and having at least one filter element which is arranged in the region of the outlet opening, where a length of the flow chamber measured in the flow direction is at least a factor of 1 greater than a greatest internal dimension of the flow chamber transverse to the flow direction. The length is advantageously at least a factor of 2 and particularly advantageously at least a factor of 3 to 34 greater than the greatest internal dimension.

The purification device according to the invention is used for the purification of liquid-crystal mixtures. The liquid-crystal mixture is introduced into the flow chamber through the inlet opening and distributed as uniformly as possible over the entire cross-sectional area transverse to the flow direction with the aid of the flow distribution element arranged in the region of the inlet opening. The flow distribution element preferably has a porous design, where uniform distribution of the inflowing liquid-crystal mixture during flow through the flow chamber is ensured by means of the pores. The flow distribution element may also be designed as a fabric.

A purification agent, or a sorbent, is advantageously arranged in the flow chamber and the liquid-crystal mixture flows through or around it. Due to the interaction of the liquid-crystal mixture with the purification agent, or the sorbent, very effective purification or separation of the components of the liquid-crystal mixture to be removed can take place during the flow through the flow chamber. The filter element, which covers the outlet opening and through which the liquid-crystal mixture has to flow on exiting from the flow chamber, retains the purification agent, or the sorbent, and components adhering thereto or adsorbed therein, as well as larger particles, so that only the purified liquid-crystal mixture is able to leave the flow chamber.

Due to this arrangement, optimum liquid distribution over essentially the entire width of the flow chamber is achieved. The consequent uniform introduction of the liquid-crystal mixture into the flow chamber in turn has a positive effect on the flow rate of the liquid-crystal mixture and on the sorption efficiency of the purification device. Experiments have shown that the purification time of the liquid-crystal mixture in the purification device according to the invention is virtually halved compared with mixing devices known from the prior art. In addition, extended residence of the liquid-crystal mixture in a mixing container is not necessary. Instead, it can be achieved that a liquid-crystal mixture can be purified with adequate quality, for example immediately before filling of a storage or transport container, solely by the flow through the flow chamber.

A sorbent is preferably arranged in the flow chamber. For the purposes of the invention, the sorbent can also be referred to as sorption agent. Sorption is a collective term for various concentration operations and encompasses adsorption and absorption. In adsorption, a substance accumulates on an interface between two phases, whereas in absorption, concentration of a substance takes place within a phase. Both operations can proceed within the purification device according to the invention. It is advantageous if the sorbent fills an interior space in the flow chamber to the extent of at least 50%. However, the amount of sorbent can be prespecified depending on the amount of liquid-crystal mixture to be purified and any product requirements (for example purity).

All sorbents known to the person skilled in the art are suitable for the purification. The sorbent is particularly preferably aluminium oxide, silica gel, modified silica gel, such as, for example, RP2, RP4, RP8 and RP18, magnesium silicate or zeolites having various modules. It is also possible to use mixtures of various sorbents. The sorbent here may also have two different pore and/or particle sizes. Preferably, only one sorbent or a mixture of two sorbents is employed. The mixture of two sorbents can be mixed here in any mixing ratio with one another. It is frequently advisable to carry out the purification firstly with a silica gel or aluminium oxide, followed by purification using zeolites. The particle size of the sorption agents and the pore widths can vary depending on the liquid-crystal mixture to be purified, where a broad range of particle sizes can be used in the column according to the invention. Suitable particle sizes are, for example, 60-500 µm, but also 30-63 µm. Preferred sorbents have pore sizes of 4-30 nm, in particular 4-15 nm. The specific surface areas of the sorbents are generally 30 to 1000 $m^2/g$.

Very particularly preferred sorbents are mentioned below: aluminium oxides and zeolites, for example from Merck KGaA,
molecular sieve, silica gel, for example from Grace, Lichroprep, Geduran, for example from VWR.

The preferred sorption agents may also be modified in their surface nature or provided, for example, with specific chemical or biological scavenger molecules.

It has been found that the effectiveness of purification of a liquid-crystal mixture is considerably improved by a suitable ratio of the length to the internal dimension, since a higher resistance value can be achieved, the water content can be reduced and the content of solvents and/or polar compounds can be minimised. Solvents are frequently used during the preparation of the liquid-crystal mixtures in order to improve the homogenisation of various substances introduced. However, these solvents have to be removed again from the liquid-crystal mixture, which has hitherto not been operated efficiently. In addition, the time expenditure necessary for the purification methods known from the prior art is considerable and can be significantly reduced through the use of the purification device according to the invention.

It is likewise found that the water content of the mixture can be considerably reduced further on use of sorbents, which likewise results in a significant improvement in the final product.

In the purification device according to the invention, the flow chamber preferably has a columnar design, at least in a section, and the internal dimension of the flow chamber corresponds to the diameter in this section. With a columnar shape of the flow chamber, efficient space utilisation in combination with a simple design and easy cleaning possibilities can be ensured, in particular in the case of an advantageous flow distribution of the inflowing liquid-crystal mixture.

A columnar design of the purification device simplifies the arrangement of the purification device on a further container which is required or used for the preparation or filling of the liquid-crystal mixture. Thus, the purification device can be connected directly to the mixing device or to a storage container, and the liquid-crystal mixture can be purified before introduction into the mixing device or into the storage container. In this way, rapid and in particular efficient removal of the interfering substances or components from the liquid-crystal mixture is possible. Thus, the purity and yield of the purified liquid-crystal mixture is significantly higher than in the case of mixtures which are purified in a comparatively complex manner in intermediate purification steps using methods known from the prior art.

The diameter:length ratios according to the invention of the purification device have been established through numerous experiments and exhibit a balance between flow speed or rate and effectiveness of the sorption process. This means that sorption and consequent deposition of essentially all interfering substances and components (polar compounds, solvents, etc.) can be achieved at the highest possible flow rate with little additional effort. This enables the process times for the purification to be reduced, which in turn enables low production costs.

The purification of a liquid-crystal mixture using the device according to the invention compared with mixing devices known from practice exhibits better results in relation to the resistance value, a reduced water and/or solvent content, a reduction of polar compounds and a reduction of the particle content. Furthermore, it is apparent compared with the prior art that the process times can be significantly reduced, and the purification complexity for the mixing container and the plate filter is reduced and thus simplified.

It is preferably provided that at least one flow distribution element and at least one filter element are in each case arranged in the flow chamber in the region of the inlet opening and in the region of the outlet opening. Flow can take place through the flow chamber from both sides without modifications or the inlet opening can optionally also be used as outlet opening and the outlet opening as inlet opening. The range of applications of the purification device is thus increased and installation within a process plant is simplified.

Further advantages of the purification device according to the invention are that it has a low weight and is transportable. In addition, the purification device can be connected simply and rapidly to a container, such as, for example, to a mixing device or to a storage container, which is provided for the accommodation of the purified liquid-crystal mixture.

For this purpose, the purification device advantageously has connection means (8), which are designed, in particular, as quick-fit connectors (for example as clamp connection) and enable rapid and simple connection to a container, such as, for example, a downstream mixing device or a storage container.

In a preferred embodiment of the invention, the purification device is made from metal, from plastic or from a metal/plastic composite material. The flow chamber or column and its constituents are preferably made from stainless steel. Stainless steel is resistant to water, steam, atmospheric humidity and weak inorganic and organic acids and thus guarantees a long life and long maintenance intervals of the column. The material used for the production of the column can essentially be all metallic or non-metallic materials which provide the column with adequate strength, hardness and resistance to the chemical substances handled in the interior and physical conditions such as superatmospheric pressure or reduced pressure and temperature. Preference is furthermore given, for example, to alloyed or unalloyed steels, zirconium, titanium, glass, enamel or plastics. Also possible are iron or steel designs coated with plastics or enamel.

It is furthermore preferred for an adhesion-reducing internal coating to be applied to the inside surfaces (7) of the flow chamber. In a preferred embodiment, the inside surfaces, i.e. the surfaces facing the product within the flow chamber, have an adhesion-reducing internal coating. In particular, plastics, preferably polymers, particularly preferably polytetrafluoroethylene, can be used as coating. This supports continuous through-flow of the liquid-crystal mixture. In addition, series of experiments have shown that, on use of a suitable coating material, the product quality of the purified liquid-crystal mixture cannot be impaired either by the inside surfaces of the flow chamber or by the coating itself.

These advantages can also be supported by the inside surfaces of the flow chamber advantageously having an average roughness of less than Ra 1 µm, preferably Ra<0.8 µm, where the average roughness is taken to mean the average separation of any desired measurement point on the surface of the flow chamber from the centre line of the surface, and the centre line intersects an actual profile of the surface in such a way that the sum of the profile deviations relative to the centre line is minimal. The measurement of the characteristic quantities of the roughness profile is carried out in this patent application in accordance with EN ISO 4288 (status April 1998). The flow chamber preferably has smooth-walled inside surfaces which have a roughness of significantly less than 0.3 µm. This enables avoidance of sticking of the sorption material, but also of the liquid-crystal mixture to the inside surfaces, enabling the flow of the liquid through the chamber, or the sorption material, to be increased. Smooth-walled inside surfaces can be achieved, in particular, by grinding, passivation and pickling, as well as electropolishing of stainless steels.

In order to achieve an optimum reaction temperature for the purification, it may furthermore be advantageous for heating and/or cooling elements to be mounted on the purification device. The purification device and in particular the flow chamber can be fitted with conventional temperature-control devices, for example a thermostattable jacket, in particular an outer double jacket, with pipes lying outside the flow chamber or with welded-on half-pipe profiles. Electric heating muffs can also be used for the introduction of heat. The heating or cooling media may be liquid or gaseous. Also possible is any design of electrical heating on an outside wall of the flow chamber or purification device. The process steps can be accelerated, in particular, by using a thermostatting jacket. It has been found, surprisingly, that the input of heat increases the affinity of the substances to be purified or the sorptive to the sorption material and enables the purity of the liquid-crystal mixture to be considerably improved after a single purification step.

The at least one flow distribution element is advantageously detachably attached to the flow chamber by means of connection means. The connection means can be, in particular, a clamp connection or a flange connection.

In a preferred embodiment of the invention, the purification device has at least one seal which seals the at least one flow distribution element off from the flow chamber. In an advantageous manner, the seal is arranged between the connector and the flow distribution element, where the seal is pressed onto the flow distribution element by the connector. The seal ensures that, in spite of the flow resistance caused by the flow distribution element, no liquid-crystal mixture is able to escape from the flow chamber and no foreign bodies and impurities are able to ingress.

The seals preferably arranged both in the region of the inlet opening and also in the region of the outlet opening can advantageously be made from plastic. In particular, materials such as polytetrafluoroethylene, which are designed, for example, as an O-ring, C-ring or cone shape, have proven suitable here. Plate seals or jacketed O-ring seals can also be used as seal. Furthermore, extruded seals having radially projecting seal lips or seals made from a perfluorinated elastomer material may be advantageous. Mention should furthermore be made of the so-called "piston principle", where the volume of the column can be adapted correspondingly to the batch volume with the aid of a movable piston.

The flow distribution element is advantageously connected to a connector in the form of a hollow cylinder, via which the liquid-crystal mixture is introduced into the flow distribution element. The connector is preferably arranged centrally on the flow distribution element and, in the case of a columnar design of the flow chamber, coaxially to the columnar section of the flow chamber. It may also be advantageous for the flow distribution element and the connector to be made from one part. The flow distribution element and the connector are preferably made from metal, in particular stainless steel, or plastic.

It is preferred for the connector to be connected directly to a container used immediately beforehand or afterwards in the process chain of the production process by means of a quick-fit connector, in particular by means of a clamp connection. A connector of this type can advantageously be employed universally and can be connected to containers of different design, so that it can be connected when needed, for example, to mixing devices or storage containers of different design.

The liquid-crystal mixture can be introduced directly into the flow chamber via the connector, so that a high process speed, i.e. a short production time, is achieved, since no separate purification and filter step is necessary. In addition, the risk of contamination of the liquid-crystal mixture is minimised. In order furthermore to prevent ingress of foreign particles or clumping of undissolved particles in the purification device, an additional filter element may be installed upstream of the connector. Furthermore, foreign bodies or clumps can be filtered by an additional filter unit in the region of the inlet opening of the flow chamber.

Preferred filter elements are made from plastic or metal, where designs made from sintered metal, plastic fabric and metal fabric are advantageous. The preferred filter elements in the region of the inlet opening have the effect firstly that no foreign bodies or undissolved particles are able to enter the chamber and that secondly uniform distribution of the liquid-crystal mixture over the cross section of the flow chamber takes place. Furthermore, the use of a filter element in the region of the outlet opening of the flow chamber ensures that no sorbent remains in the purified liquid-crystal mixture and thus results in later losses of function of the liquid-crystal displays. Advantageously, a plurality of filter elements of different design with different pore sizes can be used and arranged in the purification device.

The purification device can advantageously be covered by a covering means, in particular a lid which can be connected in a detachable manner, where the lid is connected to the flow chamber by means of a clamp connection or flange connection. This protects the flow chamber against the external action of force and against the ingress of contamination. In order furthermore to facilitate the most compact shape possible of the purification device, the flow distribution element may be integrated into the covering means. The covering means additionally has an opening, preferably arranged in the centre, for the connector. The covering means can be made, for example, from metal or from plastic.

The covering means preferably has a connection means, in particular a quick-fit connector, by means of which it can be connected to the flow chamber or to the purification device. The purification device can also be connected to a container via the quick-fit connector. A quick-fit connector which is preferably used is, for example, a standardised clamp connection. Clamp connections have, in particular, the advantage that they can be changed and cleaned rapidly and reliably. Particular preference is given to clamp connections in accordance with the DIN standards 32676 and 11864-1-3.

An advantageous embodiment of the inventive idea is explained in greater detail with reference to an illustrative embodiment depicted in the drawing (FIG. 1).

Figure 1:
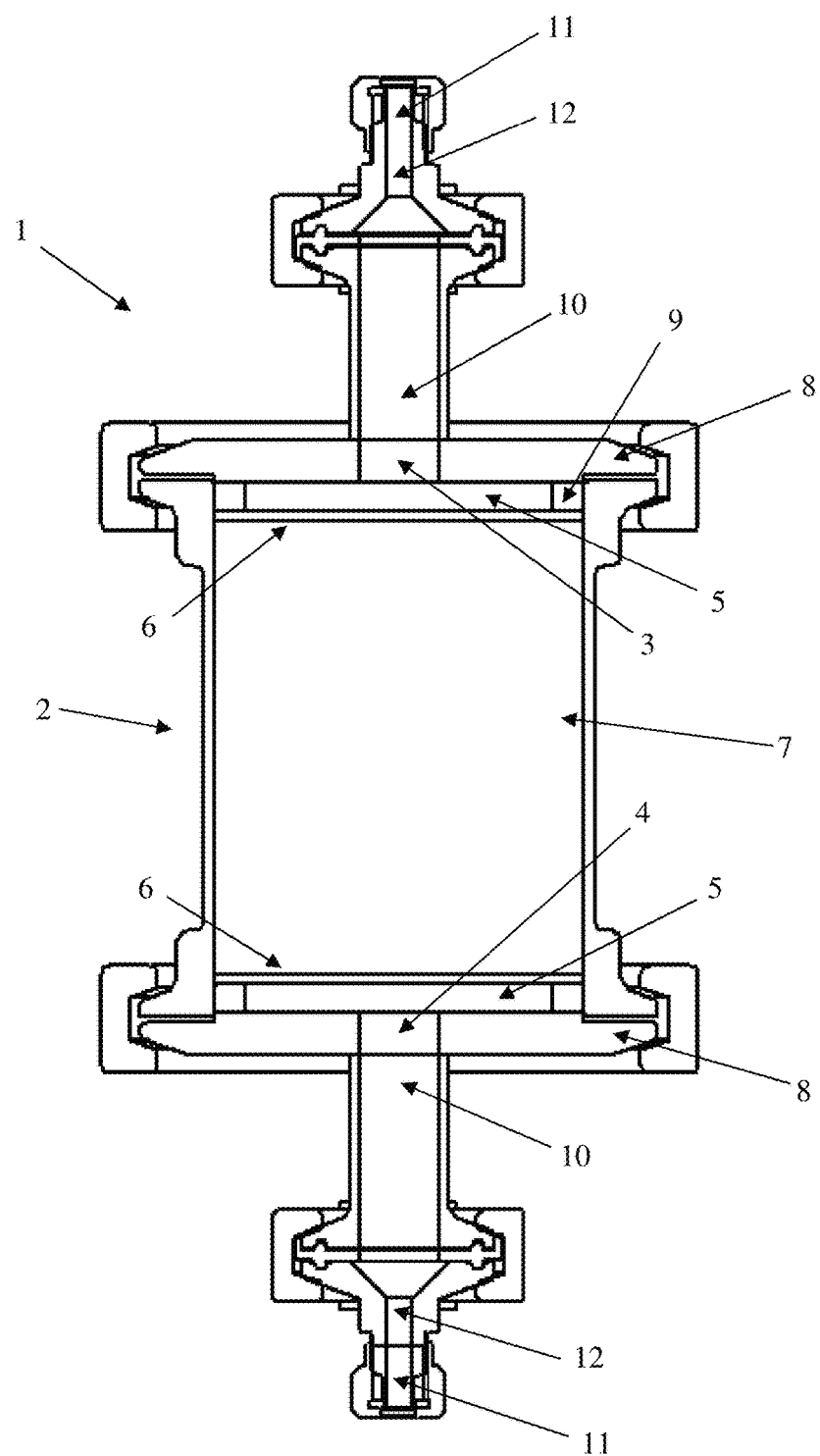
FIG. 1 shows a purification device 1, which has a flow chamber 2 having a columnar interior. A sorption agent (not depicted), which carries out the sorption of the substances to be removed from the liquid-crystal mixture, such as, for example, polar compounds, particles, water, solvents, etc., is arranged in the flow chamber 2.

The liquid-crystal mixture can be introduced into the flow chamber 2 via an inlet opening 3 arranged at the top in the FIGURE and can flow out of the flow chamber 2 again via an outlet opening 4 arranged opposite the inlet opening.

An inlet flow distribution element 5, which is in contact with an inlet filter element 6, is arranged immediately adjacent to the inlet opening 3. The liquid-crystal mixture is passed into the interior of the flow chamber 2 through the flow distribution element 5 and the inlet filter element 6. The flow distribution element 5 distributes the liquid-crystal mixture flowing in through the comparatively narrow inlet opening 3 uniformly over the entire cross-sectional area of the columnar interior of the flow chamber 2, so that the maximum effective contact duration of the liquid-crystal mixture flowing through with the sorption agent or the surface-active sorbent is achieved. An outlet flow distribution element 5, which is in contact with an outlet filter element 6, is arranged immediately adjacent to the outlet opening 4. The liquid-crystal mixture is passed out of the interior of the flow chamber 2 through the outlet filter element 6 and the outlet flow distribution element 5.

In order, in spite of the flow resistance generated by the flow distribution element 5 and by the filter element 6, to prevent undesired exit of the often pressurized inflowing liquid-crystal mixture in the region of the inlet opening 3 from the purification device 1 and in order to ensure safe filling of the flow chamber 2, an annular seal 9 is provided in the region of the inlet opening 3. The seal 9 is in contact with the flow distribution element 5. The connection between the seal 9 and the flow distribution element 5 is ensured by a connection means 8, which, in the case of the present illustrative embodiment, is a clamp connection. As shown in FIG. 1, the annular seal (9) is in sealing contact with an inner surface of the top, an inner peripheral surface of the sidewall, and an outer peripheral edge of the inlet flow distributor (5) to seal the peripheral edge of the inlet flow distributor (5) to the sidewall and to prevent the liquid crystal mixture from escaping from the flow chamber (2).

The flow distribution element 5 is designed in such a way that it covers at least 50%, or, in the case of the illustrative embodiment depicted, more than 75%, of the surface of the filter element 6. This results in the liquid-crystal mixture being distributed over virtually the entire width of the flow chamber 2 before entry into the flow chamber 2 and at the same time being pre-filtered. This can considerably improve the sorption process and shorten the reaction time.

Figure 2:
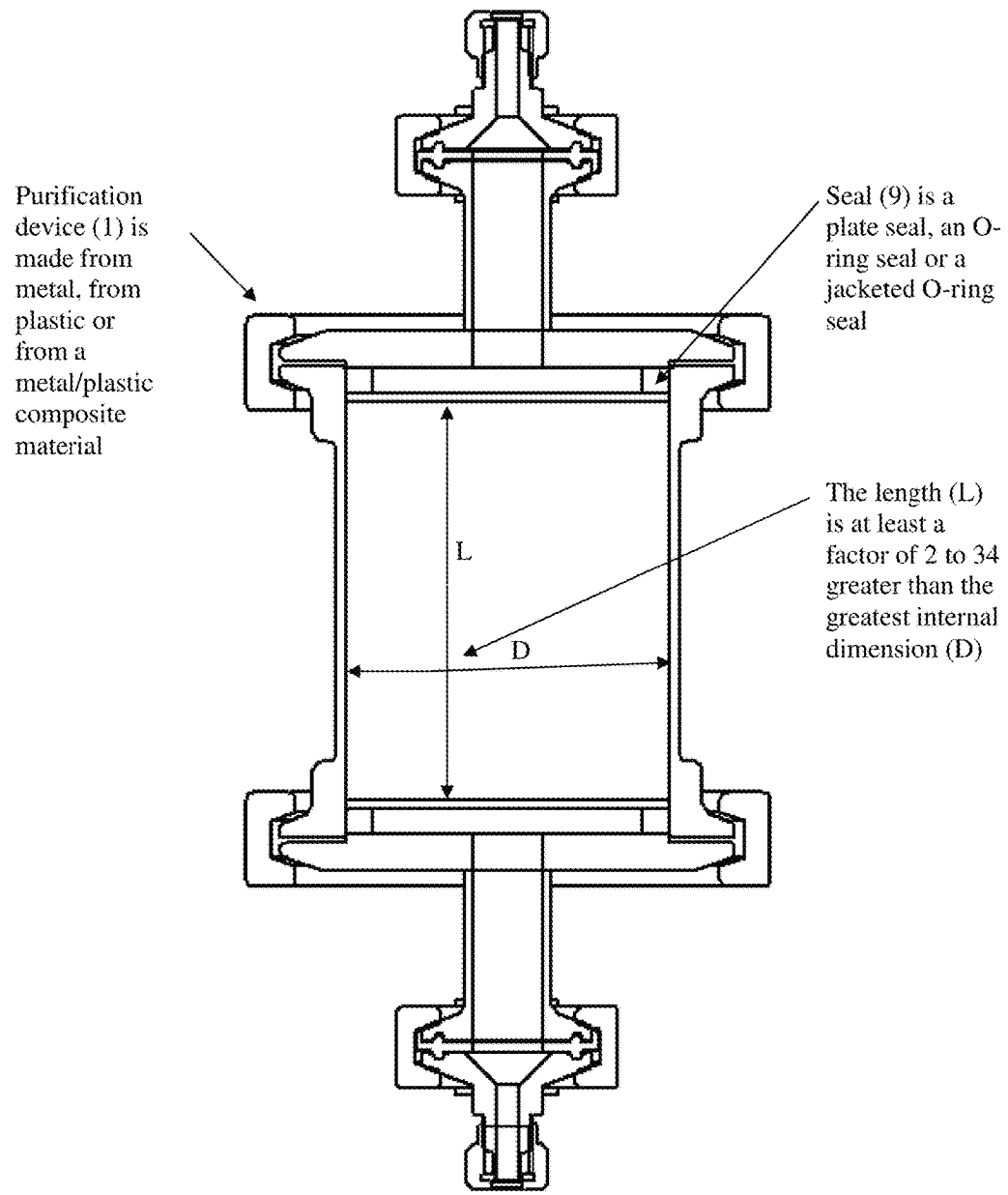
FIG. 2 shows that the purification device (1) is made from metal, from plastic or from a metal/plastic composite material; that seal (9) is a plate seal, an O-ring seal or a jacketed O-ring seal; and that the length (L) of the flow chamber is at least a factor of 2 to 34 greater than the greatest internal dimension (ID).
Figure 3:
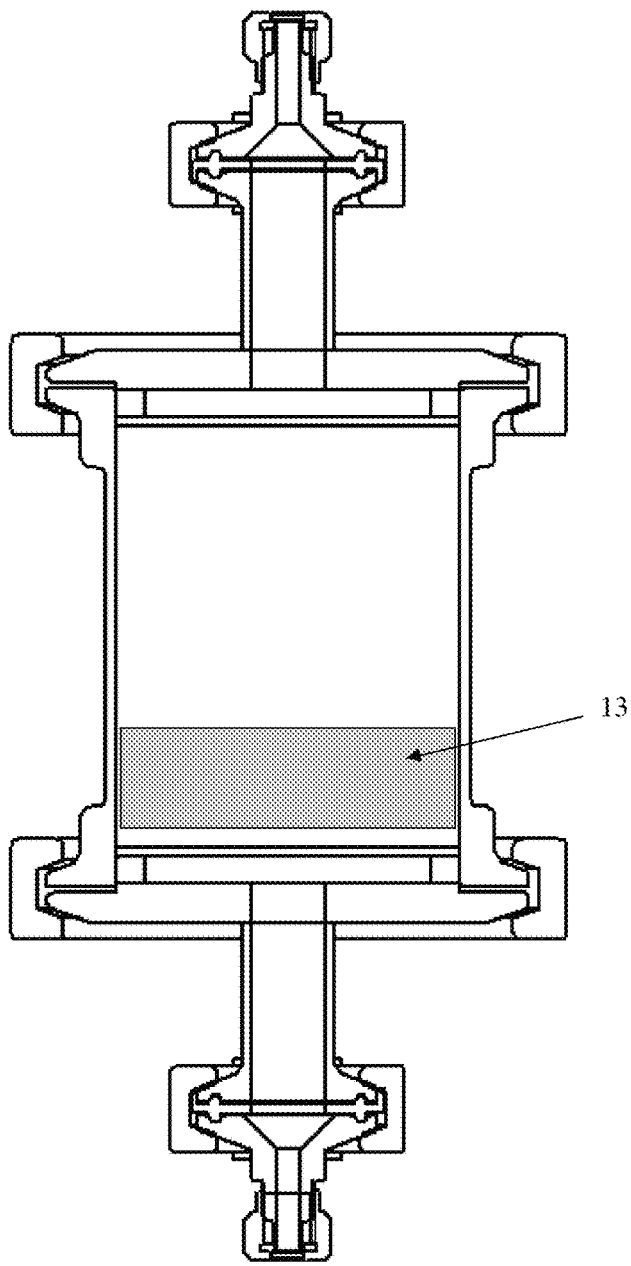
FIG. 3 shows that the purification agent (13) is arranged in the flow chamber, and can be a sorbent or a surface-active sorbent, or an aluminium oxide, modified silica gel, magnesium silicate, silica gel and/or zeolite.
Figure 4:
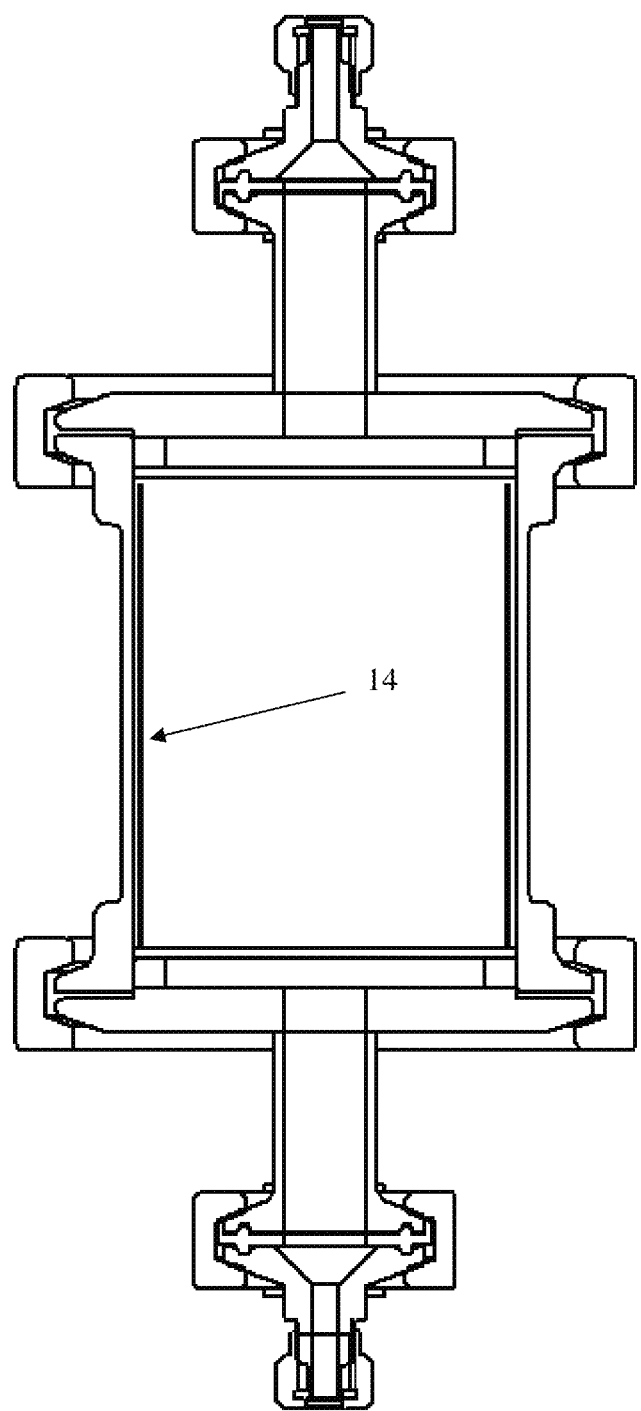
FIG. 4 shows an adhesion-reducing internal coating (14) is applied to the inside surfaces (7) of the flow chamber (2).
Figure 5:
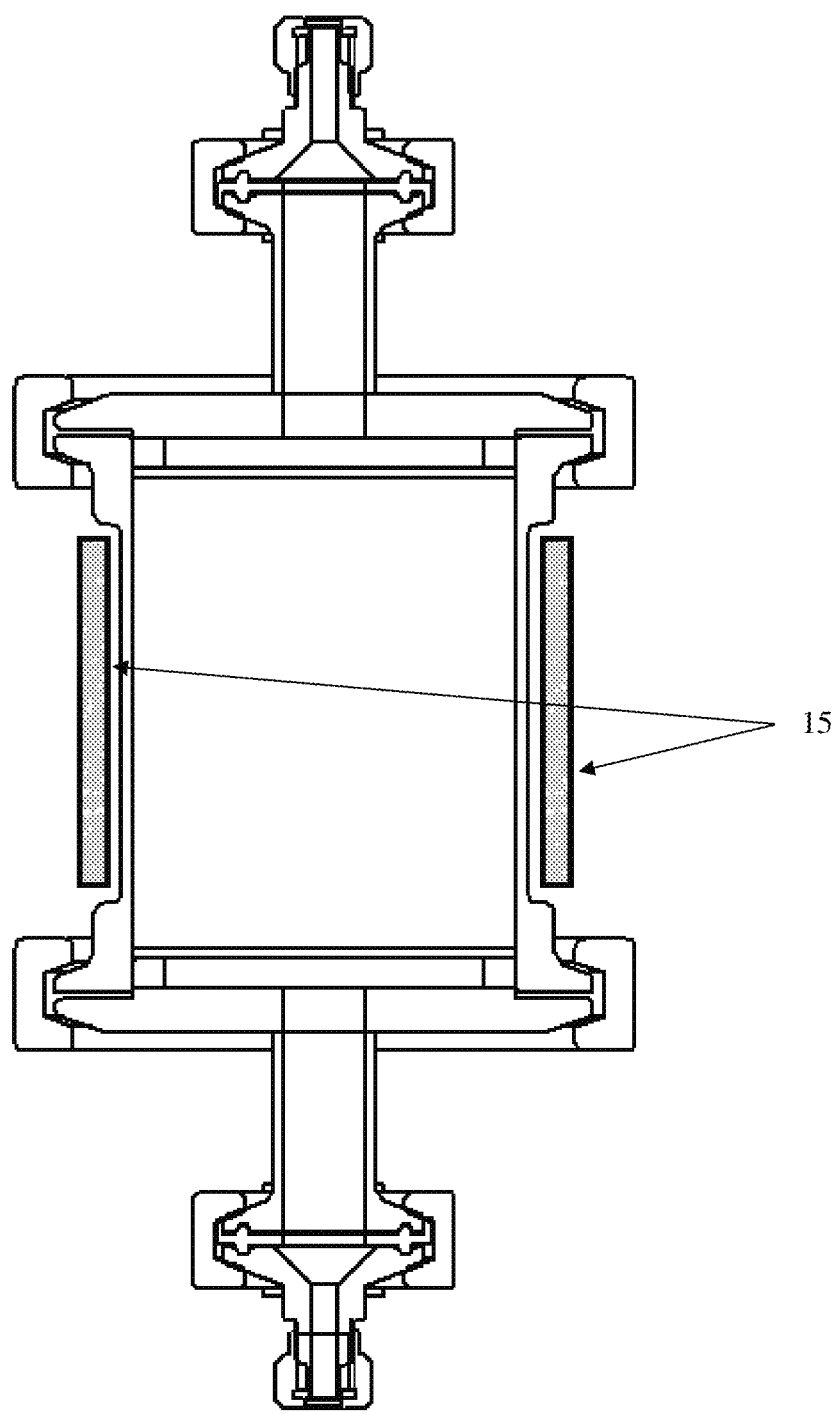
FIG. 5 shows that heating and/or cooling elements (15) are mounted on the purification device (1).

In the illustrative embodiment depicted in FIG. 2, the flow direction runs from the inlet opening 3 arranged at the top to the outlet opening 4 arranged at the bottom. The flow chamber 2 has a length L in the flow direction from the inlet filter (6) to the outlet filter (6) which is greater than the diameter D and thus than a greatest internal dimension of the flow chamber 2 transverse to the flow direction. The length L can be 2 to 34 times the diameter D. Surprisingly, it has been found that, for certain liquid-crystal mixtures, a length: diameter ratio of this type achieves a short reaction time and sufficiently good purification quality, which is reflected in improved efficiency.

In order to exclude contamination of the liquid-crystal mixture with sorption agent, a filter element 6 is likewise arranged in the region of the outlet opening 4. A further flow distribution element 5 in front of the outlet opening 4 ensures that the stream split up by the first flow distribution element 5 in the region of the inlet opening 3 is re-combined and fed into a connector 10. The liquid-crystal mixture can subsequently be introduced into a container, not depicted, which can be connected to the purification device 1 by means of a suitable connection means 11 (for example a clamp connection).

The connector 10 has a covering means 12 (in the present illustrative embodiment a lid cap), which is detachably attached to the connector 10. The covering means 12 is fixed to the connector 10 with the aid of a further clamp connection, enabling simple and rapid installation.

The purification device 1 has a symmetrical design, i.e. the inlet opening 3 and the outlet opening 4 can also be interchanged and the flow direction intended for a purification operation can be reversed. A flow distribution element 5 and a filter element 6 are in each case arranged on both sides or at both openings 3 and 4. A connector 10 is in each case arranged at both openings 3 and 4 and can be sealed by means of a covering means 12 or connected directly to a preceding or succeeding container. This design of the purification device 1 is particularly advantageous, since simple and reliable installation of the purification device 1 within a production plant for liquid-crystal mixtures can be facilitated and rapid purification and subsequent filling of the liquid-crystal mixture can be carried out using the purification device 1.

The purification method described above is particularly suitable for the purification of liquid-crystal mixtures. In particular, liquid-crystal mixtures comprising at least two organic substances, preferably mesogenic, in particular liquid-crystalline substances, are purified here using the device according to the invention, where the organic substances are preferably selected from the compounds of the general formula I,

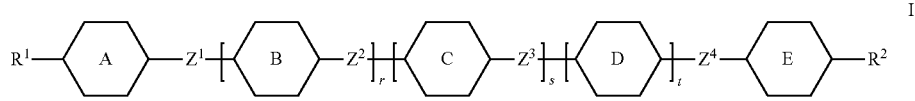

I in which
R$^1$ and R$^2$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

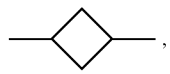

—C≡C—, —CH=CH—, —CF$_2$O—, —OCF$_2$—, —OC— O— or —O—CO— in such a way that O atoms are not linked directly to one another, and one of the radicals $R^1$ and $R^2$ also denotes F, Cl, CN, $SF_5$, NCS, SCN, OCN,
rings A, B, C, D and E each, independently of one another, denote
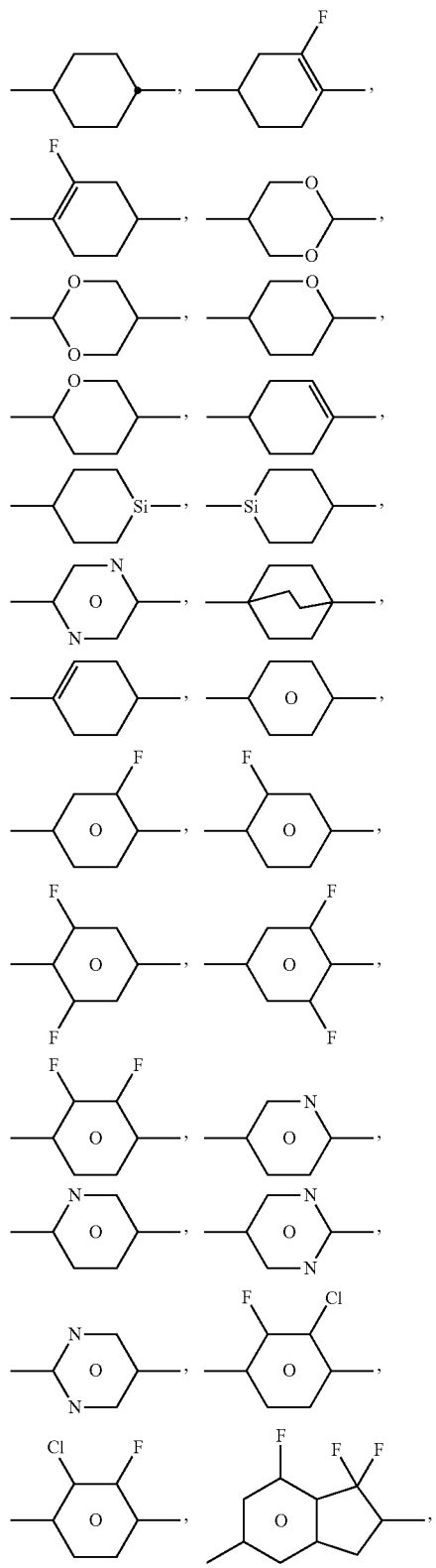
-continued
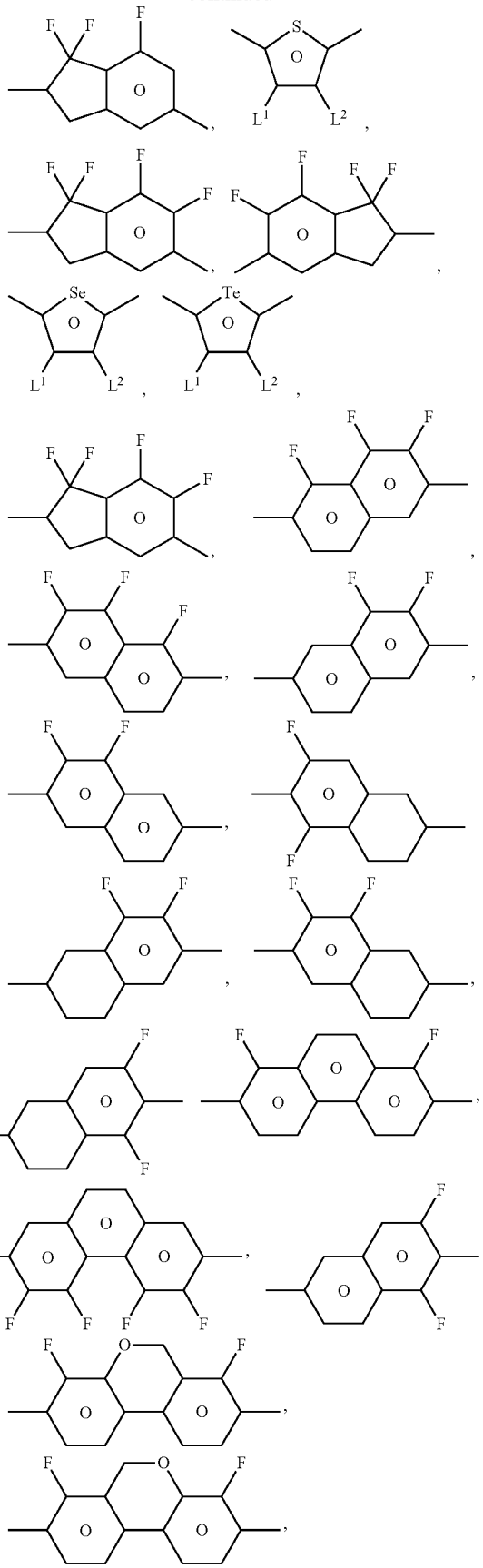

-continued

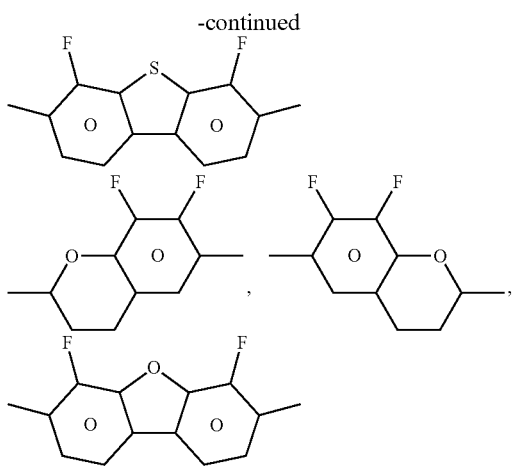

r, s and t each, independently of one another, denote 0, 1, 2 or 3, where r+s+t≤3, $Z^{1-4}$ each, independently of one another, denote —CO—O—, —O—CO—, —CF$_2$O—, —OCF$_2$—, —CH$_2$O—, —OCH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, and $L^1$ and $L^2$ each, independently of one another, denote H or F.

In the case where r+s+t=0, $Z^1$ and $Z^4$ are preferably selected in such a way that, if they do not denote a single bond, they are not linked to one another via two O atoms.

The liquid-crystal mixtures to be purified comprising the individual mesogenic substances may additionally also comprise one or more polymerisable compounds, so-called reactive mesogens (RMs), for example as disclosed in U.S. Pat. No. 6,861,107, in concentrations of, preferably, 0.12-5% by weight, particularly preferably 0.2-2% by weight, based on the mixture. Mixtures of this type can be used for so-called polymer stabilised VA (PS-VA) modes, negative IPS (PS-IPS) or negative FFS (PS-FFS) modes, in which polymerisation of the reactive mesogens is intended to take place in the liquid-crystalline mixture. The prerequisite for this is that the liquid-crystal mixture does not itself comprise any individual polymerisable substances which likewise polymerise under the conditions where the reactive mesogens react.

The polymerisable mesogenic or liquid-crystalline compounds, also known as "reactive mesogens" (RMs), are preferably selected from the compounds of the formula II

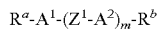

in which the individual radicals have the following meanings:

$A^1$ and $A^2$ each, independently of one another, denote an aromatic, heteroaromatic, alicyclic or heterocyclic group, preferably having 4 to 25 C atoms, which may also contain fused rings and which is optionally mono- or polysubstituted by L, $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —C≡C—, —CH=CH—COO—, —OCO—CH=CH—, CR$^0$R$^{00}$ or a single bond, L, R$^a$ and R$^b$ each, independently of one another, denote H, halogen, SF$_5$, NO$_2$, a carbon group or hydrocarbon group, where the compounds contain at least one radical L, R$^a$ and R$^b$ which denotes or contains a P-Sp- group, R$^0$ and R$^{00}$ each, independently of one another, denote H or alkyl having 1 to 12 C atoms, P denotes a polymerisable group, Sp denotes a spacer group or a single bond, m denotes 0, 1, 2, 3 or 4, n denotes 1, 2, 3 or 4.

The polymerisable compounds may contain one polymerisable group (monoreactive) or two or more (di- or multireactive), preferably two, polymerisable groups.

Above and below, the following meanings apply:

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) in a polymerisable mesogenic compound ("RM") to one another. Sp preferably denotes a single bond or a 1-16 C alkylene, in which one or more CH$_2$ groups may be replaced by —O—, —CO—, —COO— or —OCO— in such a way that two O atoms are not connected directly to one another.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

The terms "alkyl", "aryl", "heteroaryl", etc., also encompass polyvalent groups, for example alkylene, arylene, heteroarylene, etc.

The term "alkyl" in this application encompasses straight-chain and branched alkyl groups having 1 to 9 carbon atoms, preferably the straight-chain groups methyl, ethyl, propyl, butyl, pentyl, hexyl, heptyl, octyl and nonyl. Groups having 1 to 5 carbon atoms are particularly preferred.

The term "alkenyl" in this application encompasses straight-chain and branched alkenyl groups having 2 to 9 carbon atoms, preferably the straight-chain groups having 2 to 7 carbon atoms. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hex-enyl, 1E-hept-enyl, 3-butenyl, 3E-pentenyl, 3E-hexenyl, 3E-heptenyl, 4-pentenyl, 4Z-hexenyl, 4E-hexenyl, 4Z-hep-tenyl, 5-hexenyl, 6-heptenyl and the like. Groups having up to 5 carbon atoms are particularly preferred.

The term "fluoroalkyl" in this application encompasses straight-chain groups having a terminal fluorine, i.e. fluoromethyl, 2-fluoroethyl, 3-fluoropropyl, 4-fluoro-butyl, 5-fluoro-pentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$—O—$(CH_2)_m$, in which n and m each, independently of one another, denote 1 to 6. Preferably, n=1 and m=1 to 6.

The term "aryl" denotes an aromatic carbon group or a group derived therefrom. The term "heteroaryl" denotes "aryl" in accordance with the above definition containing one or more heteroatoms.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or a —C≡C— triple bond, and groups which are suitable for polymerisation with ring opening, such as, for example, oxetane or epoxide groups.

The polymerisable compounds are prepared analogously to processes which are known to the person skilled in the art and are described in standard works of organic chemistry, such as, for example, in Houben-Weyl, Methoden der organischen Chemie [Methods of Organic Chemistry], Thieme-Verlag, Stuttgart.

Typical and preferred reactive mesogens (RMs) are described, for example, in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Very particularly referred reactive mesogens are shown on Table E.

The process is used for the preparation of a mixture consisting of organic compounds, one or more of which are preferably mesogenic, preferably liquid-crystalline, per se.

The mesogenic compounds preferably include one or more liquid-crystalline compounds. The process product is preferably a homogeneous, liquid-crystalline mixture. In the broader sense, the process also encompasses the preparation of mixtures which consist of organic substances in the homogeneous liquid phase and comprise additives which are insoluble therein (for example small particles). The process can thus also be used for the preparation of suspension-like or emulsion-like mixtures based on a continuous homogeneous organic phase. However, process variants of this type are generally less preferred.

By means of suitable additives, the liquid-crystal phases according to the invention can be modified in such a way that they can be employed in any type of LCD display that has been disclosed to date, for example, ECB, VAN, IPS, FFS, TN, TN-TFT, STN, OCB, GH, PS-IPS, PS-FFS, PS-VA or ASM-VA displays.

The liquid-crystal mixtures may also comprise further additives known to the person skilled in the art and described in the literature, such as, for example, UV stabilisers, such as, for example, Tinuvin® from Ciba, antioxidants, free-radical scavengers, nanoparticles, microparticles, one or more dopants, etc. For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity, or substances can be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Suitable stabilisers and dopants which can be combined with the compounds of the formula I in the mixing container in the preparation of the liquid-crystal mixtures are indicated below in Tables C and D.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, k and z are integers and preferably denote 0, 1, 2, 3, 4, 5, 6, 7, 8, 9, 10, 11 or 12. The term "(O)$C_mH_{2m+1}$" means $OC_mH_{2m+1}$ or $C_mH_{2m+1}$. The coding in Table B is self-evident.

In Table A, only the acronym for the parent structure is indicated. In individual cases, this is followed, separated from the acronym for the parent structure by a dash, by a code for the substituents $R^1*$, $R^2*$, $L^1*$ and $L^2*$:

| Code for $R^1*$, $R^2*$, $L^1*$, $L^2*$, $L^3*$ | $R^1*$ | $R^2*$ | $L^1*$ | $L^2*$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |

-continued

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nOCF3.F | $C_nH_{2n+1}$ | $OCF_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mesogenic or liquid-crystalline substances 10 which are suitable for the preparation of liquid-crystal mixtures and can be used in the purification process according to the invention are listed, in particular, in Tables A and B:

TABLE A

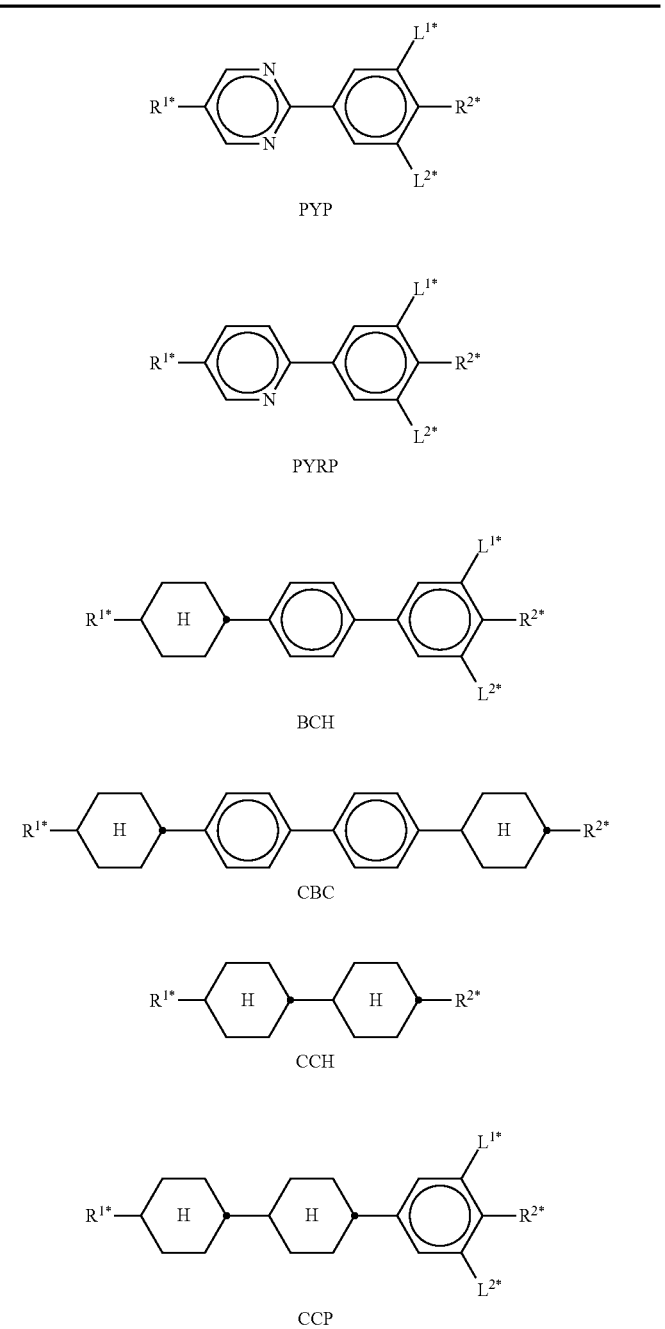

PYP

PYRP

BCH

CBC

CCH

CCP

TABLE A-continued
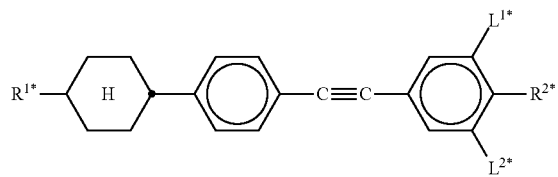
CPTP
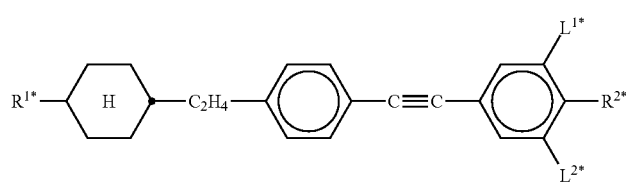
CEPTP
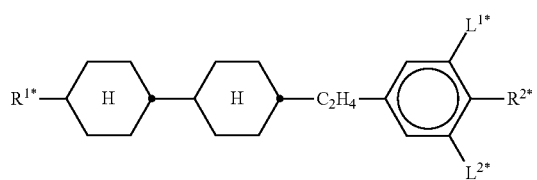
ECCP
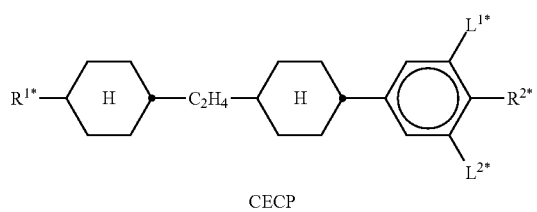
CECP
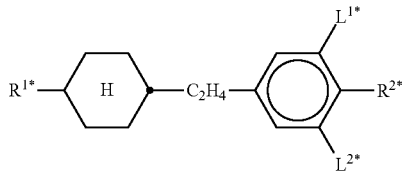
EPCH
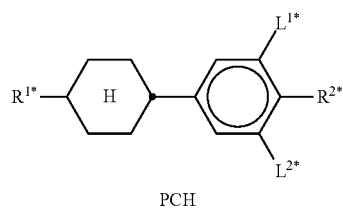
PCH
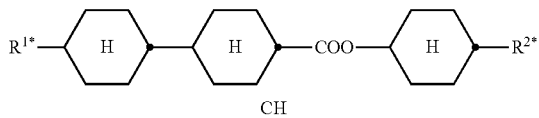
CH
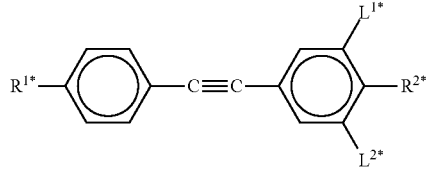
PTP TABLE A-continued
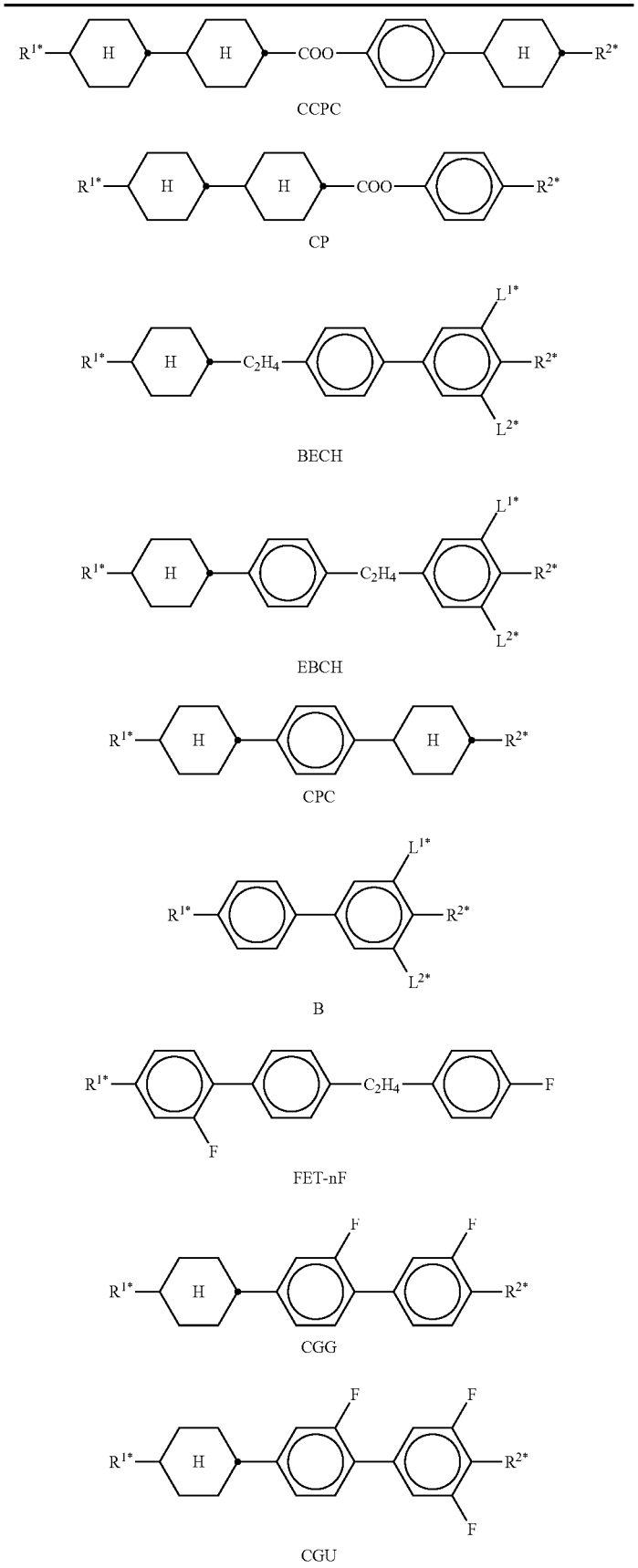

TABLE A-continued
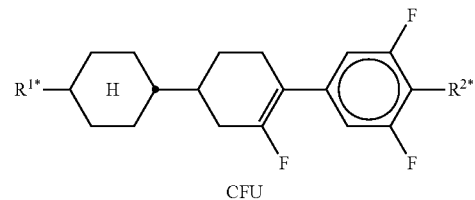
CFU
TABLE B
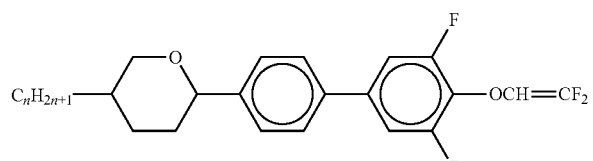
APU-n-OXF
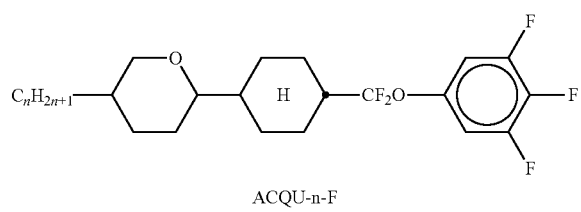
ACQU-n-F
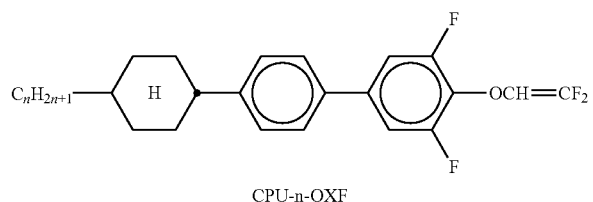
CPU-n-OXF
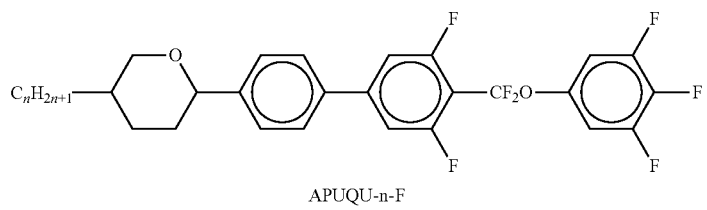
APUQU-n-F
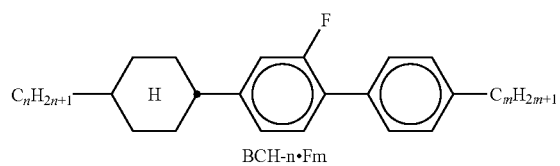
BCH-n·Fm
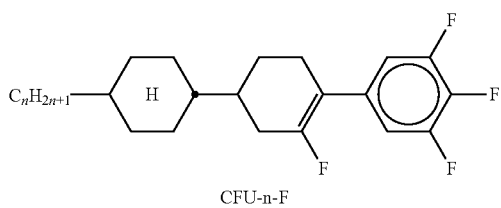
CFU-n-F TABLE B-continued
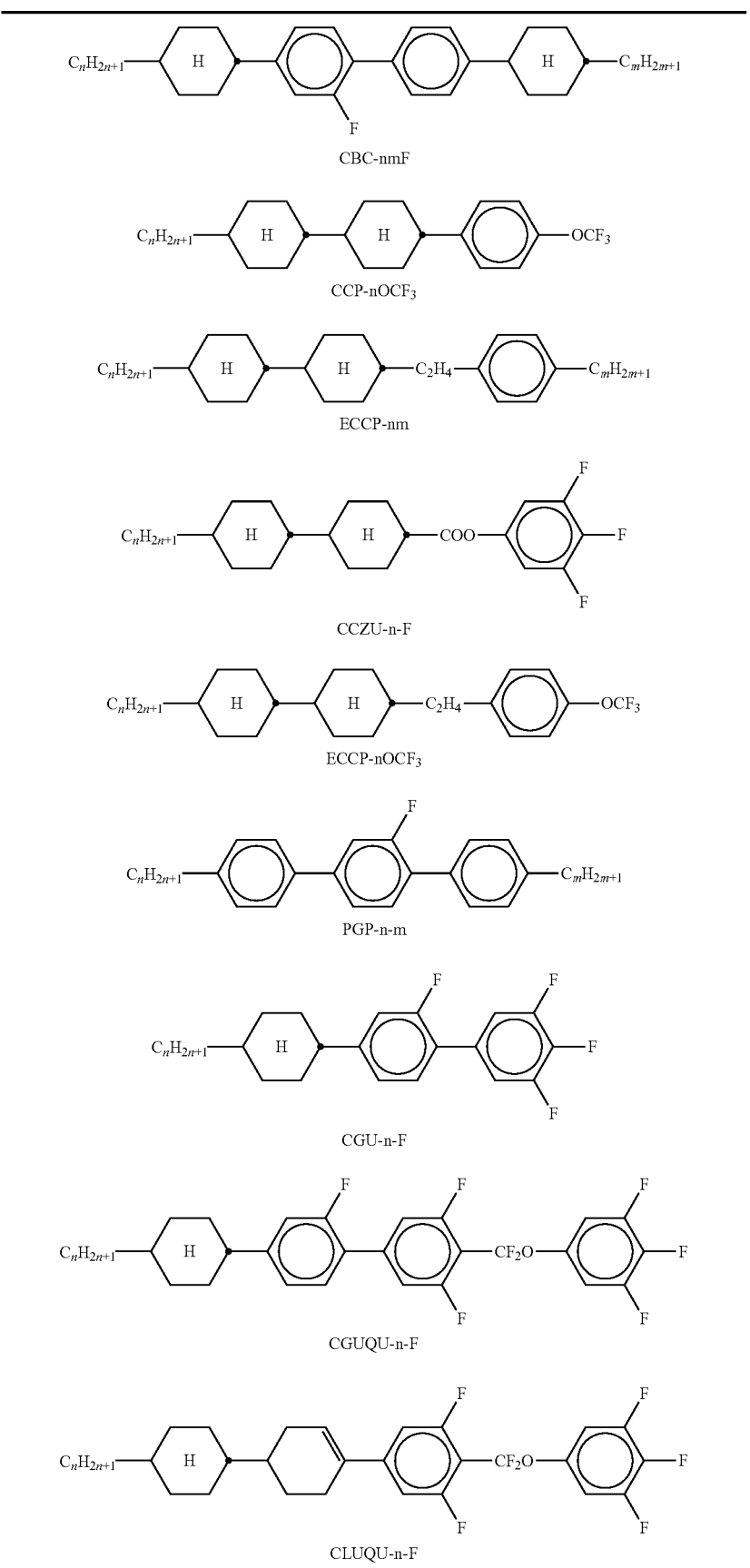

TABLE B-continued
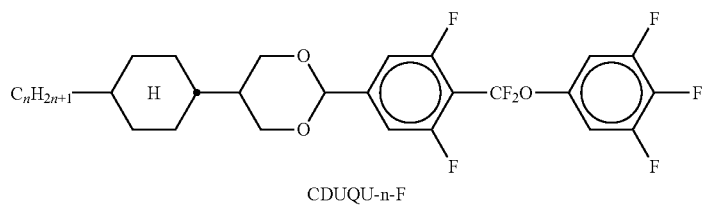
CDUQU-n-F
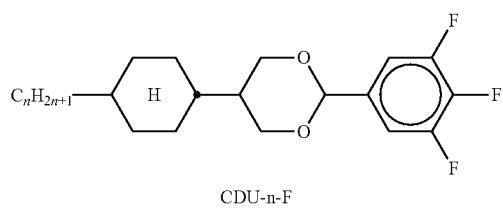
CDU-n-F
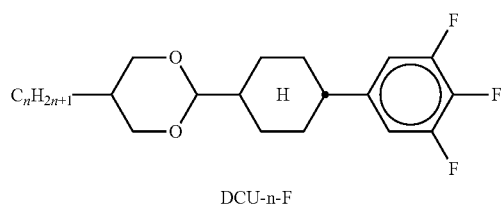
DCU-n-F
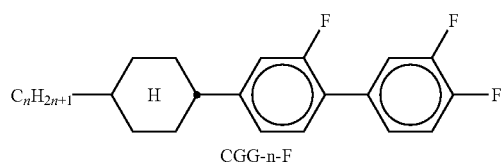
CGG-n-F
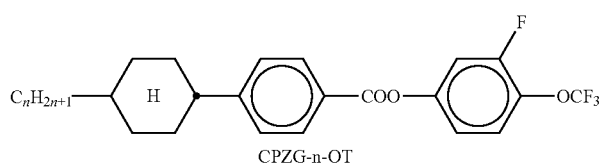
CPZG-n-OT
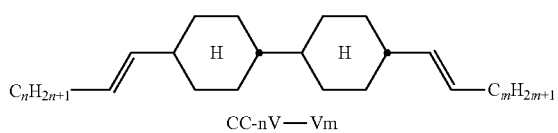
CC-nV—Vm
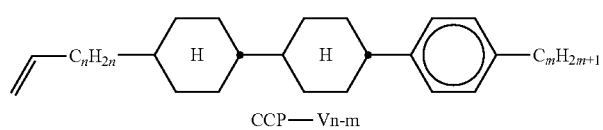
CCP—Vn-m
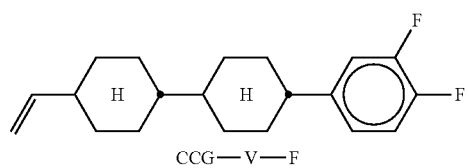
CCG—V—F
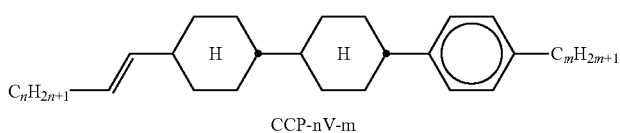
CCP-nV-m TABLE B-continued
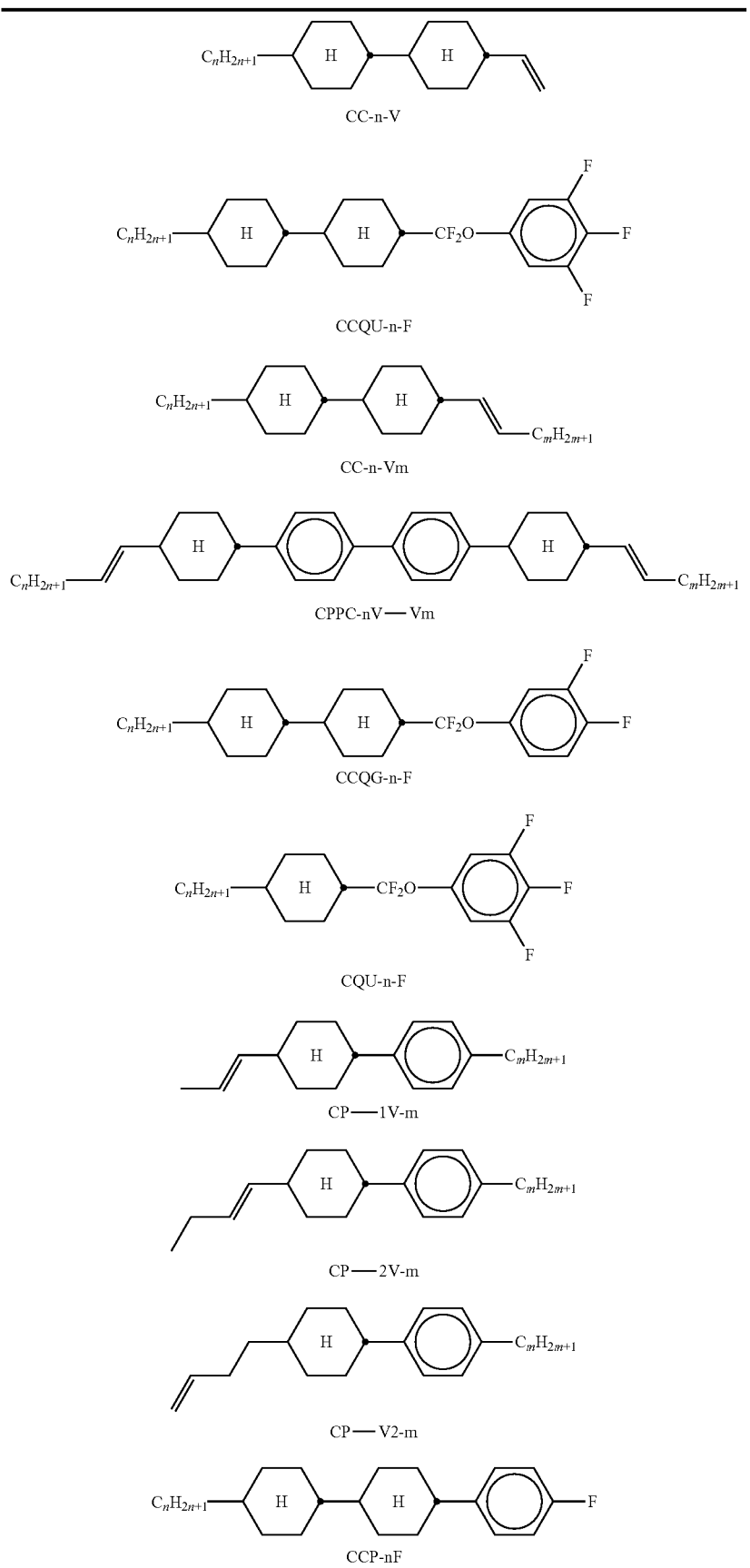

TABLE B-continued
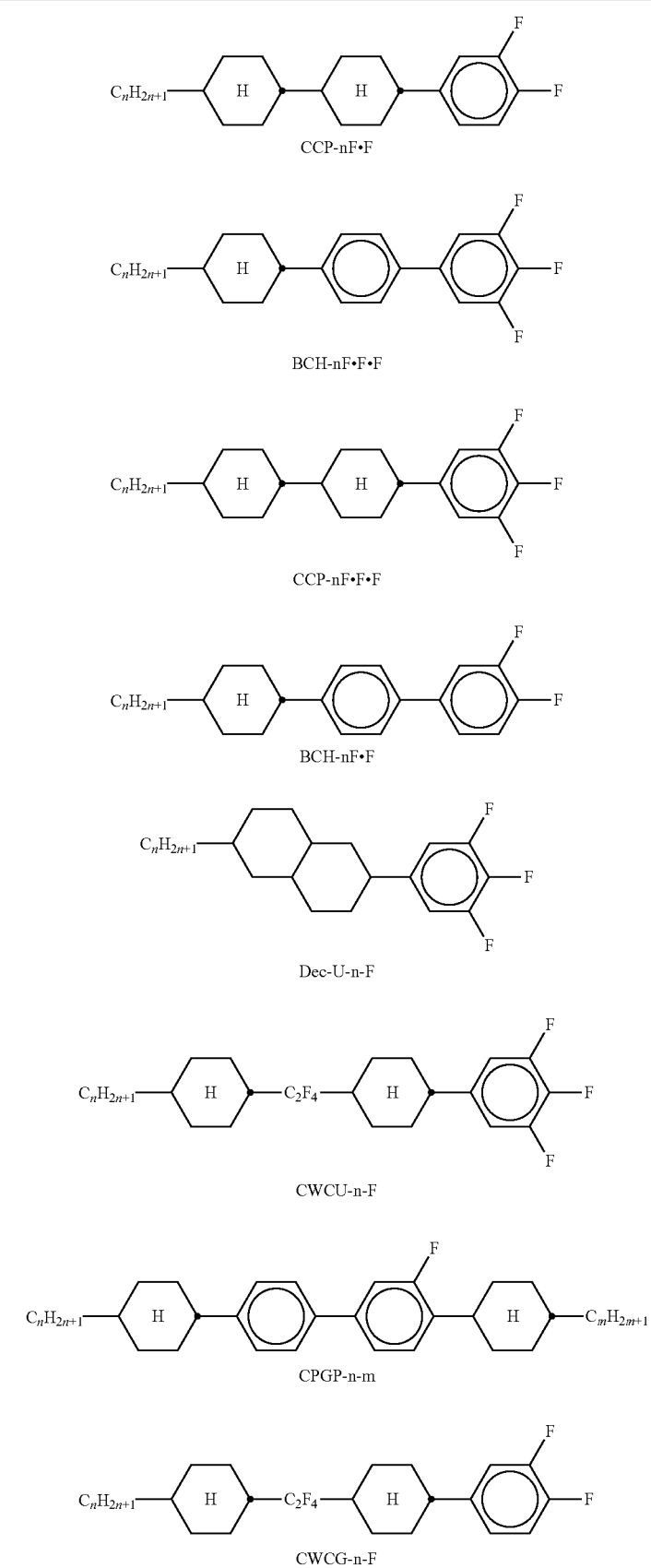

TABLE B-continued
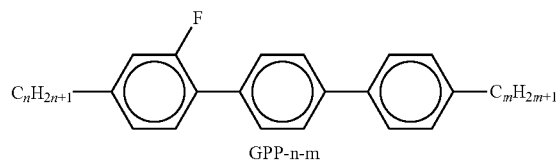
GPP-n-m
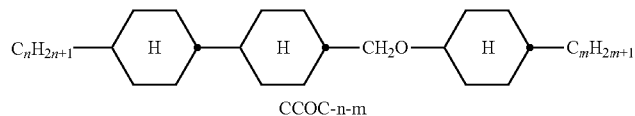
CCOC-n-m
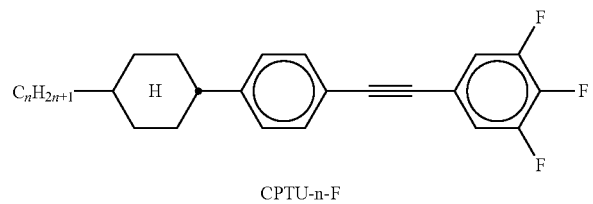
CPTU-n-F
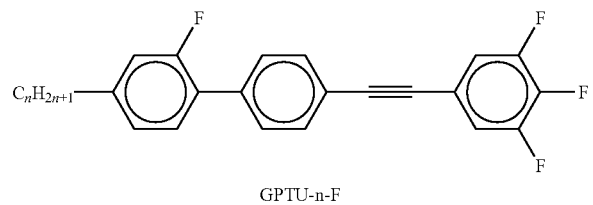
GPTU-n-F
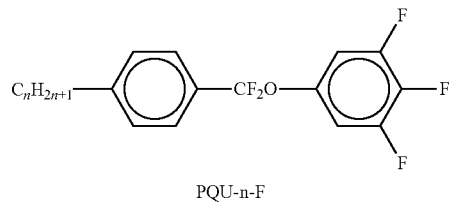
PQU-n-F
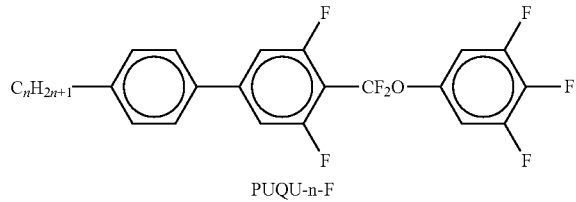
PUQU-n-F
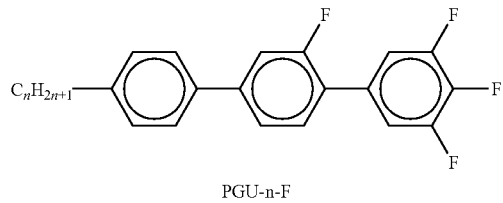
PGU-n-F
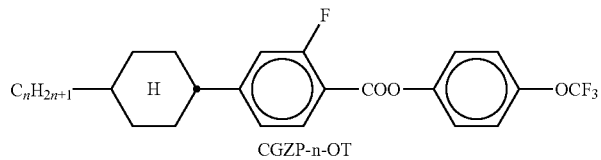
CGZP-n-OT TABLE B-continued
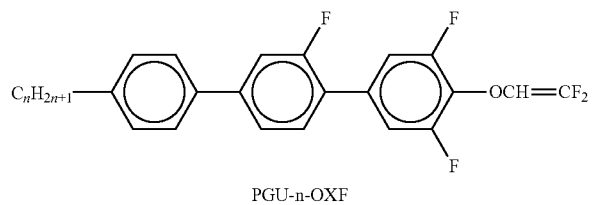
PGU-n-OXF
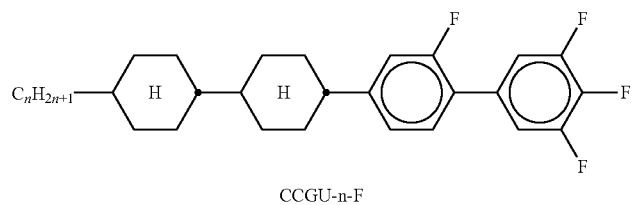
CCGU-n-F
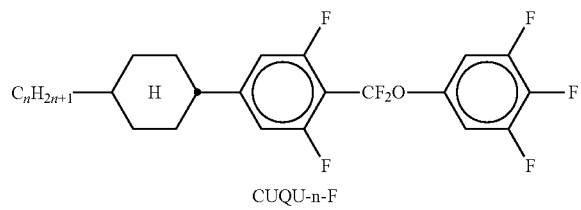
CUQU-n-F
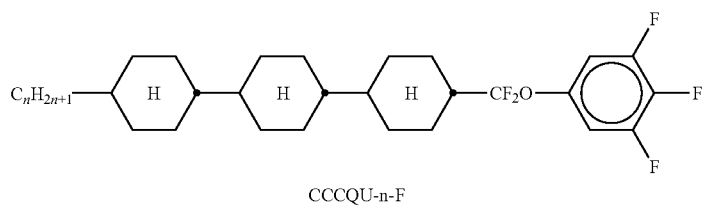
CCCQU-n-F
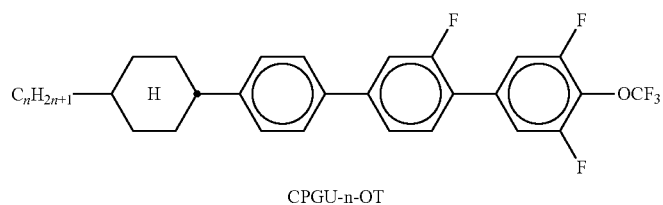
CPGU-n-OT
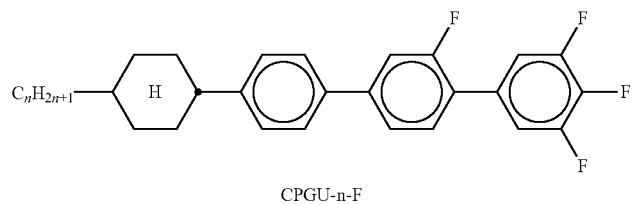
CPGU-n-F
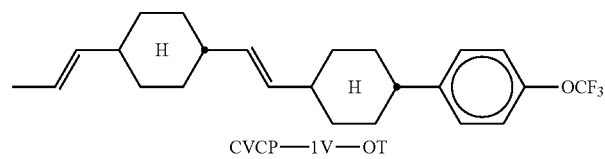
CVCP—1V—OT
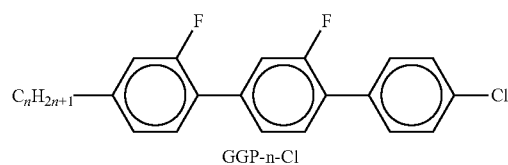
GGP-n-Cl TABLE B-continued
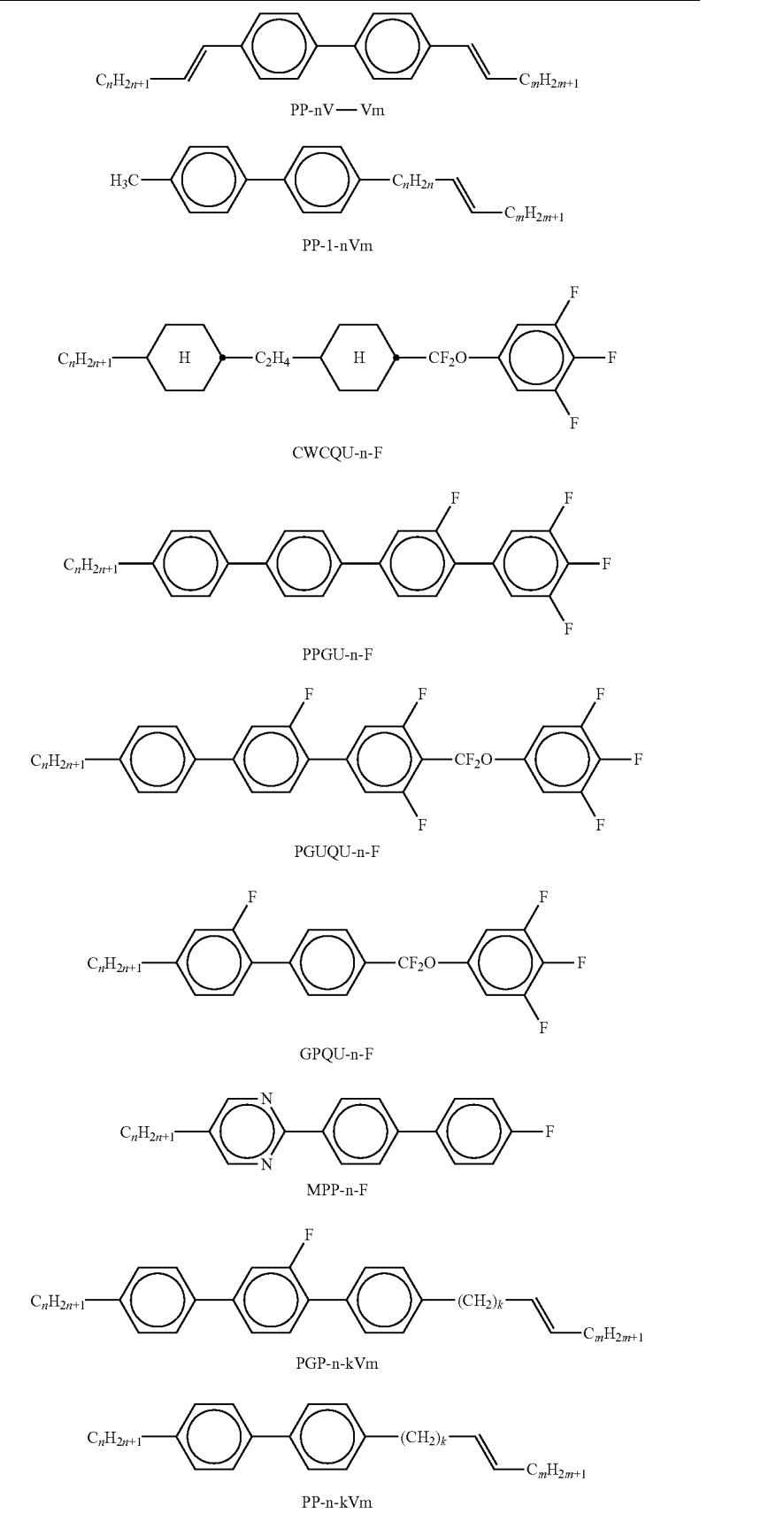

TABLE B-continued
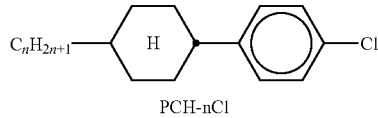
PCH-nCl
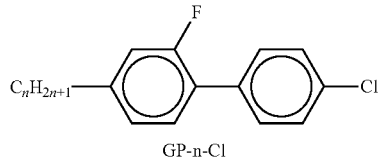
GP-n-Cl
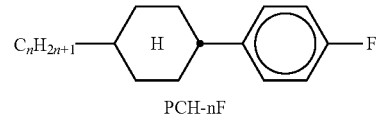
PCH-nF
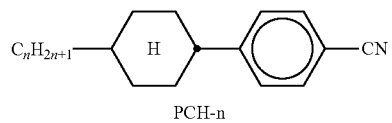
PCH-n
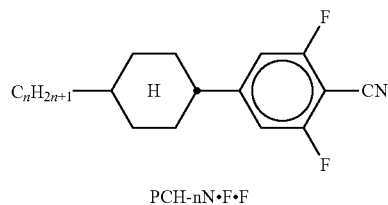
PCH-nN•F•F
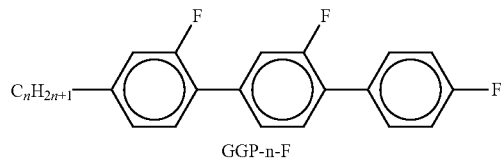
GGP-n-F
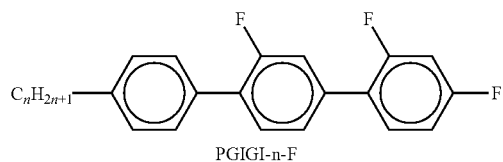
PGIGI-n-F
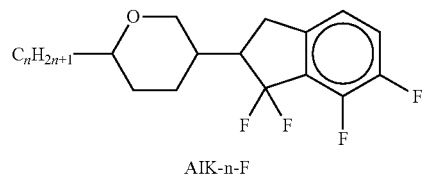
AIK-n-F
BCH-nm
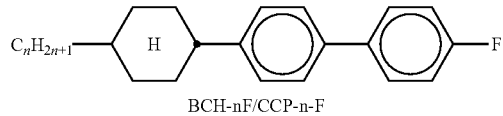
BCH-nF/CCP-n-F TABLE B-continued
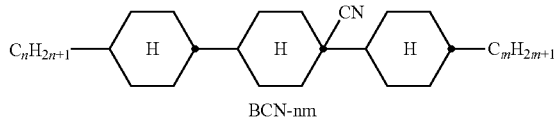
BCN-nm
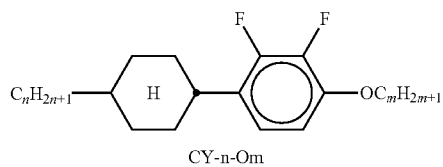
CY-n-Om
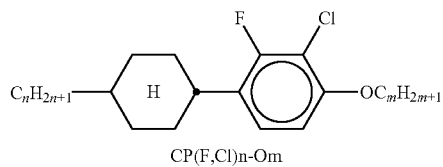
CP(F,Cl)n-Om
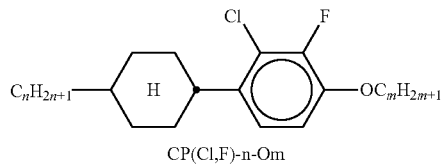
CP(Cl,F)-n-Om
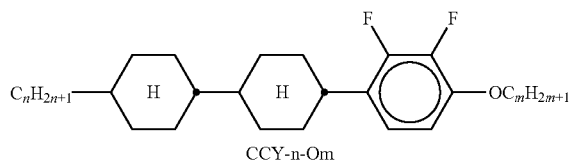
CCY-n-Om
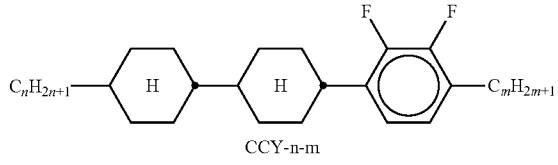
CCY-n-m
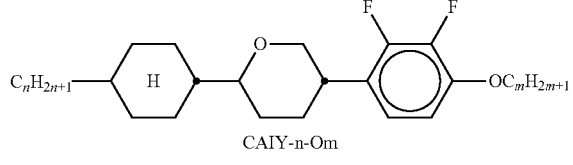
CAIY-n-Om
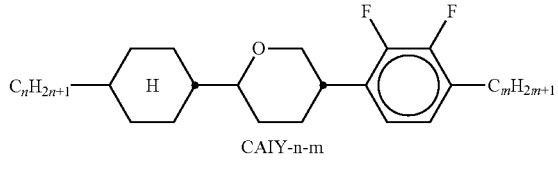
CAIY-n-m
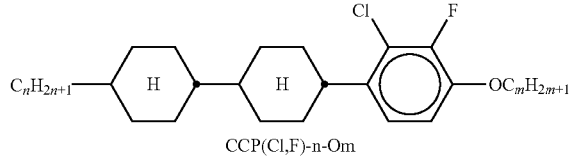
CCP(Cl,F)-n-Om TABLE B-continued
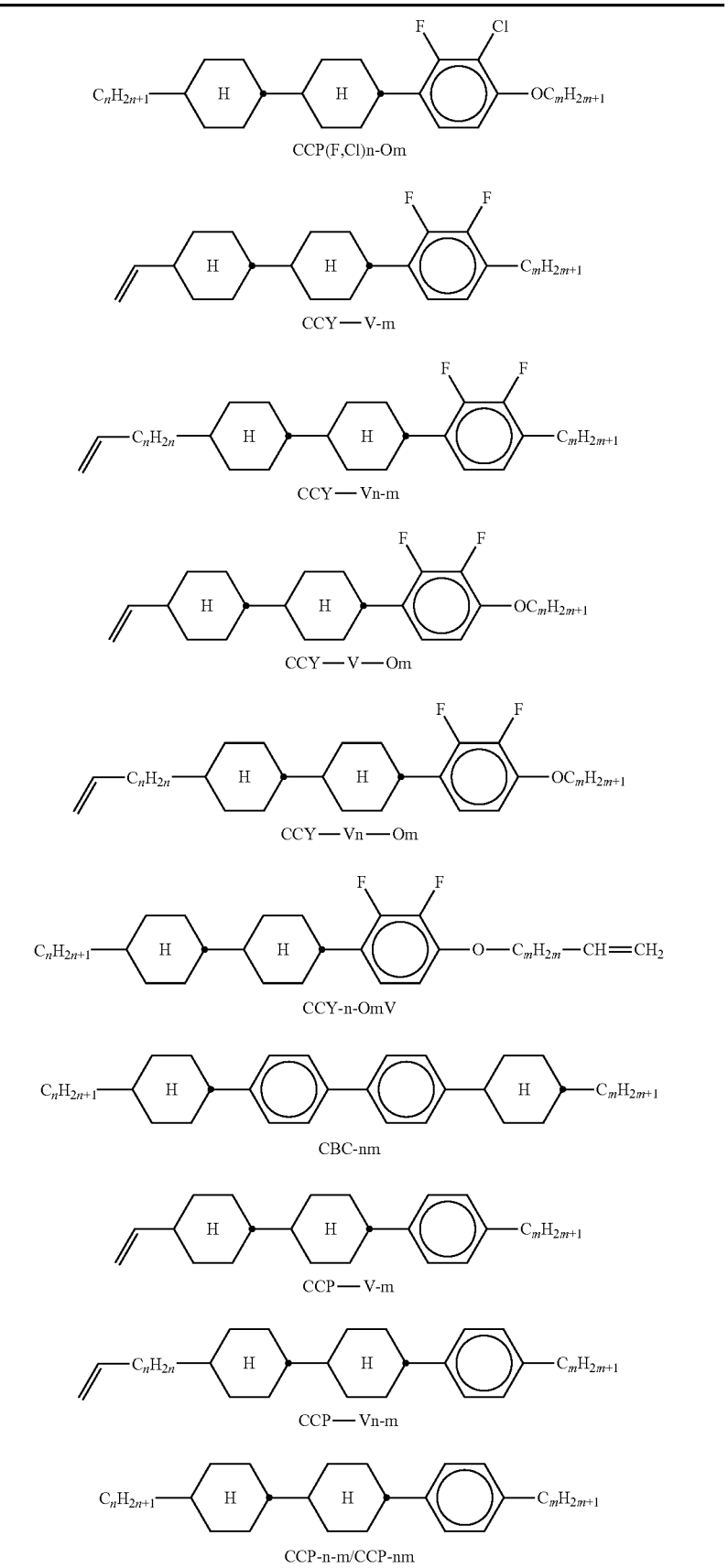

TABLE B-continued
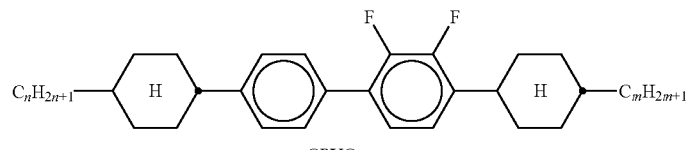
CPYC-n-m
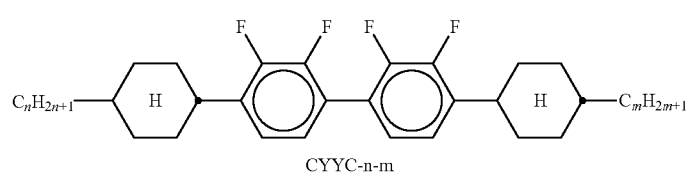
CYYC-n-m
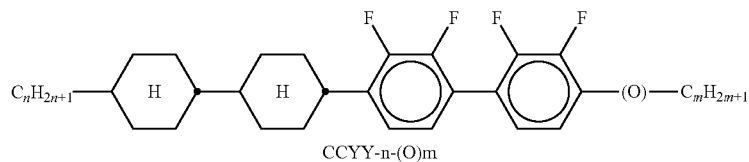
CCYY-n-(O)m
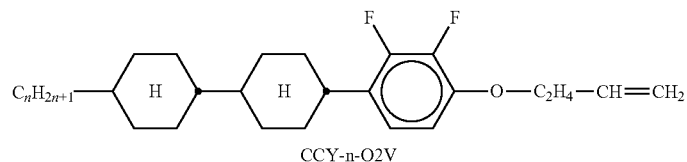
CCY-n-O2V
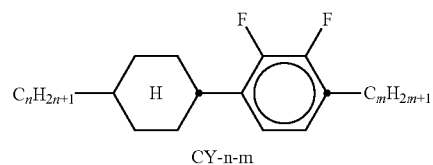
CY-n-m
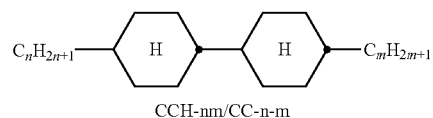
CCH-nm/CC-n-m
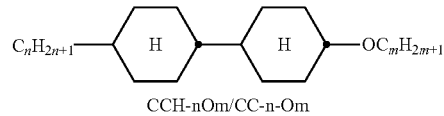
CCH-nOm/CC-n-Om
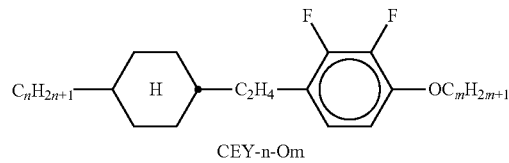
CEY-n-Om
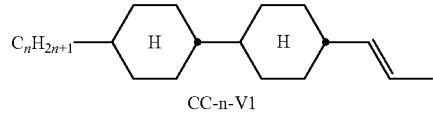
CC-n-V1
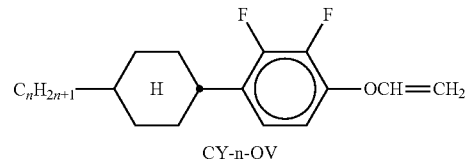
CY-n-OV TABLE B-continued
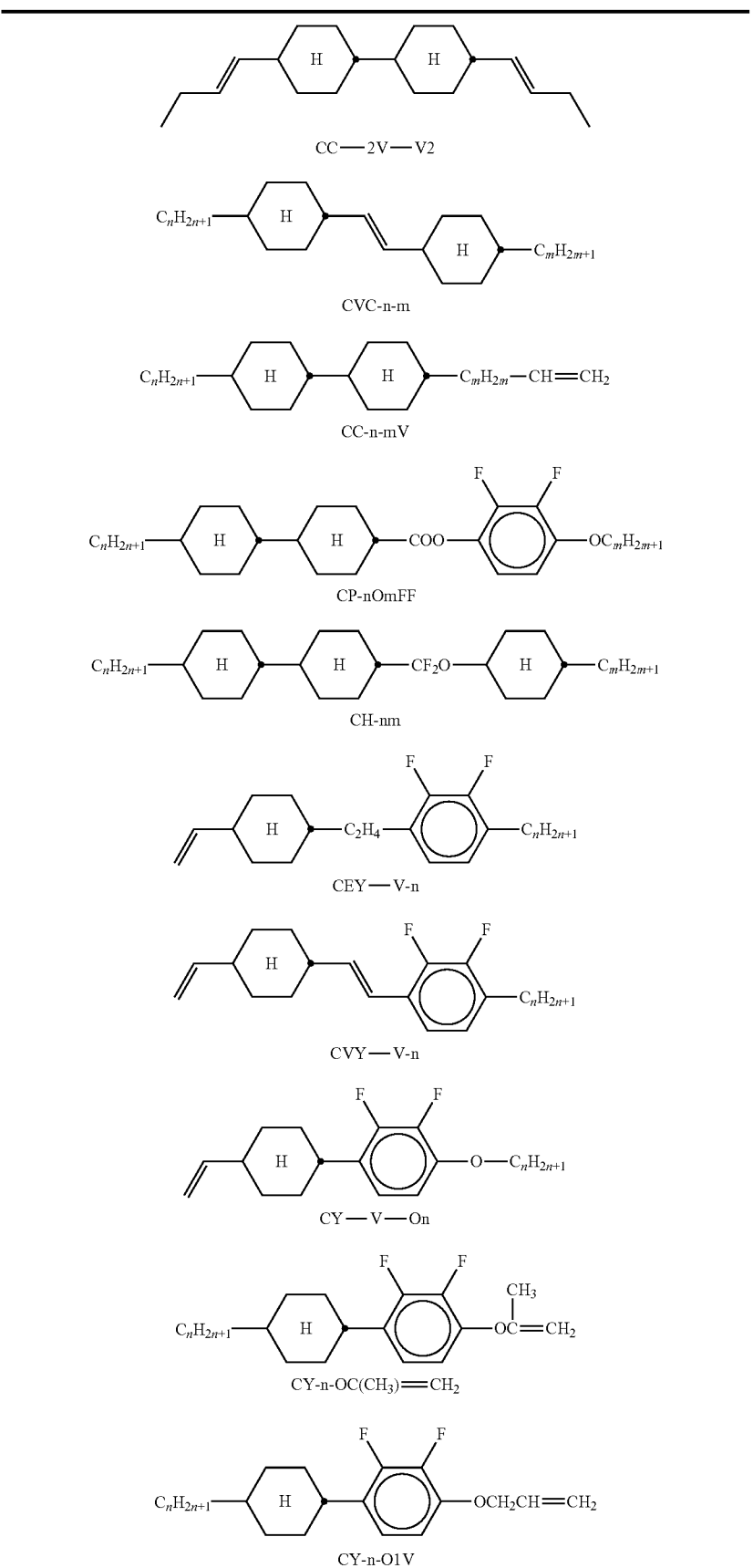

TABLE B-continued
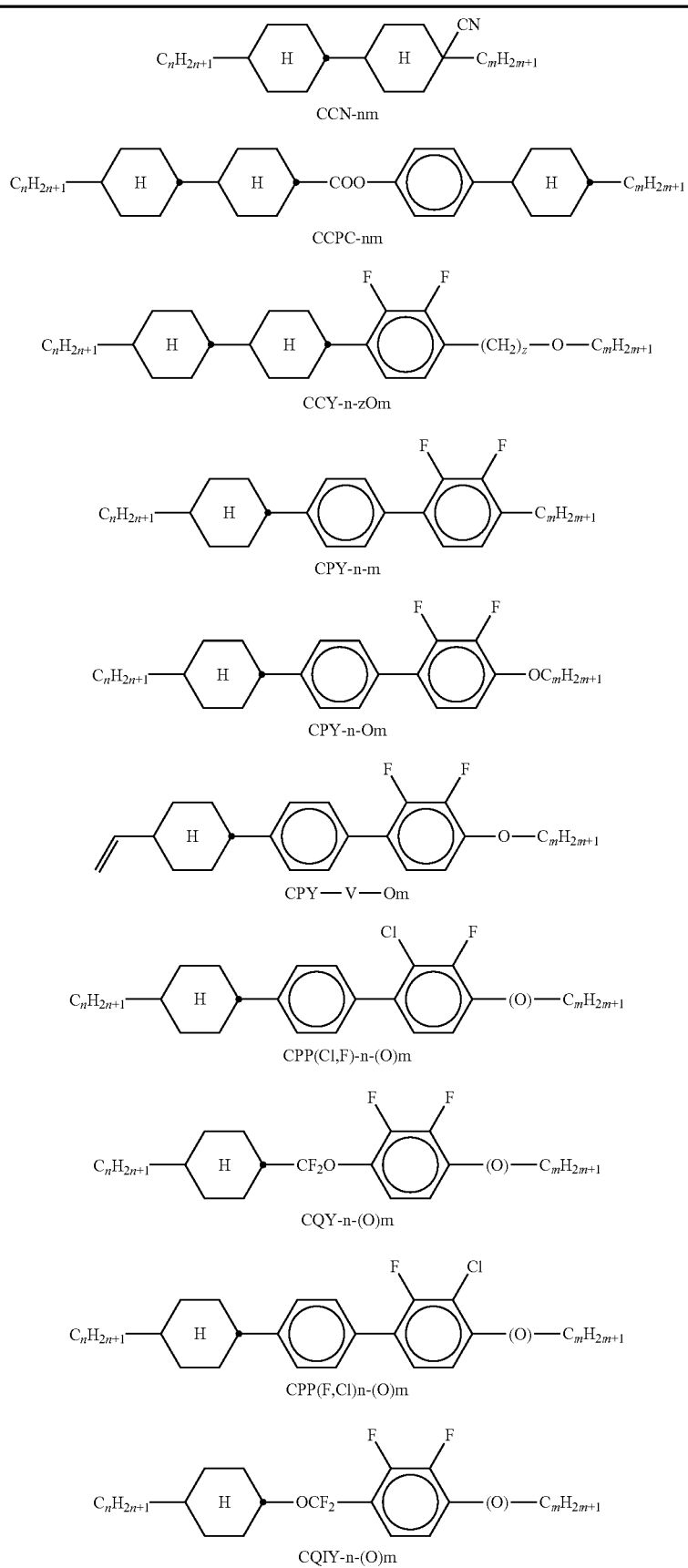

TABLE B-continued
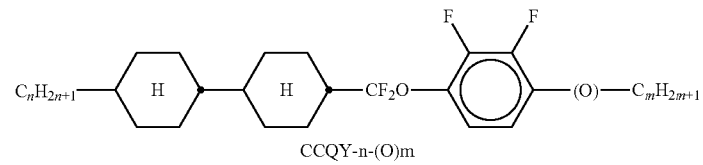
CCQY-n-(O)m
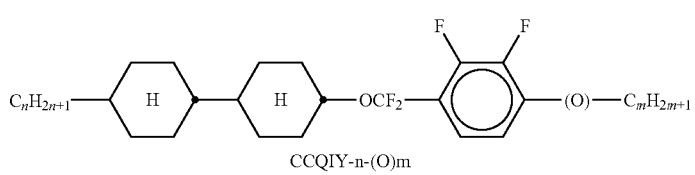
CCQIY-n-(O)m
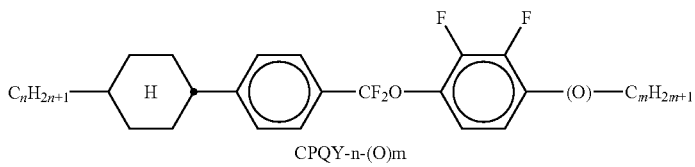
CPQY-n-(O)m
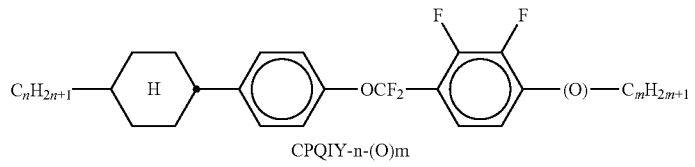
CPQIY-n-(O)m
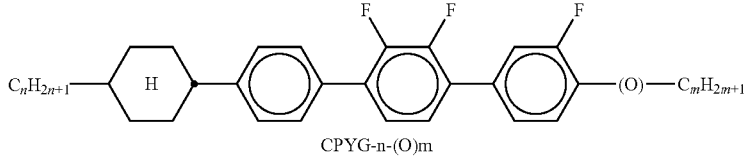
CPYG-n-(O)m
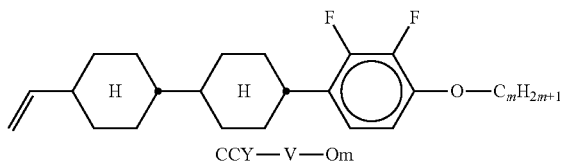
CCY—V—Om
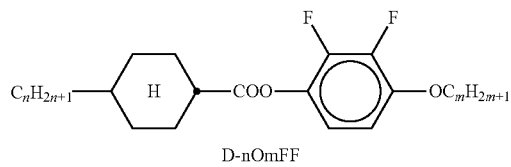
D-nOmFF
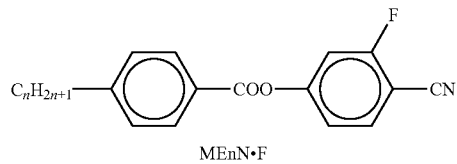
MEnN•F
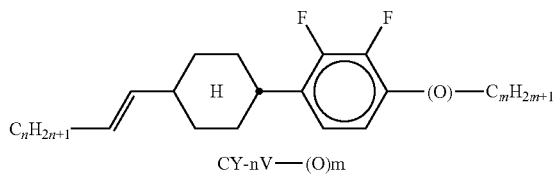
CY-nV—(O)m TABLE B-continued
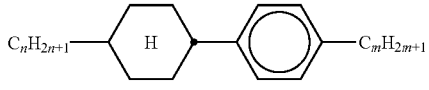
PCH-nm/CP-n-m
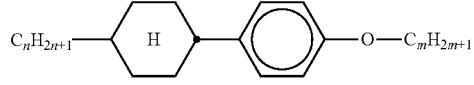
PCH-nOm/CP-n-Om
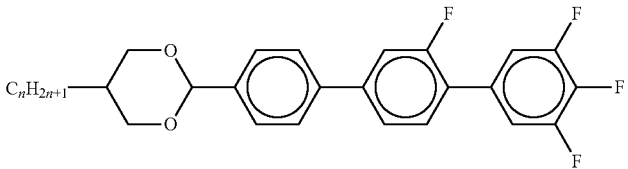
DPGU-n-F
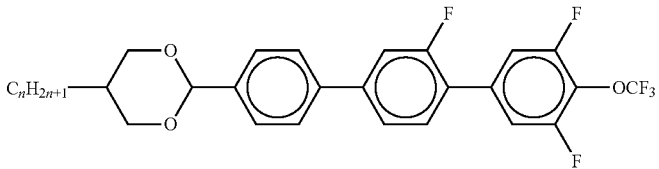
DPGU-n-OT
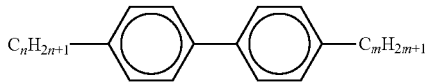
PP-n-m
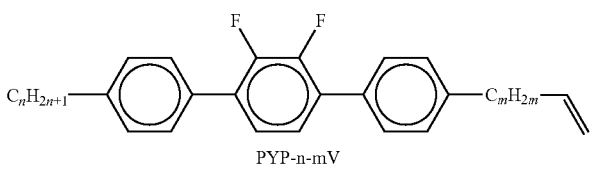
PYP-n-mV
CYLI-n-m
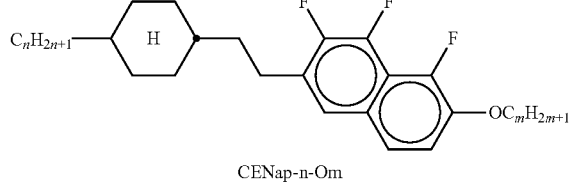
CENap-n-Om
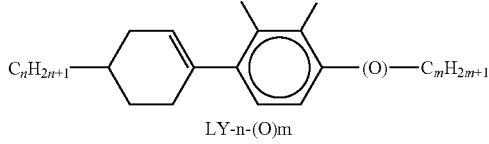
LY-n-(O)m TABLE B-continued
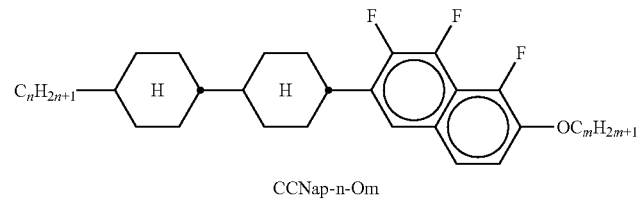
CCNap-n-Om
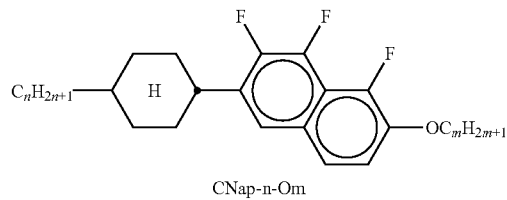
CNap-n-Om
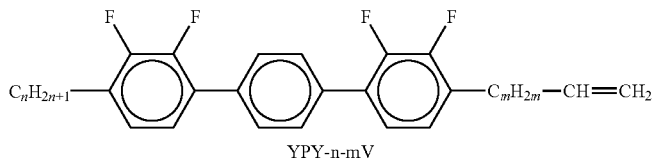
YPY-n-mV
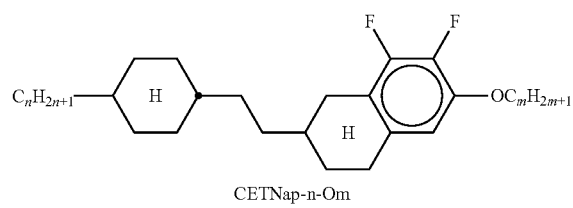
CETNap-n-Om
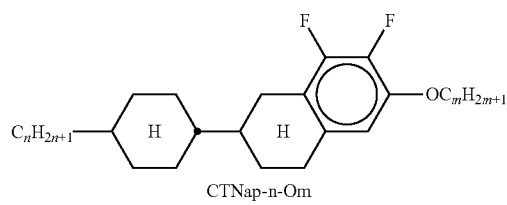
CTNap-n-Om
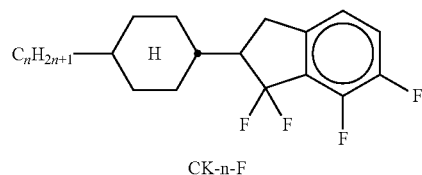
CK-n-F
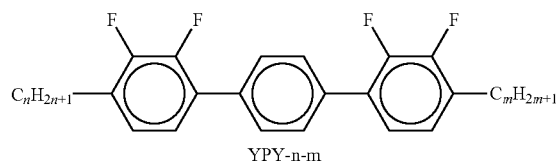
YPY-n-m
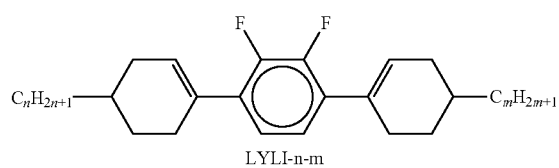
LYLI-n-m TABLE B-continued
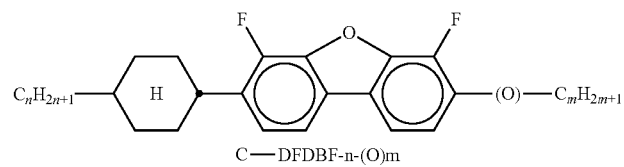
C—DFDBF-n-(O)m
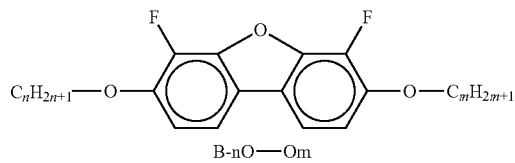
B-nO—Om
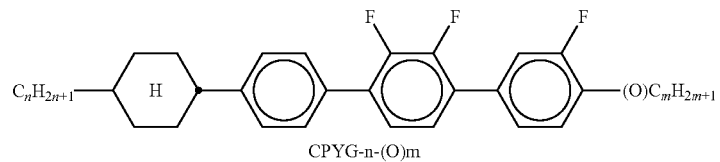
CPYG-n-(O)m
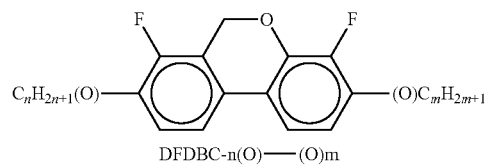
DFDBC-n(O)—(O)m
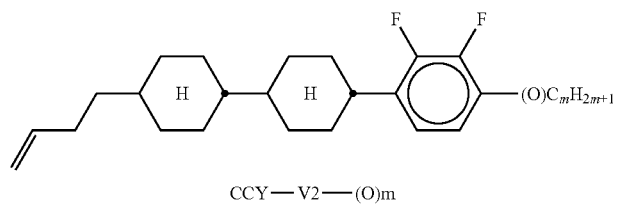
CCY—V2—(O)m
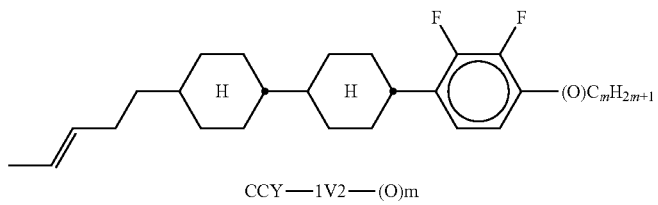
CCY—1V2—(O)m
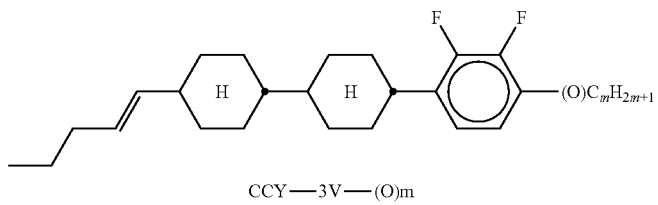
CCY—3V—(O)m
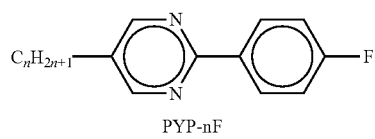
PYP-nF TABLE B-continued
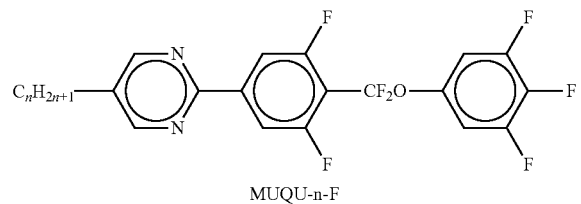
MUQU-n-F
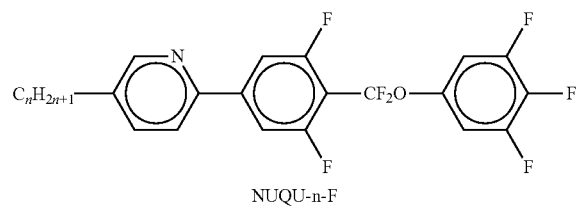
NUQU-n-F
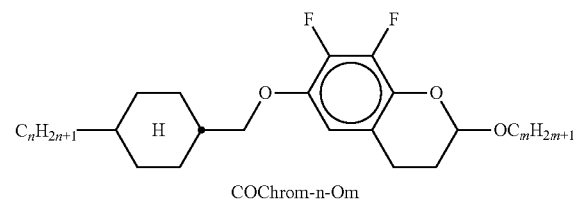
COChrom-n-Om
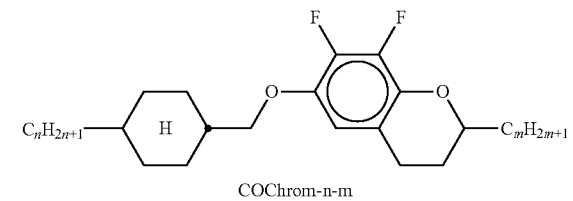
COChrom-n-m
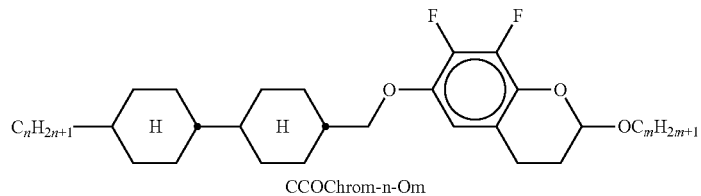
CCOChrom-n-Om
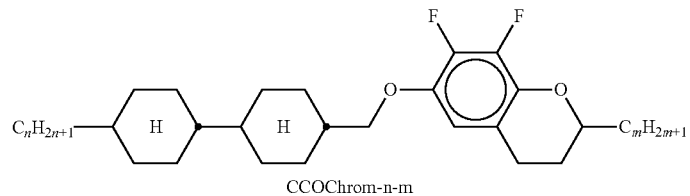
CCOChrom-n-m
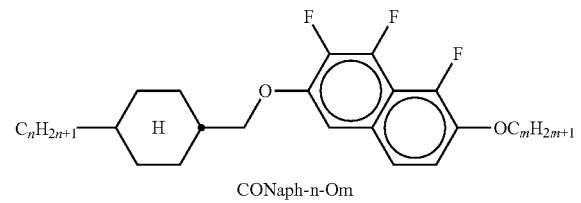
CONaph-n-Om
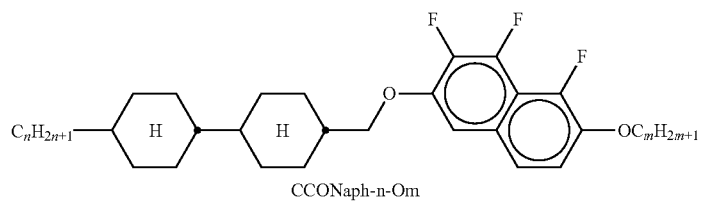
CCONaph-n-Om TABLE B-continued
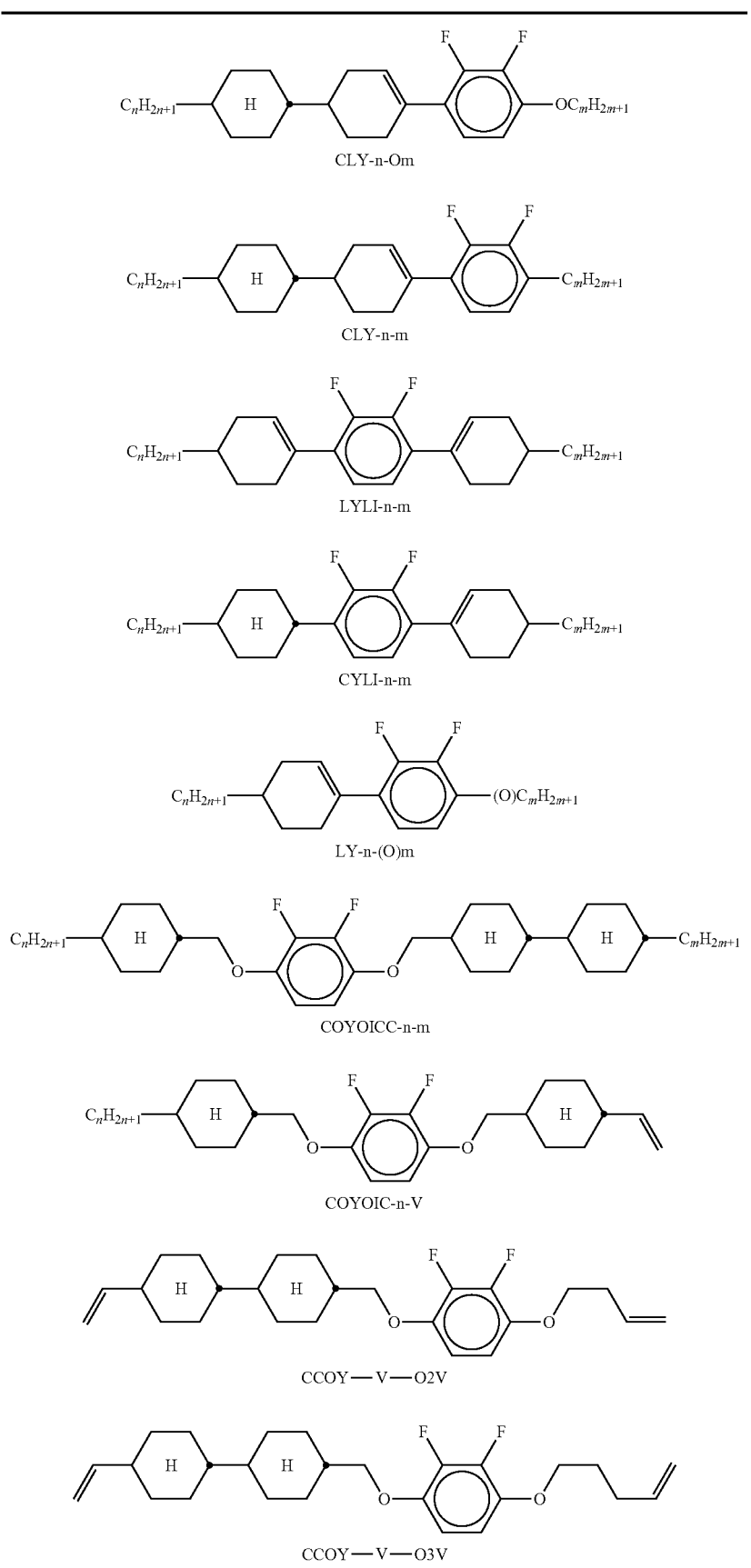

TABLE B-continued
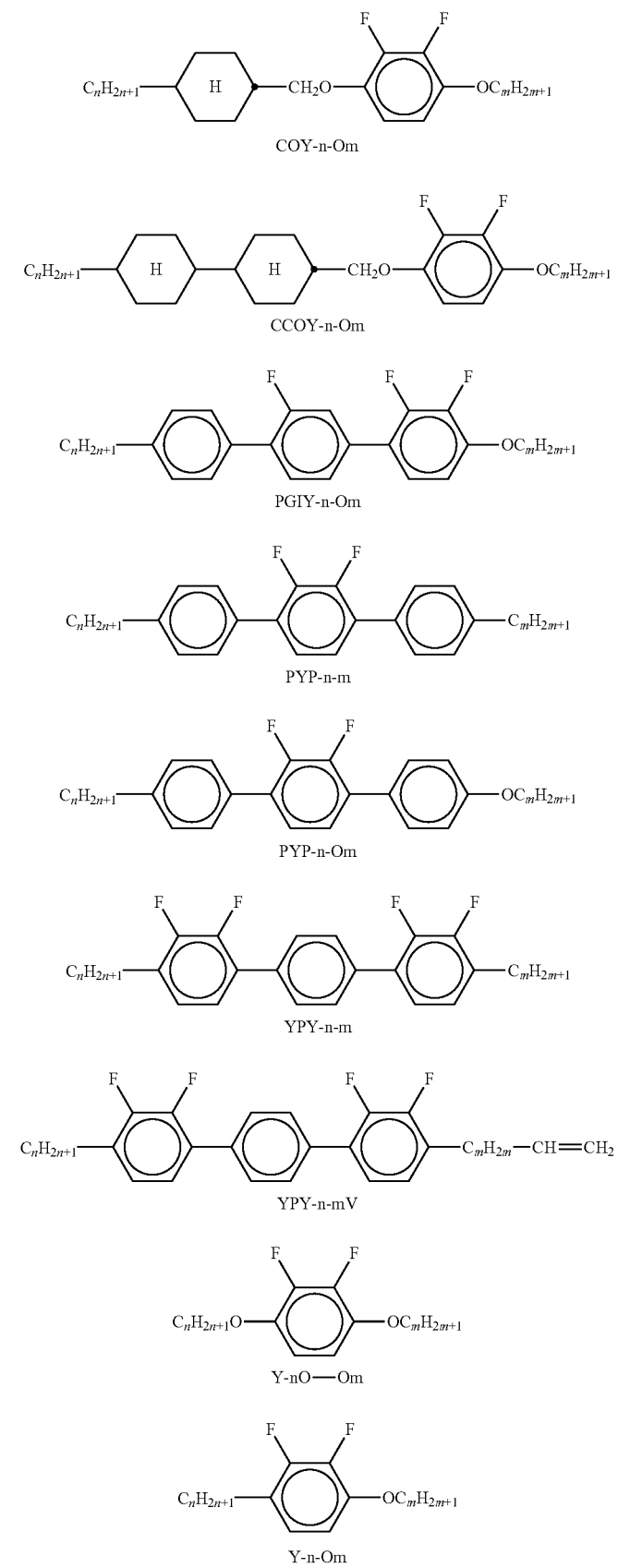

TABLE B-continued
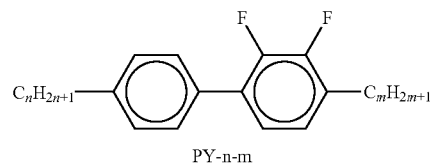
PY-n-m
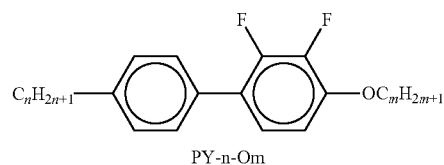
PY-n-Om
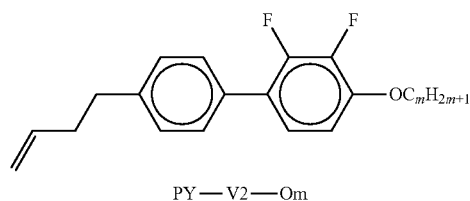
PY—V2—Om
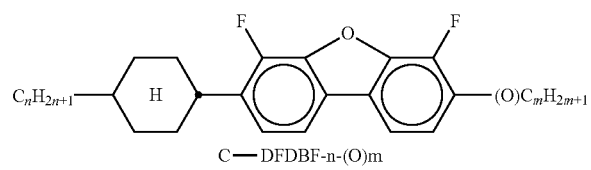
C—DFDBF-n-(O)m
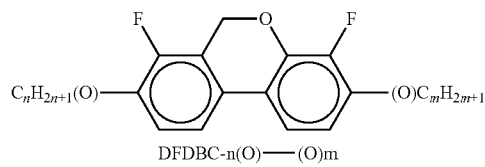
DFDBC-n(O)—(O)m
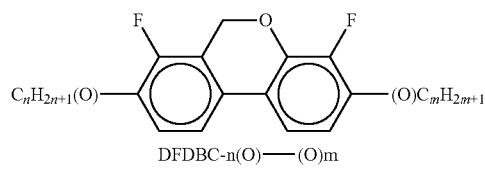
DFDBC-n(O)—(O)m
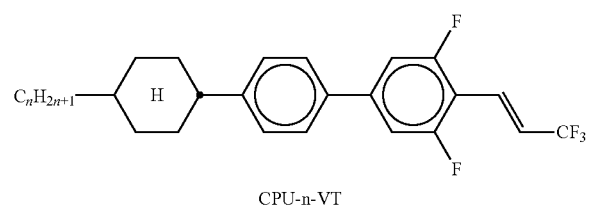
CPU-n-VT
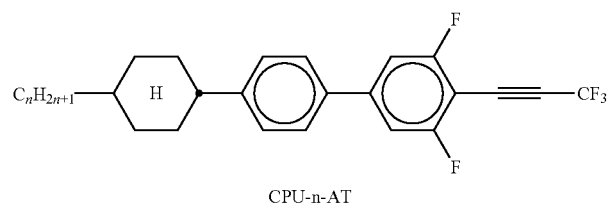
CPU-n-AT TABLE B-continued
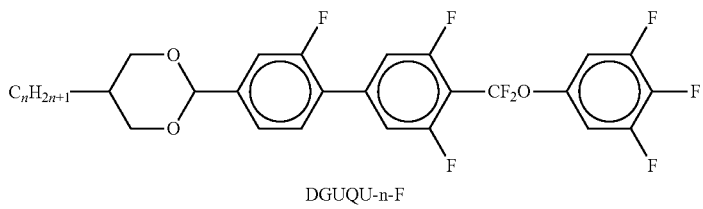
DGUQU-n-F
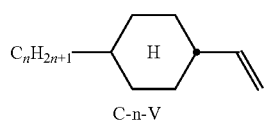
C-n-V
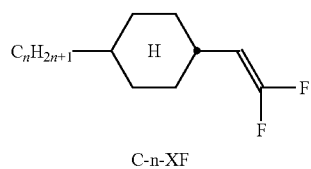
C-n-XF
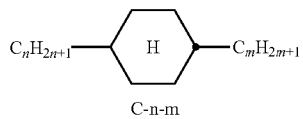
C-n-m
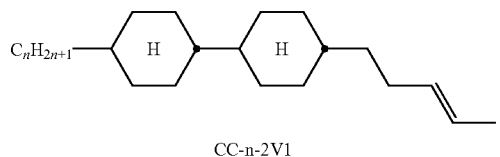
CC-n-2V1
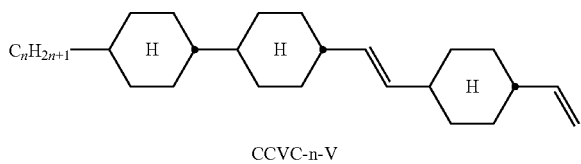
CCVC-n-V
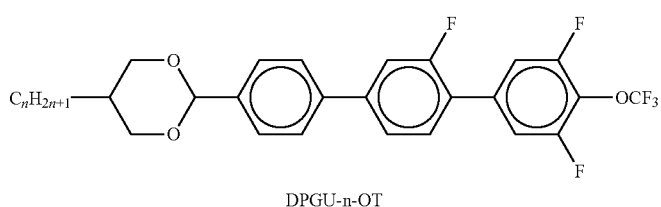
DPGU-n-OT
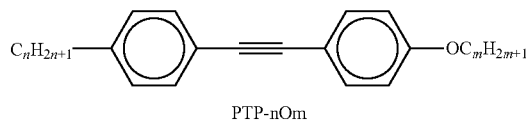
PTP-nOm
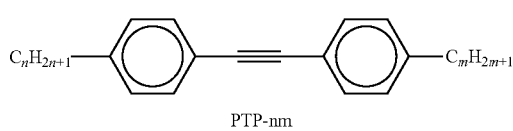
PTP-nm
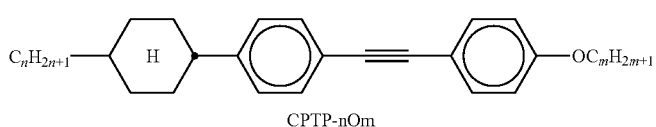
CPTP-nOm TABLE B-continued
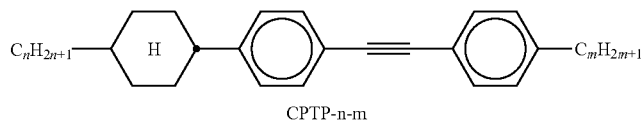
CPTP-n-m
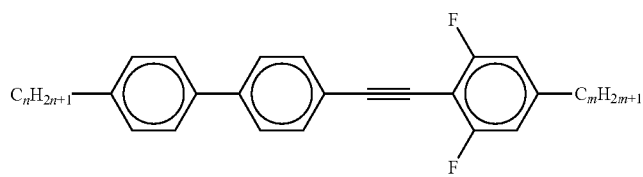
PPTUI-n-m
(n = 1-15; (O)$C_nH_{2n+1}$ means $C_nH_{2n+1}$ or $OC_nH_{2n+1}$)
Particular preference is given to liquid-crystalline mixtures which comprise at least one, two, three, four or more compounds from Table B besides one or more compounds of the formula I.
TABLE C
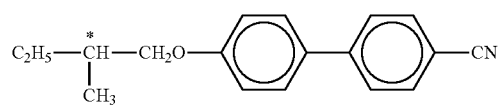
C 15
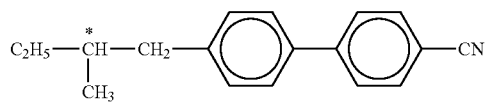
CB 15
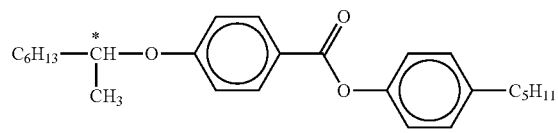
CM 21
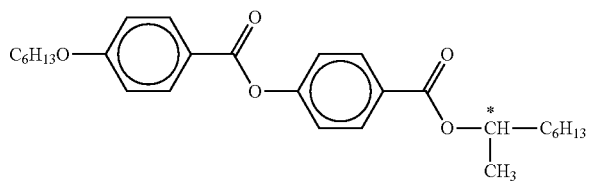
R/S-811
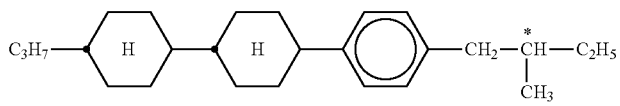
CM 44
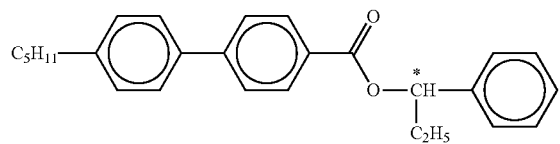
CM 45
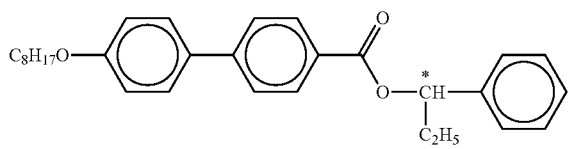
CM 47

TABLE C-continued

|  |  |
|---|---|
| (cholesteryl octanoate structure) | CN |
| (structure) | R/S-2011 |
| (structure) | R/S-3011 |
| (structure) | R/S-4011 |
| (binaphthyl structure) | R/S-5011 |
| (structure) | R/S-1011 |

Table C indicates possible dopants, which are generally added to the liquid-crystalline mixtures. The mixtures preferably comprise 0-10% by weight, in particular 0.01-5% by weight and particularly preferably 0.01-3% by weight, of dopants.

TABLE D

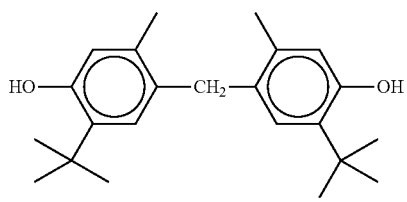

TABLE D-continued
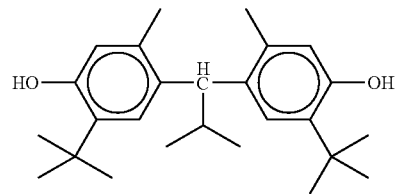
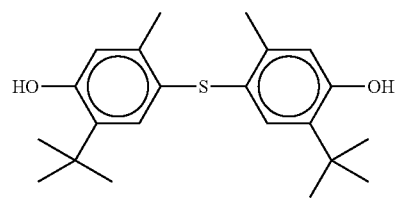
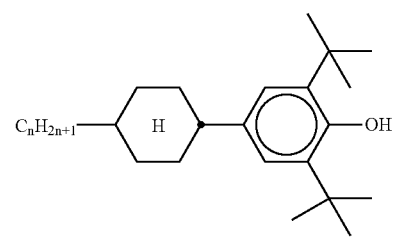
n = 1, 2, 3, 4, 5, 6 or 7
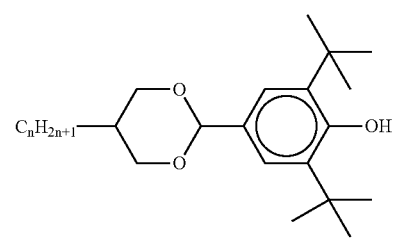
n = 1, 2, 3, 4, 5, 6 or 7
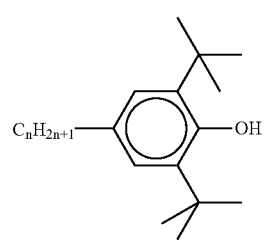
n = 1, 2, 3, 4, 5, 6 or 7
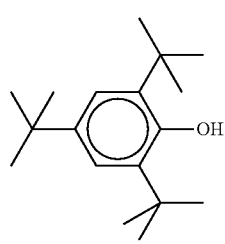

TABLE D-continued
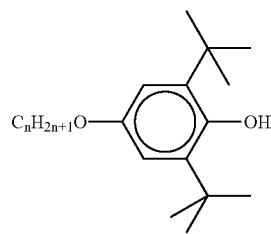
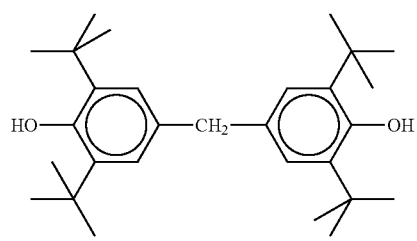
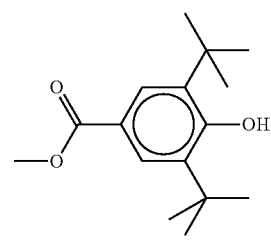
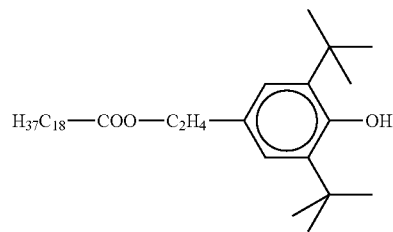
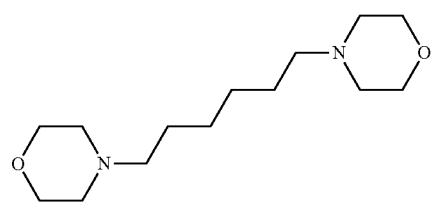 [SMILES: C(CCCN1CCOCC1)CCN1CCOCC1]

TABLE D-continued
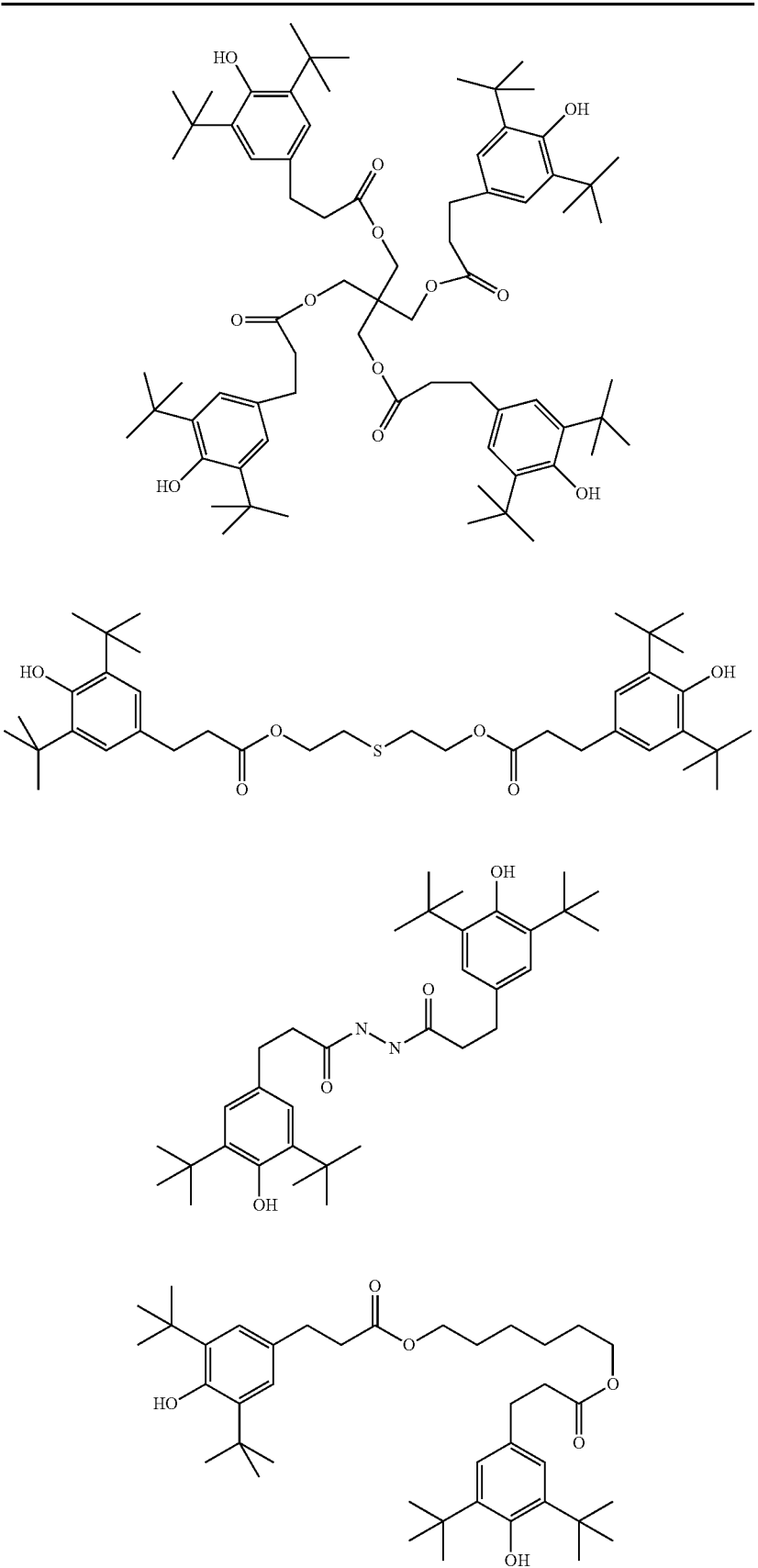

TABLE D-continued
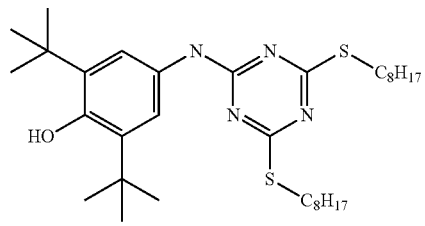
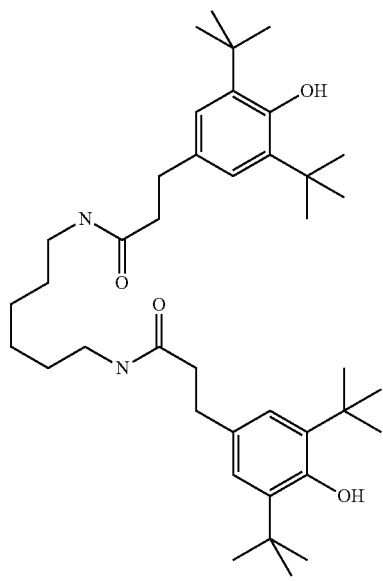 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
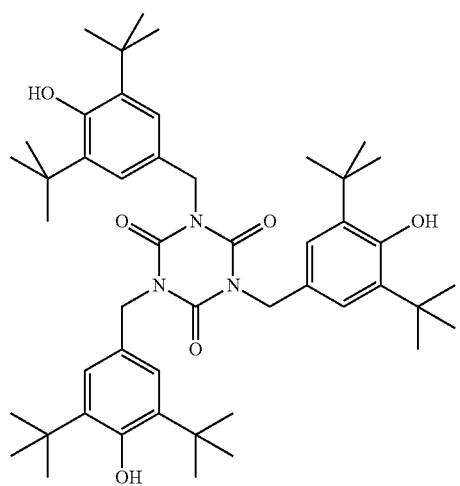 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
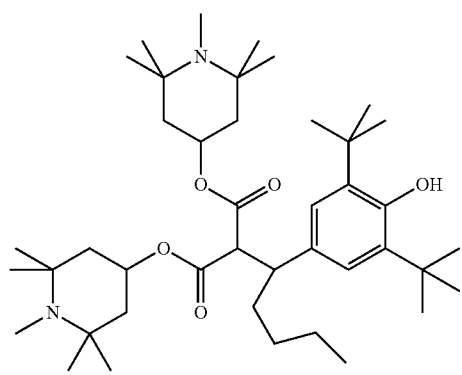 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
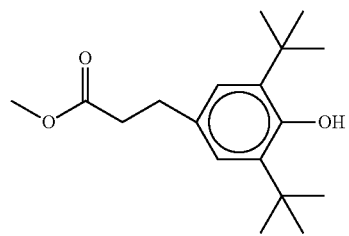
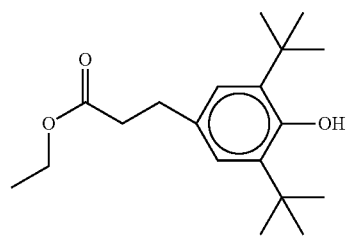
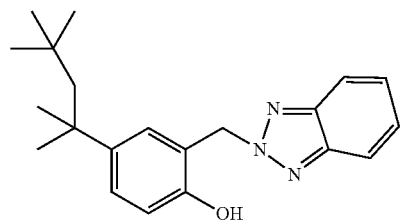 [SMILES: CC(C)(C)CC(C)(C)c1ccc(O)c(Cn2nc3ccccc3n2)c1]
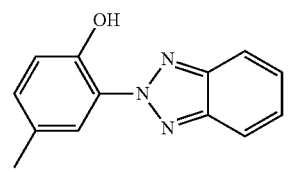 [SMILES: Cc1ccc(O)c(-n2nc3ccccc3n2)c1]
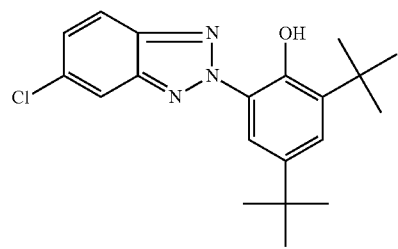 [SMILES: CC(C)(C)c1cc(-n2nc3ccc(Cl)cc3n2)c(O)c(C(C)(C)C)c1]
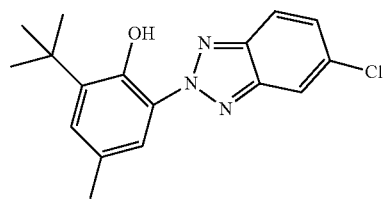 [SMILES: Cc1cc(-n2nc3ccc(Cl)cc3n2)c(O)c(C(C)(C)C)c1]

TABLE D-continued
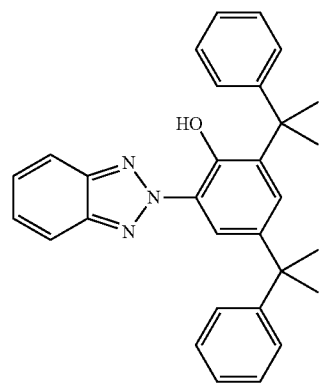 [SMILES: CC(C)(c1ccccc1)c1cc(-n2nc3ccccc3n2)c(O)c(C(C)(C)c2ccccc2)c1]
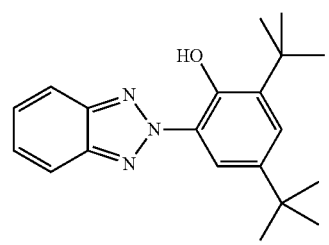 [SMILES: CC(C)(C)c1cc(-n2nc3ccccc3n2)c(O)c(C(C)(C)C)c1]
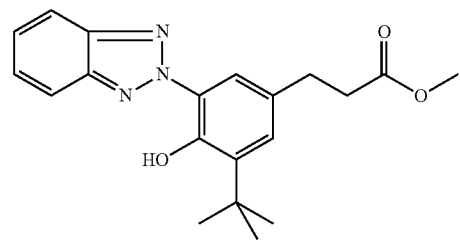 [SMILES: COC(=O)CCc1cc(-n2nc3ccccc3n2)c(O)c(C(C)(C)C)c1]
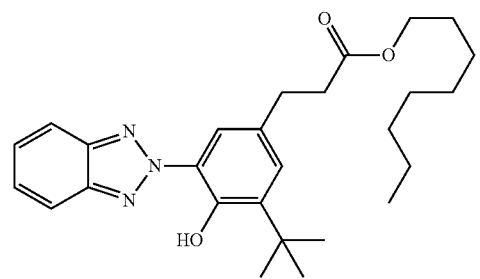 [SMILES: CCCCCCCCOC(=O)CCc1cc(-n2nc3ccccc3n2)c(O)c(C(C)(C)C)c1]

TABLE D-continued
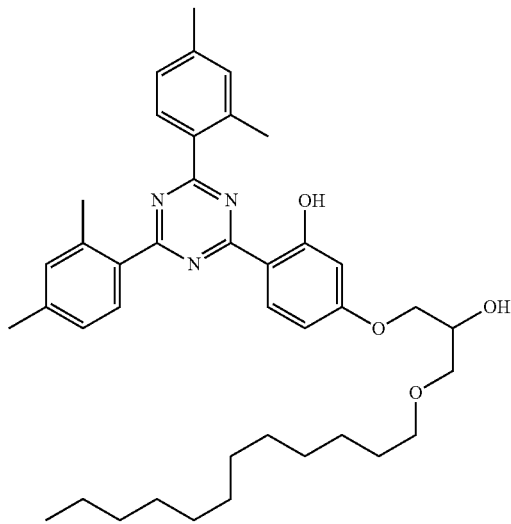 [SMILES: CCCCCCCCCCCCOCC(O)COc1ccc(-c2nc(-c3ccc(C)cc3C)nc(-c3ccc(C)cc3C)n2)c(O)c1]
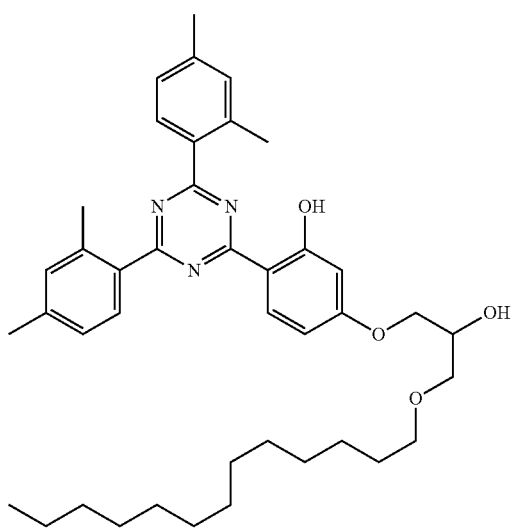 [SMILES: CCCCCCCCCCCCCOCC(O)COc1ccc(-c2nc(-c3ccc(C)cc3C)nc(-c3ccc(C)cc3C)n2)c(O)c1]
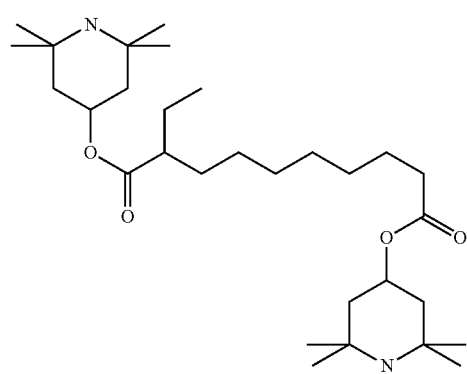

TABLE D-continued
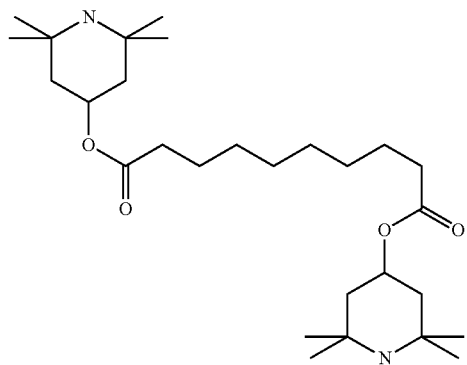
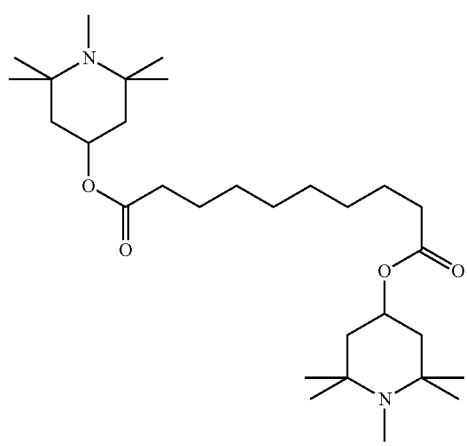
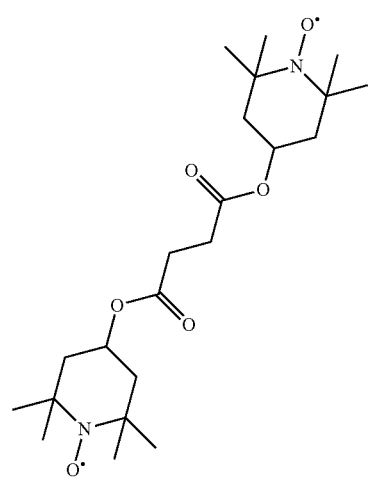

TABLE D-continued
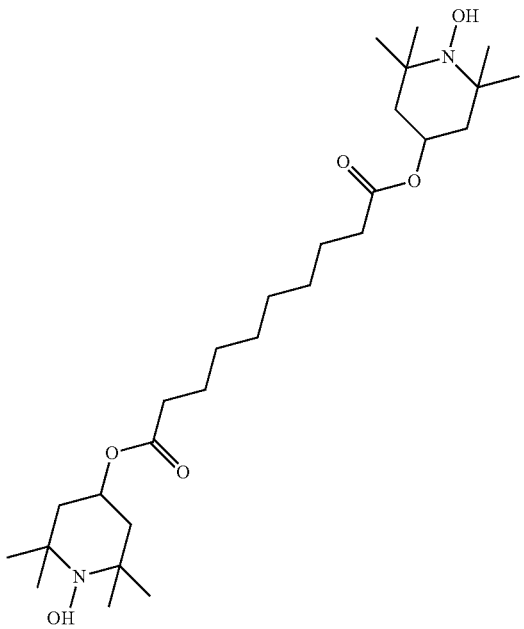
(n = 1-12)
Stabilisers, which can be added, for example, to the liquid-crystalline mixtures in amounts of 0-10% by weight, are shown below.
Suitable polymerisable compounds (reactive mesogens) for use in the mixtures according to the invention, preferably in PSA and PS-VA applications or PS-IPS/FFS applications, are shown below in Table E:
TABLE E
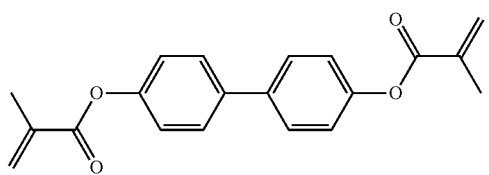
RM-1
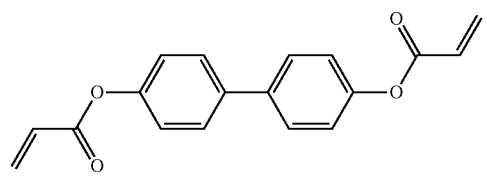 [SMILES: C=CC(=O)Oc1ccc(-c2ccc(OC(=O)C=C)cc2)cc1]
RM-2
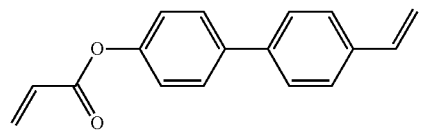 [SMILES: C=CC(=O)Oc1ccc(-c2ccc(C=C)cc2)cc1]
RM-3
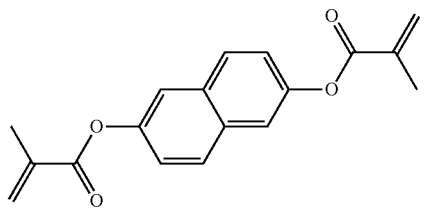 [SMILES: C=C(C)C(=O)Oc1ccc2cc(OC(=O)C(=C)C)ccc2c1]
RM-4

TABLE E-continued
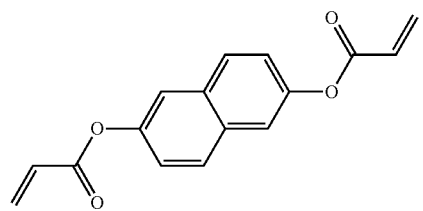 [SMILES: C=CC(=O)Oc1ccc2cc(OC(=O)C=C)ccc2c1]
RM-5
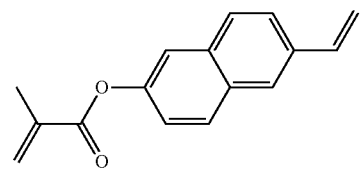 [SMILES: C=Cc1ccc2cc(OC(=O)C(=C)C)ccc2c1]
RM-6
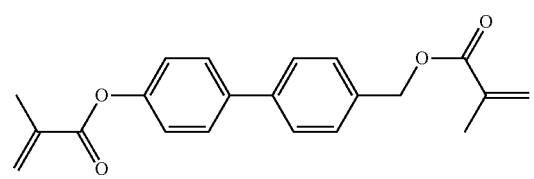 [SMILES: C=C(C)C(=O)OCc1ccc(-c2ccc(OC(=O)C(=C)C)cc2)cc1]
RM-7
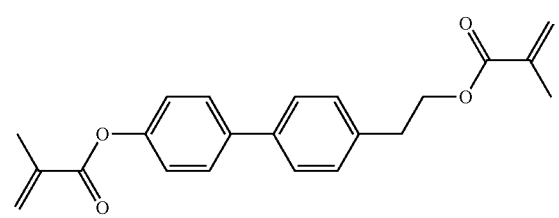 [SMILES: C=C(C)C(=O)OCCc1ccc(-c2ccc(OC(=O)C(=C)C)cc2)cc1]
RM-8
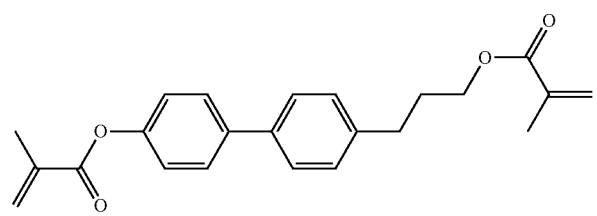 [SMILES: C=C(C)C(=O)OCCCc1ccc(-c2ccc(OC(=O)C(=C)C)cc2)cc1]
RM-9
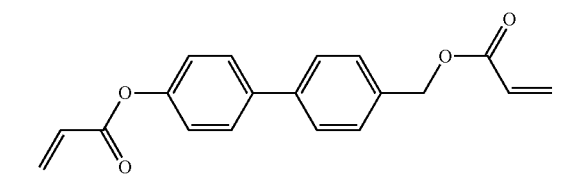 [SMILES: C=CC(=O)OCc1ccc(-c2ccc(OC(=O)C=C)cc2)cc1]
RM-10
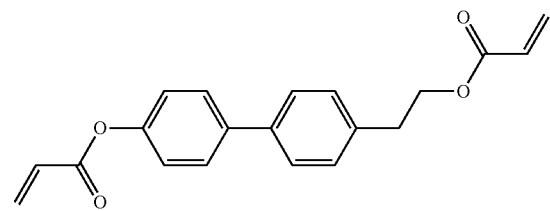 [SMILES: C=CC(=O)OCCc1ccc(-c2ccc(OC(=O)C=C)cc2)cc1]
RM-11
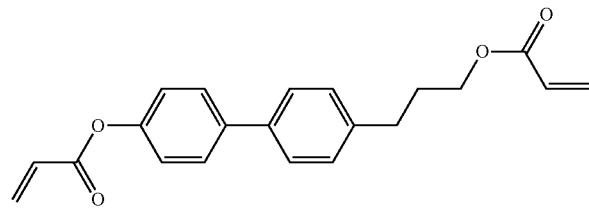 [SMILES: C=CC(=O)OCCCc1ccc(-c2ccc(OC(=O)C=C)cc2)cc1]
RM-12

TABLE E-continued
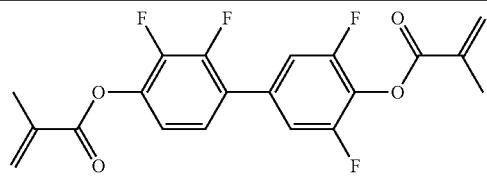 RM-13
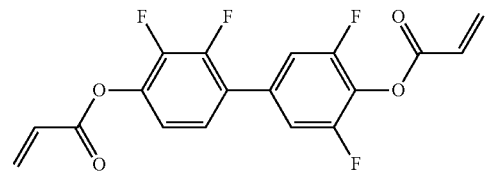 RM-14
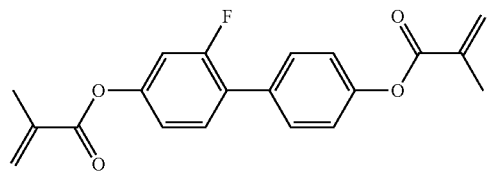 [SMILES: C=C(C)C(=O)Oc1ccc(-c2ccc(OC(=O)C(=C)C)cc2F)cc1] RM-15
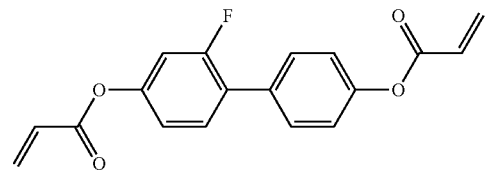 [SMILES: C=CC(=O)Oc1ccc(-c2ccc(OC(=O)C=C)cc2F)cc1] RM-16
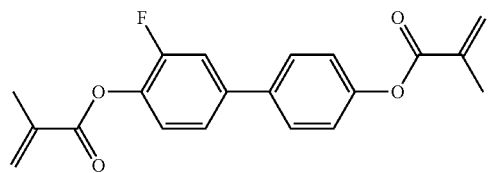 [SMILES: C=C(C)C(=O)Oc1ccc(-c2ccc(OC(=O)C(=C)C)c(F)c2)cc1] RM-17
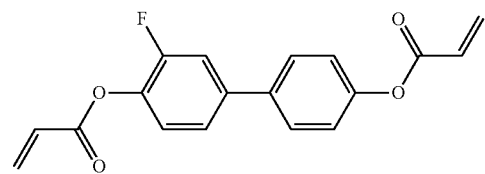 RM-18
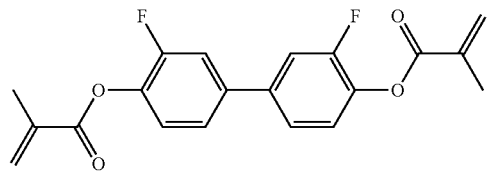 [SMILES: C=C(C)C(=O)Oc1ccc(-c2ccc(OC(=O)C(=C)C)c(F)c2)cc1F] RM-19
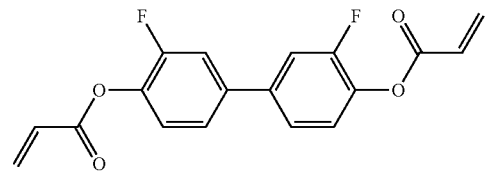 RM-20
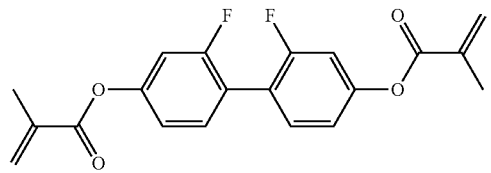 RM-21

TABLE E-continued

| | |
|---|---|
| (structure) | RM-22 |
| (structure) | RM-23 |
| (structure) | RM-24 |
| (structure) | RM-25 |
| (structure) | RM-26 |
| (structure) | RM-27 |
| (structure) | RM-28 |
| (structure) | RM-29 |
| (structure) | RM-30 |

TABLE E-continued
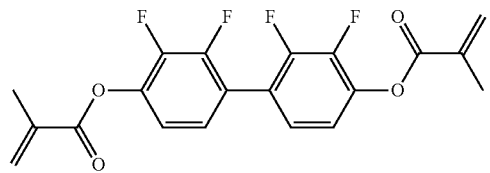 [SMILES: C=C(C)C(=O)Oc1ccc(-c2ccc(OC(=O)C(=C)C)c(F)c2)c(F)c1] RM-31
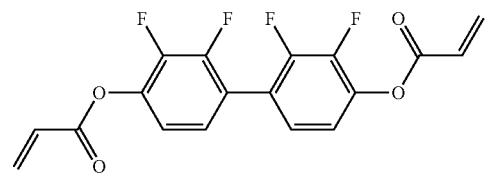 [SMILES: C=CC(=O)Oc1ccc(-c2ccc(OC(=O)C=C)c(F)c2F)c(F)c1F] RM-32
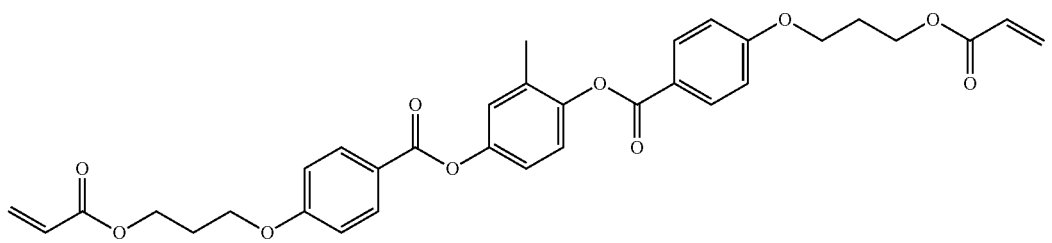 [SMILES: C=CC(=O)OCCCOc1ccc(C(=O)Oc2ccc(OC(=O)c3ccc(OCCCOC(=O)C=C)cc3)c(C)c2)cc1] RM-33
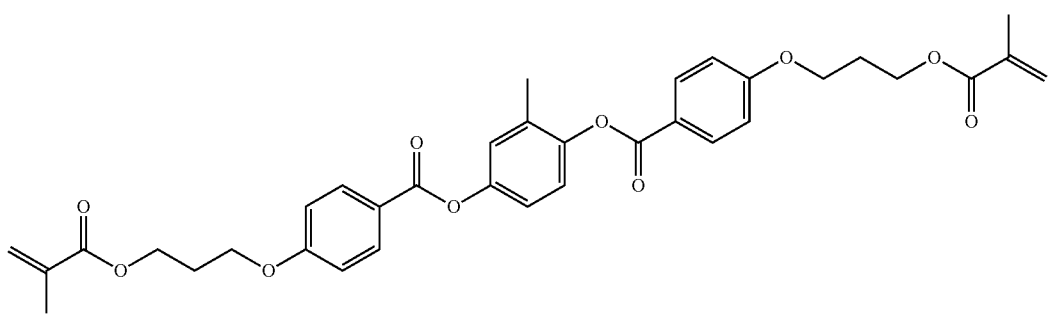 [SMILES: C=C(C)C(=O)OCCCOc1ccc(C(=O)Oc2ccc(OC(=O)c3ccc(OCCCOC(=O)C(=C)C)cc3)c(C)c2)cc1] RM-34
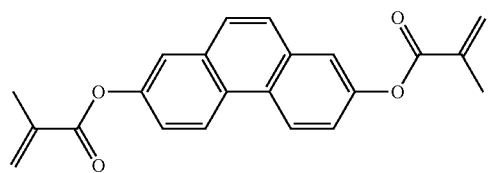 RM-35
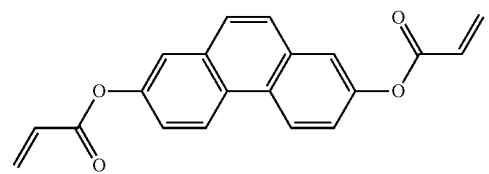 [SMILES: C=C(C)C(=O)Oc1ccc2c(ccc3cc(OC(=O)C(=C)C)ccc32)c1] RM-36
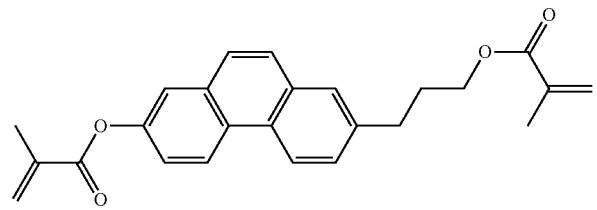 [SMILES: C=C(C)C(=O)OCCCc1ccc2c(ccc3cc(OC(=O)C(=C)C)ccc32)c1] RM-37

TABLE E-continued
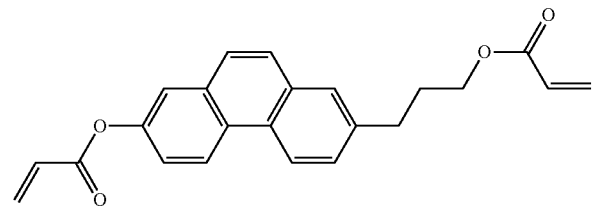 [SMILES: C=CC(=O)OCCCc1ccc2c(ccc3cc(OC(=O)C=C)ccc32)c1] RM-38
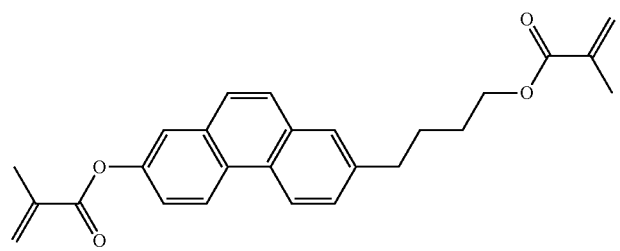 [SMILES: C=C(C)C(=O)OCCCCc1ccc2c(ccc3cc(OC(=O)C(=C)C)ccc32)c1] RM-39
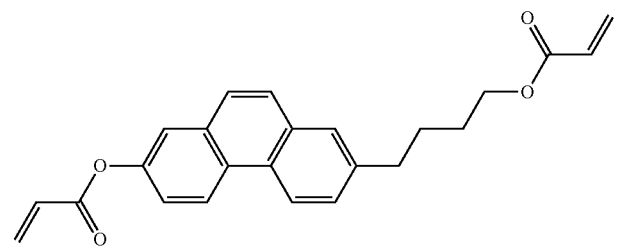 [SMILES: C=CC(=O)OCCCCc1ccc2c(ccc3cc(OC(=O)C=C)ccc32)c1] RM-40
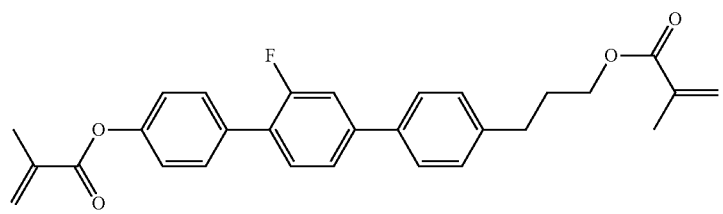 [SMILES: C=C(C)C(=O)OCCCc1ccc(-c2ccc(-c3ccc(OC(=O)C(=C)C)cc3)c(F)c2)cc1] RM-41
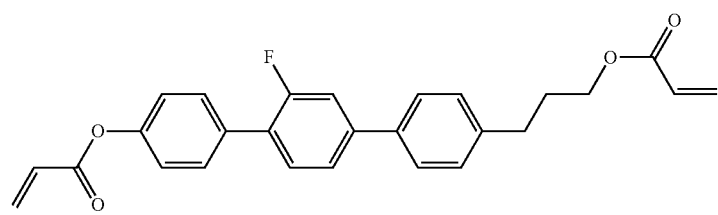 [SMILES: C=CC(=O)OCCCc1ccc(-c2ccc(-c3ccc(OC(=O)C=C)cc3)c(F)c2)cc1] RM-42
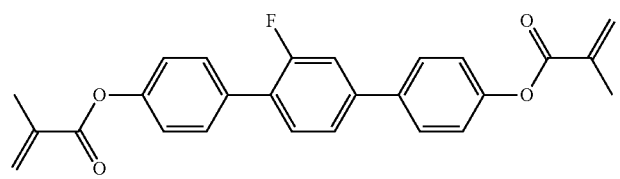 RM-43
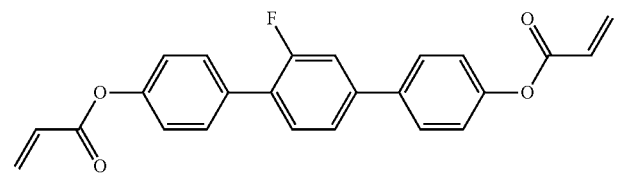 RM-44

TABLE E-continued
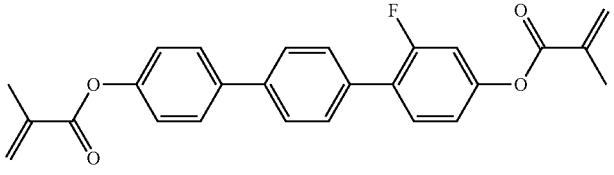 RM-45
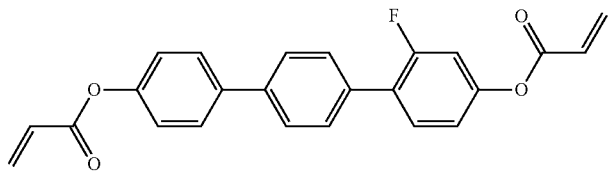 RM-46
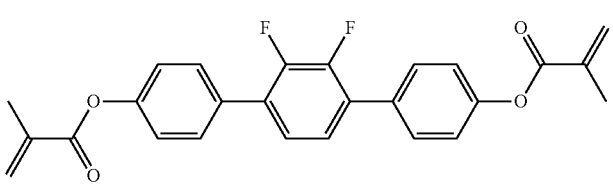 [SMILES: C=C(C)C(=O)Oc1ccc(-c2ccc(-c3ccc(OC(=O)C(=C)C)cc3)c(F)c2)cc1] RM-47
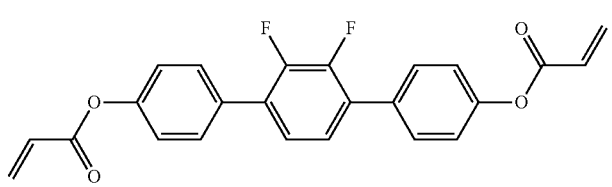 [SMILES: C=CC(=O)Oc1ccc(-c2ccc(-c3ccc(OC(=O)C=C)cc3)c(F)c2)cc1] RM-48
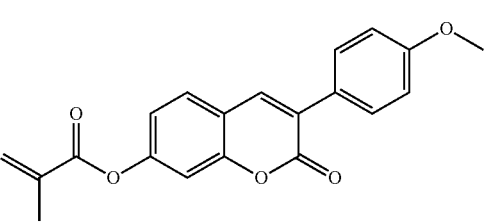 [SMILES: C=C(C)C(=O)Oc1ccc2cc(-c3ccc(OC)cc3)c(=O)oc2c1] RM-49
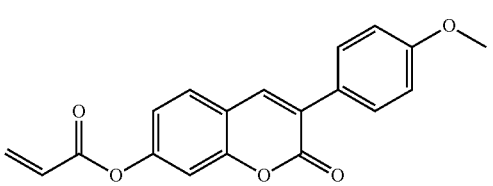 [SMILES: C=CC(=O)Oc1ccc2cc(-c3ccc(OC)cc3)c(=O)oc2c1] RM-50
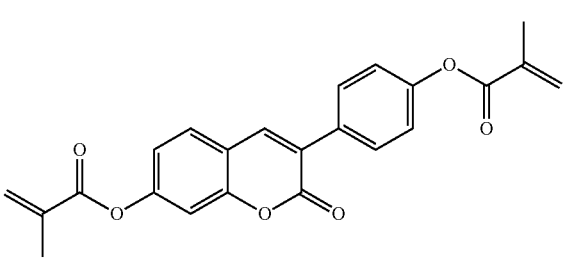 [SMILES: C=C(C)C(=O)Oc1ccc(-c2cc3ccc(OC(=O)C(=C)C)cc3oc2=O)cc1] RM-51
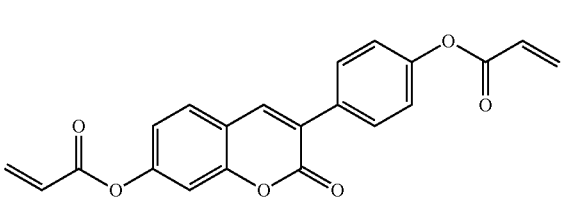 [SMILES: C=CC(=O)Oc1ccc(-c2cc3ccc(OC(=O)C=C)cc3oc2=O)cc1] RM-52

TABLE E-continued
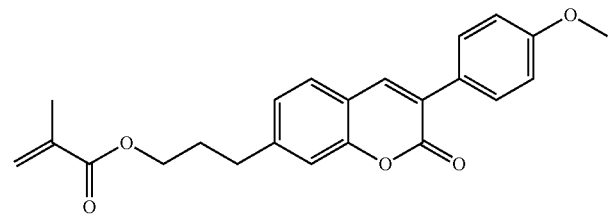 [SMILES: C=C(C)C(=O)OCCCc1ccc2cc(-c3ccc(OC)cc3)c(=O)oc2c1] RM-53
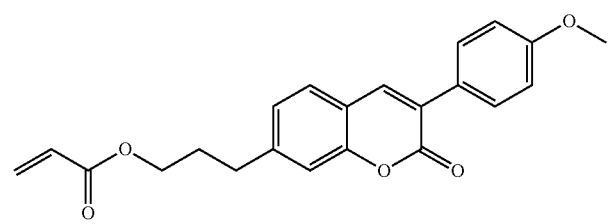 [SMILES: C=CC(=O)OCCCc1ccc2cc(-c3ccc(OC)cc3)c(=O)oc2c1] RM-54
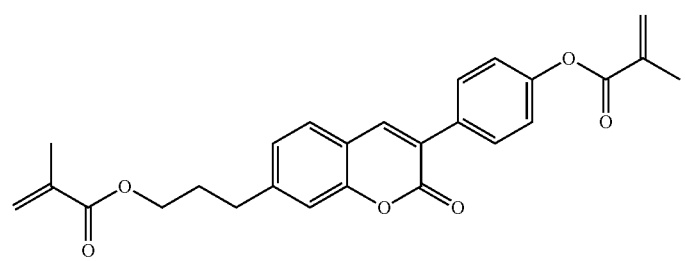 [SMILES: C=C(C)C(=O)OCCCc1ccc2cc(-c3ccc(OC(=O)C(=C)C)cc3)c(=O)oc2c1] RM-55
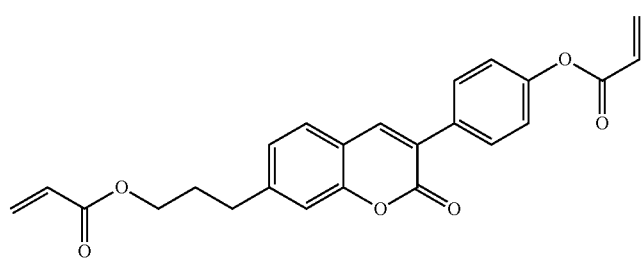 [SMILES: C=CC(=O)OCCCc1ccc2cc(-c3ccc(OC(=O)C=C)cc3)c(=O)oc2c1] RM-56
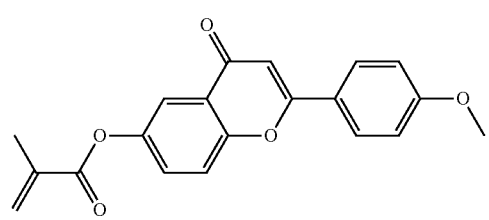 [SMILES: C=C(C)C(=O)Oc1ccc2oc(-c3ccc(OC)cc3)cc(=O)c2c1] RM-57
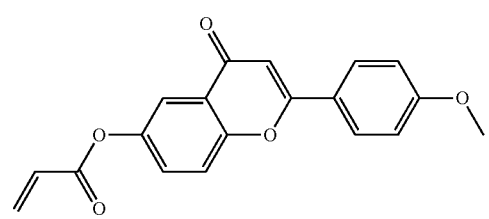 [SMILES: C=CC(=O)Oc1ccc2oc(-c3ccc(OC)cc3)cc(=O)c2c1] RM-58
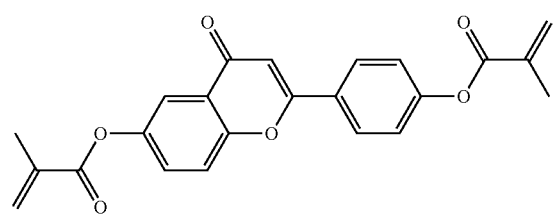 [SMILES: C=C(C)C(=O)Oc1ccc(-c2cc(=O)c3cc(OC(=O)C(=C)C)ccc3o2)cc1] RM-59

TABLE E-continued
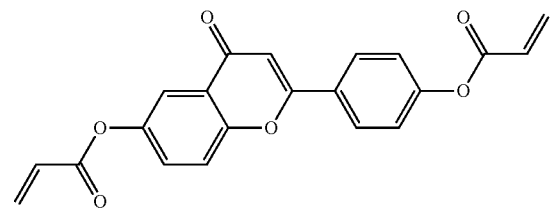 [SMILES: C=CC(=O)Oc1ccc(-c2cc(=O)c3cc(OC(=O)C=C)ccc3o2)cc1]
RM-60
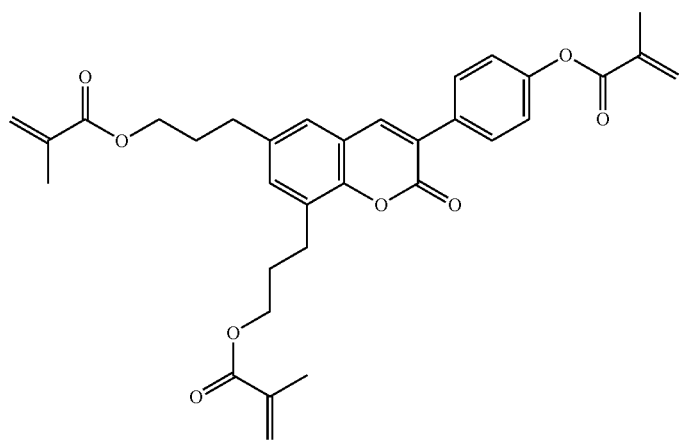 [SMILES: C=C(C)C(=O)OCCCc1cc(CCCOC(=O)C(=C)C)c2oc(=O)c(-c3ccc(OC(=O)C(=C)C)cc3)cc2c1]
RM-61
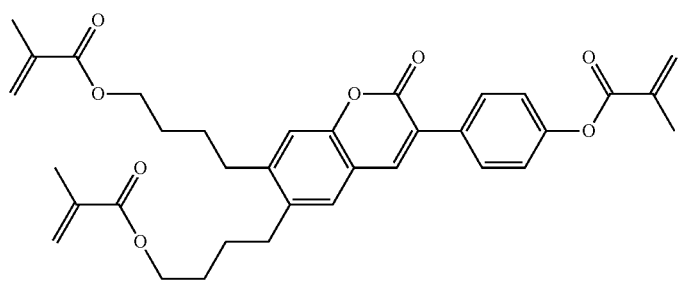 [SMILES: C=C(C)C(=O)OCCCCc1cc2cc(-c3ccc(OC(=O)C(=C)C)cc3)c(=O)oc2cc1CCCCOC(=O)C(=C)C]
RM-62
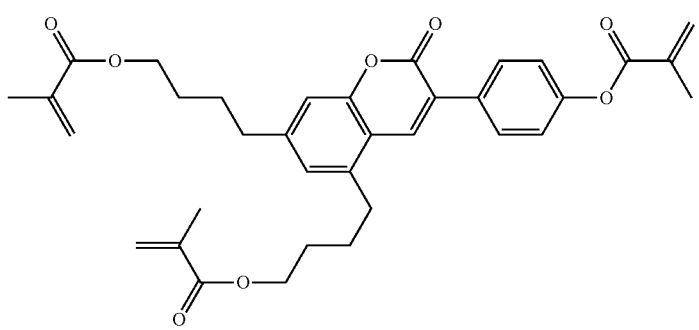 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
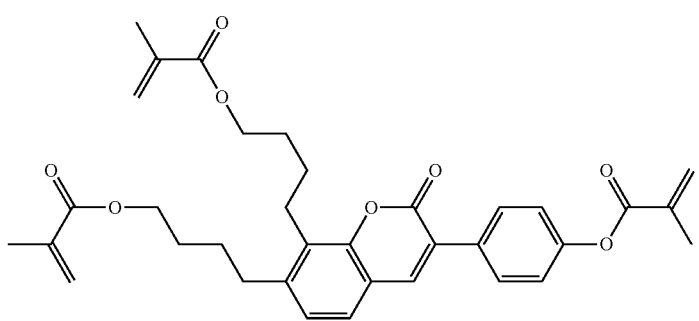 [SMILES: C=C(C)C(=O)OCCCCc1ccc2cc(-c3ccc(OC(=O)C(=C)C)cc3)c(=O)oc2c1CCCCOC(=O)C(=C)C]
RM-64

TABLE E-continued
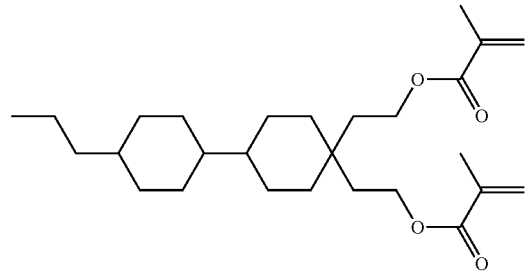 [SMILES: C=C(C)C(=O)OCCC1(CCOC(=O)C(=C)C)CCC(C2CCC(CCC)CC2)CC1]
RM-65
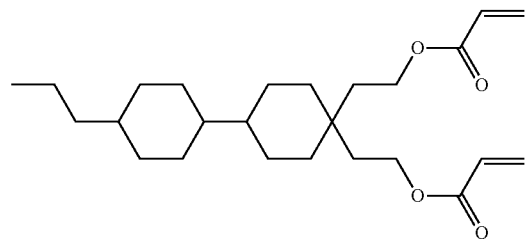 [SMILES: C=CC(=O)OCCC1(CCOC(=O)C=C)CCC(C2CCC(CCC)CC2)CC1]
RM-66
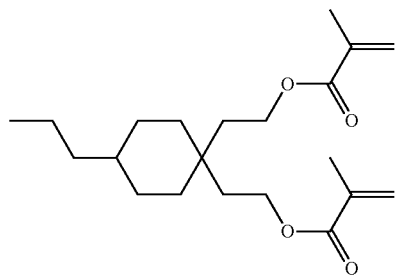 [SMILES: C=C(C)C(=O)OCCC1(CCOC(=O)C(=C)C)CCC(CCC)CC1]
RM-67
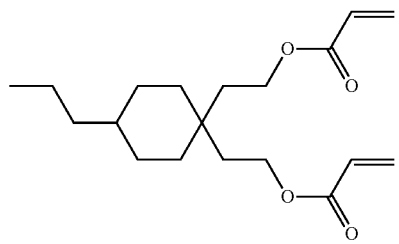 [SMILES: C=CC(=O)OCCC1(CCOC(=O)C=C)CCC(CCC)CC1]
RM-68
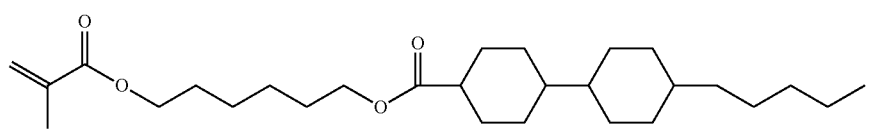 [SMILES: C=C(C)C(=O)OCCCCCCOC(=O)C1CCC(C2CCC(CCCCC)CC2)CC1]
RM-69
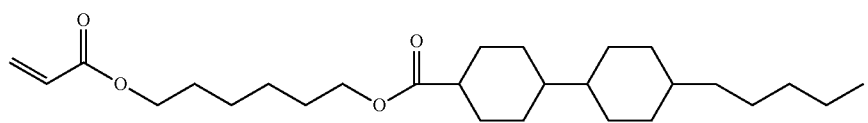 [SMILES: C=CC(=O)OCCCCCCOC(=O)C1CCC(C2CCC(CCCCC)CC2)CC1]
RM-70
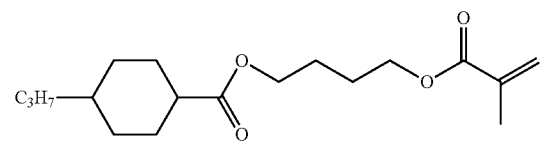
RM-71
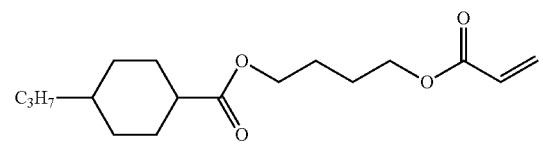
RM-72

TABLE E-continued
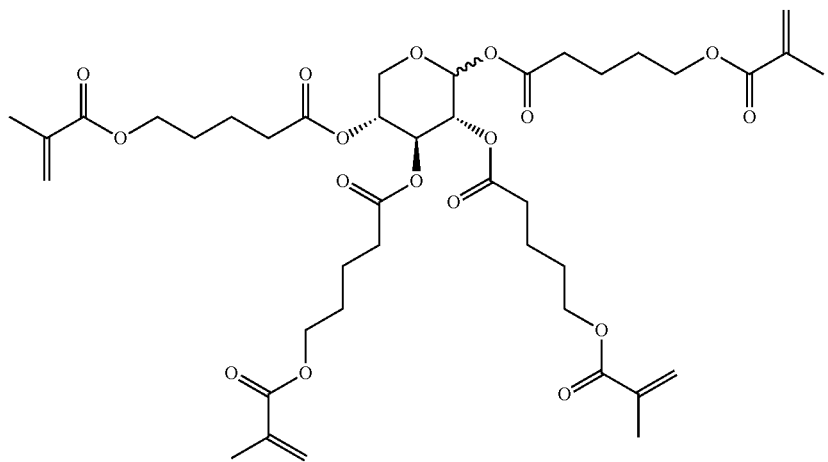 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-73
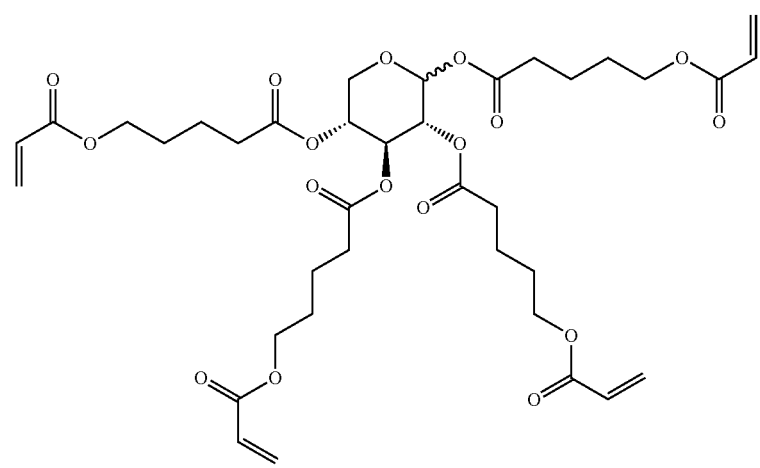 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-74
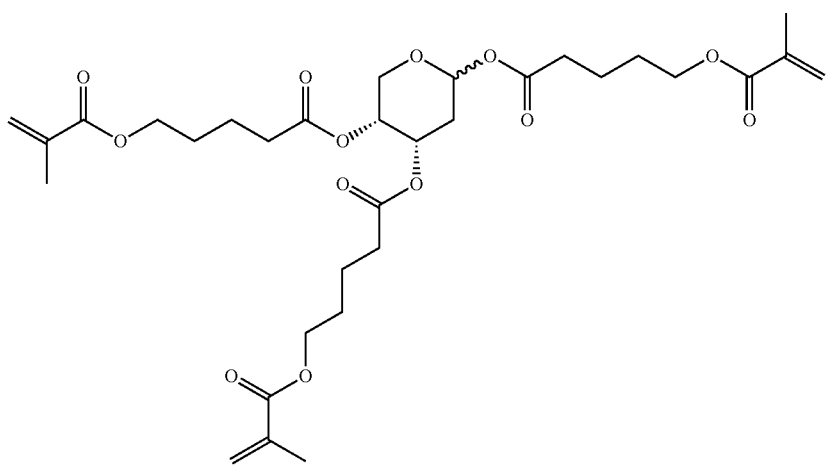 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-75

TABLE E-continued
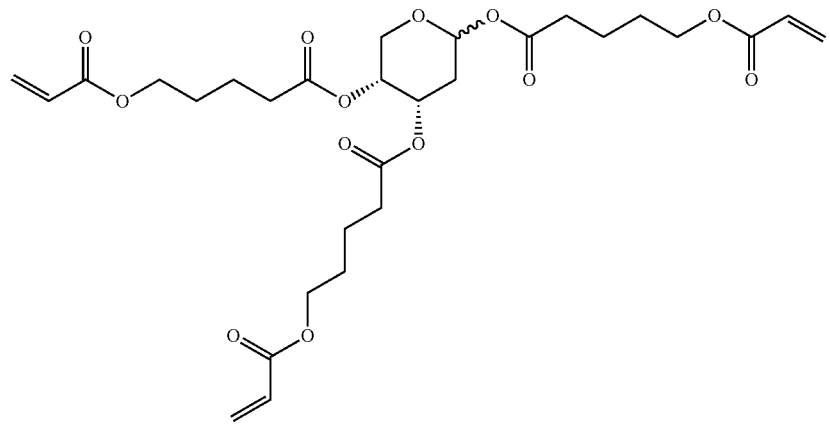 [SMILES: C=CC(=O)OCCCCC(=O)OC1C[C@H](OC(=O)CCCCOC(=O)C=C)[C@H](OC(=O)CCCCOC(=O)C=C)CO1]
RM-76
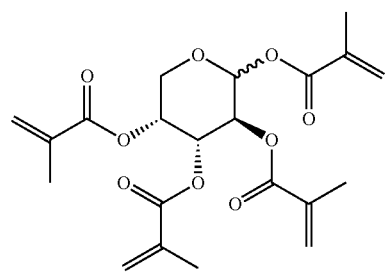 [SMILES: C=C(C)C(=O)OC1OC[C@@H](OC(=O)C(=C)C)[C@@H](OC(=O)C(=C)C)[C@@H]1OC(=O)C(=C)C]
RM-77
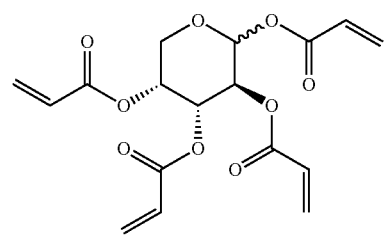 [SMILES: C=CC(=O)OC1OC[C@@H](OC(=O)C=C)[C@@H](OC(=O)C=C)[C@@H]1OC(=O)C=C]
RM-78
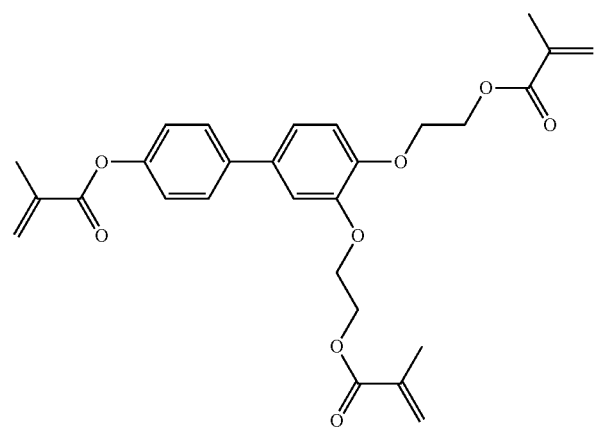 [SMILES: C=C(C)C(=O)OCCOc1ccc(-c2ccc(OC(=O)C(=C)C)cc2)cc1OCCOC(=O)C(=C)C]
RM-79

TABLE E-continued
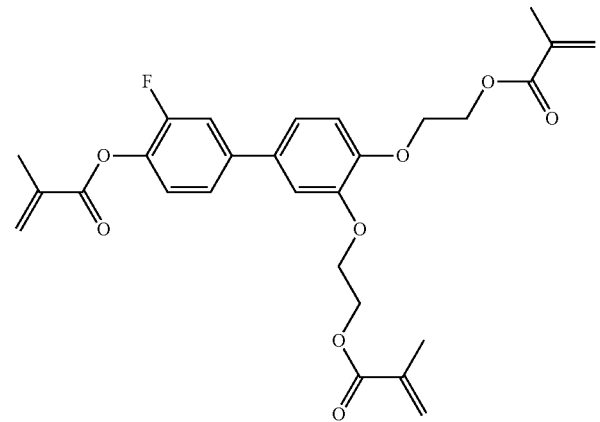 [SMILES: C=C(C)C(=O)OCCOc1ccc(-c2ccc(OC(=O)C(=C)C)c(F)c2)cc1OCCOC(=O)C(=C)C]
RM-80
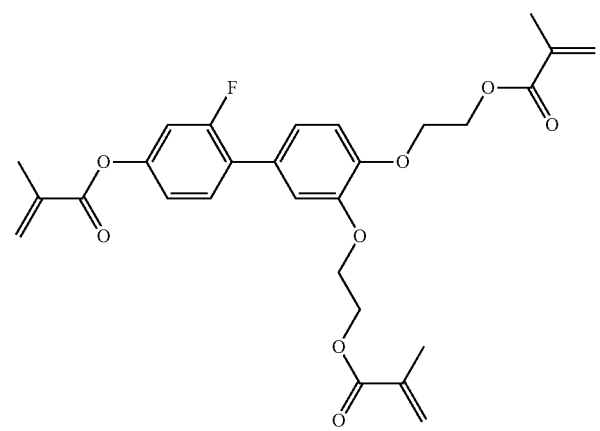
RM-81
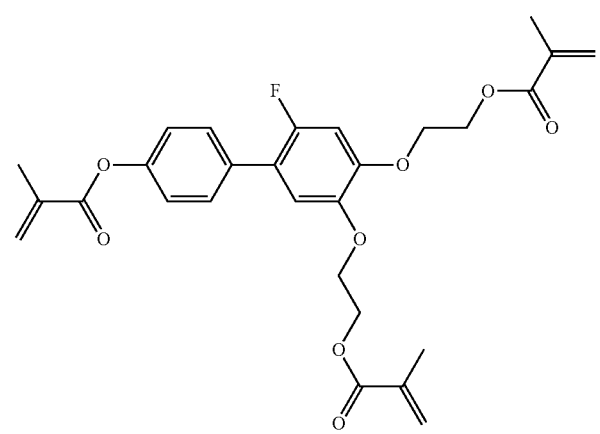 [SMILES: C=C(C)C(=O)OCCOc1cc(F)c(-c2ccc(OC(=O)C(=C)C)cc2)cc1OCCOC(=O)C(=C)C]
RM-82

TABLE E-continued
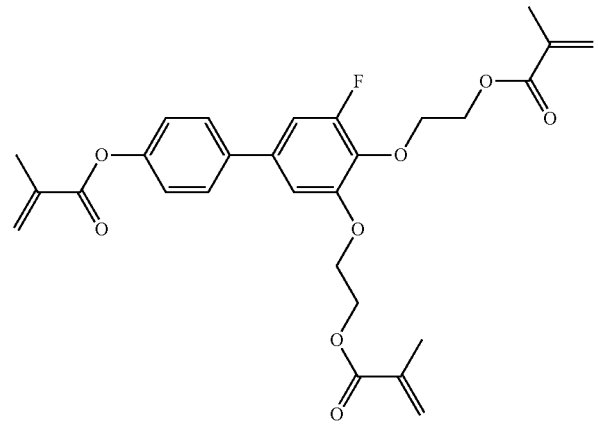 [SMILES: C=C(C)C(=O)OCCOc1cc(-c2ccc(OC(=O)C(=C)C)cc2)cc(F)c1OCCOC(=O)C(=C)C]
RM-83
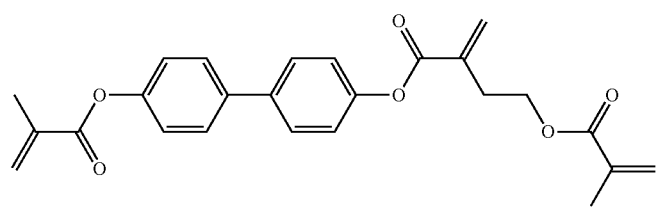
RM-84
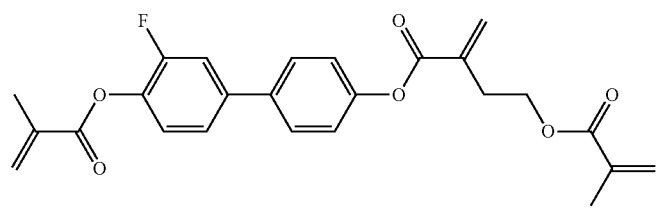
RM-85
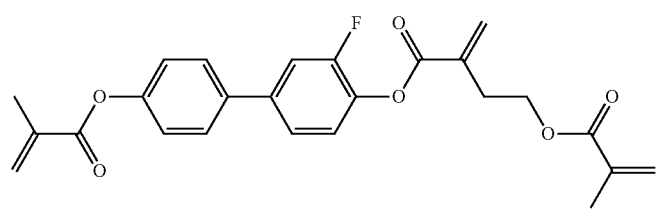 [SMILES: C=C(C)C(=O)OCCC(=C)C(=O)Oc1ccc(-c2ccc(OC(=O)C(=C)C)cc2)cc1]
RM-86
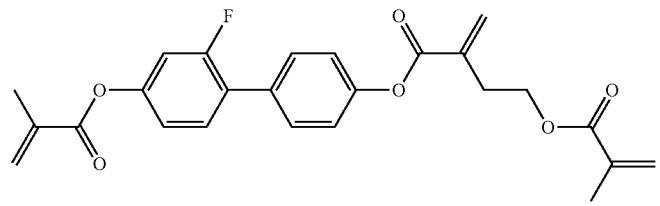 [SMILES: C=C(C)C(=O)OCCC(=C)C(=O)Oc1ccc(-c2ccc(OC(=O)C(=C)C)cc2F)cc1]
RM-87
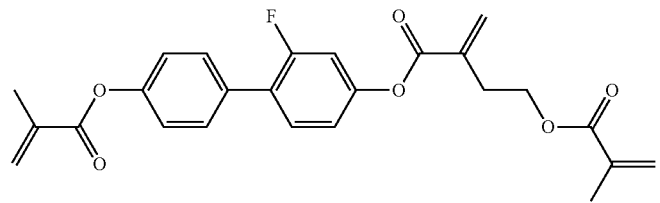 [SMILES: C=C(C)C(=O)OCCC(=C)C(=O)Oc1ccc(-c2ccc(OC(=O)C(=C)C)cc2)c(F)c1]
RM-88

TABLE E-continued
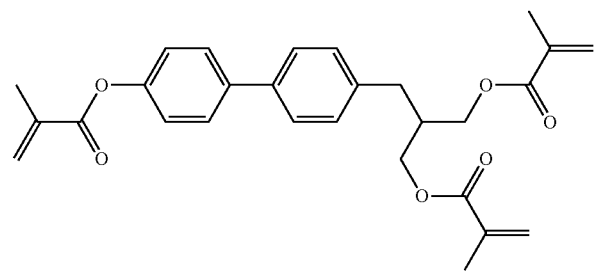 [SMILES: C=C(C)C(=O)OCC(COC(=O)C(=C)C)Cc1ccc(-c2ccc(OC(=O)C(=C)C)cc2)cc1]
RM-89
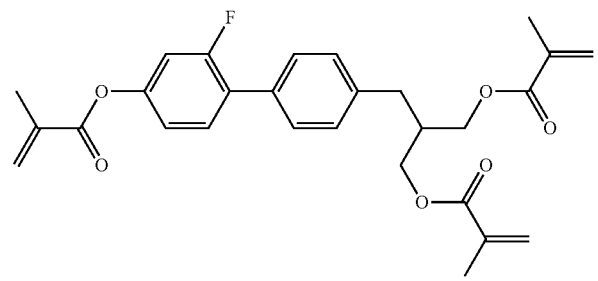 [SMILES: C=C(C)C(=O)OCC(COC(=O)C(=C)C)Cc1ccc(-c2ccc(OC(=O)C(=C)C)cc2F)cc1]
RM-90
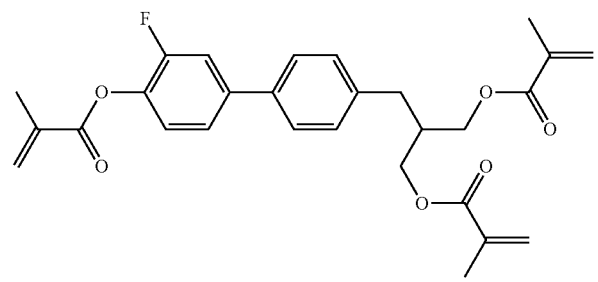 [SMILES: C=C(C)C(=O)OCC(COC(=O)C(=C)C)Cc1ccc(-c2ccc(OC(=O)C(=C)C)c(F)c2)cc1]
RM-91
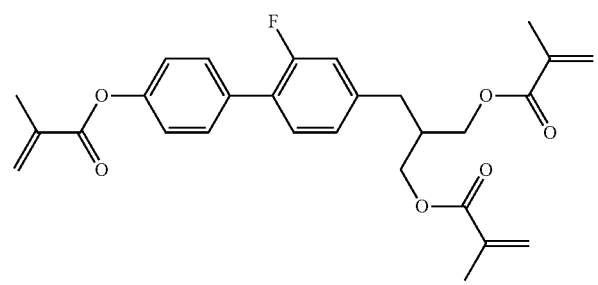 [SMILES: C=C(C)C(=O)OCC(COC(=O)C(=C)C)Cc1ccc(-c2ccc(OC(=O)C(=C)C)cc2)c(F)c1]
RM-92
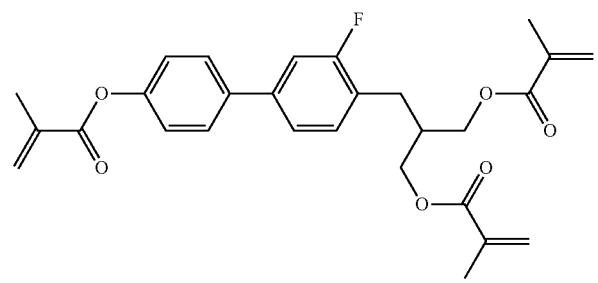 [SMILES: C=C(C)C(=O)OCC(COC(=O)C(=C)C)Cc1ccc(-c2ccc(OC(=O)C(=C)C)cc2)cc1F]
RM-93

TABLE E-continued

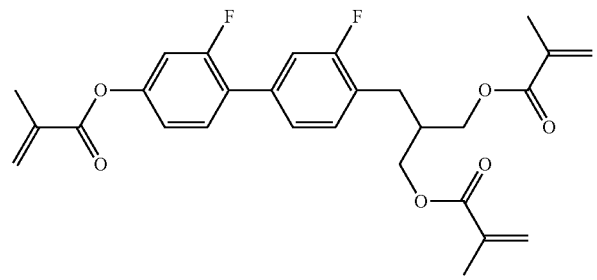 [SMILES: C=C(C)C(=O)OCC(COC(=O)C(=C)C)Cc1ccc(-c2ccc(OC(=O)C(=C)C)cc2F)cc1F]
RM-94

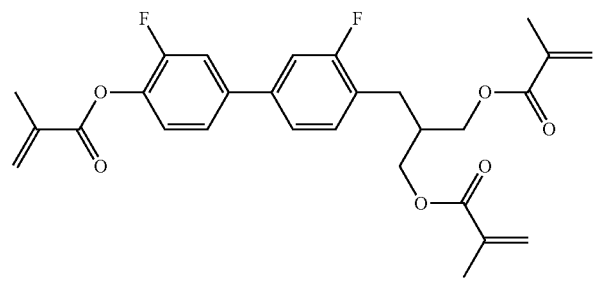 [SMILES: C=C(C)C(=O)OCC(COC(=O)C(=C)C)Cc1ccc(-c2ccc(OC(=O)C(=C)C)c(F)c2)cc1F]
RM-95

Table E shows example compounds which can preferably be used as reactive mesogenic compounds in the liquid-crystalline mixtures according to the invention. If the liquid-crystalline mixtures comprise one or more reactive compounds, they are preferably employed in amounts of 0.01-5% by weight. It may be necessary also to add an initiator or a mixture of two or more initiators for the polymerisation. The initiator or the initiator mixture is preferably added in amounts of 0.001-2% by weight, based on the mixture. A suitable initiator is, for example, Irgacure (BASF) or Irganox (BASF).

In a preferred embodiment, the liquid-crystalline mixtures comprise one or more compounds selected from the group of the compounds from Table E.

EXAMPLES

The following working examples are intended to explain the invention without restricting it.

Above and below, percent data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, $V_o$ denotes threshold voltage, capacitive [V] at 20° C.
$\Delta n$ denotes the optical anisotropy measured at 20° C. and 589 nm
$\Delta \varepsilon$ denotes the dielectric anisotropy at 20° C. and 1 kHz
cl.p. denotes clearing point [° C.]
$K_1$ denotes elastic constant, "splay" deformation at 20° C., [pN]
$K_3$ denotes elastic constant, "bend" deformation at 20° C., [pN]
$\gamma_1$ denotes rotational viscosity measured at 20° C. [mPa·s], determined by the rotation method in a magnetic field
LTS denotes low-temperature stability (nematic phase), determined in test cells.

The following examples are intended to explain the invention without limiting it.

Working Examples

Example 1

A liquid-crystalline mixture of the composition

| CCH-35 | 9.47% |
| CCH-501 | 4.99% |
| CCY-2-1 | 9.47% |
| CCY-3-1 | 10.47% |
| CCY-3-O2 | 10.47% |
| CCY-5-O2 | 9.47% |
| CPY-2-O2 | 11.96% |
| CY-3-O4 | 8.97% |
| CY-5-O4 | 10.97% |
| RM-1 | 0.30% |
| PCH-53 | 13.46% | is purified as follows using the purification device depicted in FIG. 1:

The mixture with a batch size of 350 kg is treated with 10 kg of aluminium oxide (Merck KGaA, pore size 6-15 μm, particle size 60-200 μm) and with 6 kg of zeolites (Merck KGaA, particle size 150-350 μm). For a batch size of 200 g, 4 g of aluminium oxide and 1.5 g of zeolites are used.

The purified LC mixture in accordance with Example 1 is preferably suitable for PS-VA applications.

Example 2

| BCH-32 | 7.48% |
| CCH-23 | 21.93% |
| CCH-34 | 3.49% |
| CCY-3-O3 | 6.98% |
| CCY-4-O2 | 7.98% |
| CPY-2-O2 | 10.97% |
| CPY-3-O2 | 10.97% |
| CY-3-O2 | 15.45% |
| RM-1 | 0.30% |
| PCH-301 | 12.46% |
| PCH-302 | 1.99% |

The LC mixture in accordance with Example 2 is treated analogously to Example 1 with 4.5 kg of aluminium oxide (Merck KGaA, pore size 6-15 µm, particle size 60-200 µm) and with 2.5 kg of silica gel (Merck KGaA, particle size 40-100 µm) with a batch size of 100 kg.

The purified mixture in accordance with Example 2 is preferably suitable for PS-VA applications.

Example 3

| | |
|---|---|
| CC-3-V1 | 7.98% |
| CCH-23 | 17.95% |
| CCH-34 | 3.99% |
| CCH-35 | 6.98% |
| CCP-3-1 | 4.99% |
| CCY-3-O2 | 12.46% |
| CPY-2-O2 | 7.98% |
| CPY-3-O2 | 10.97% |
| CY-3-O2 | 15.45% |
| RM-1 | 0.30% |
| PY-3-O2 | 10.97% |

This mixture is treated analogously to Example 1 with 2.8 kg of aluminium oxide (Merck KGaA, pore size 6-15 µm, particle size 60-200 µm) and with 1.7 kg of zeolites (Merck KGaA, particle size 150-350 µm) with a batch size of 100 kg. For a batch size of 1000 g, 27 g of aluminium oxide and 14 g of zeolites are used.

The LC mixture in accordance with Example 3 is preferably suitable for PS-VA applications.

Example 4

| | |
|---|---|
| CC-3-V1 | 8.97% |
| CCH-23 | 12.96% |
| CCH-34 | 6.23% |
| CCH-35 | 7.73% |
| CCP-3-1 | 3.49% |
| CCY-3-O2 | 12.21% |
| CPY-2-O2 | 6.73% |
| CPY-3-O2 | 11.96% |
| CY-3-O2 | 11.47% |
| RM-1 | 0.30% |
| PP-1-2V1 | 4.24% |
| PY-3-O2 | 13.71% |

This mixture is treated analogously to Example 1 with 1.7 kg of magnesium silicate (Merck KGaA, particle size 150-250 µm) and with 1.1 kg of silica gel (Merck KGaA, particle size 63-100 µm) with a batch size of 85 kg. For a batch size of 500 g, 10 g of aluminium oxide and 4.6 g of silica gel are used.

The LC mixture in accordance with Example 4 is preferably suitable for PS-VA applications.

Example 5

| | |
|---|---|
| CBC-33 | 3.50% |
| CC-3-V | 38.00% |
| CC-3-V1 | 10.00% |
| CCP-V-1 | 3.00% |
| CCP-V2-1 | 9.00% |
| PGP-2-3 | 5.00% |
| PGP-2-4 | 5.00% |
| PGU-2-F | 8.00% |
| PGU-3-F | 9.00% |
| PUQU-3-F | 9.50% |

This mixture is treated analogously to Example 1 with 2.1 kg of silica gel (Merck KGaA, particle size 60-200 µm) and with 0.9 kg of zeolites (Merck KGaA, particle size 150-350 µm) with a batch size of 56 kg. For a batch size of 400 g, 20 g of silica gel and 9 g of zeolites are used.

The LC mixture in accordance with Example 5 is preferably suitable for TN-TFT applications.

Example 6

| | |
|---|---|
| APUQU-3-F | 4.50% |
| CC-3-V | 44.00% |
| CC-3-V1 | 12.00% |
| CCP-V-1 | 11.00% |
| CCP-V2-1 | 9.00% |
| PGP-2-3 | 6.00% |
| PGUQU-3-F | 6.00% |
| PP-1-2V1 | 7.00% |
| PPGU-3-F | 0.50% |

This mixture is treated analogously to Example 1 with 890 g of zeolites (Merck KGaA, particle size 150-350 µm) with a batch size of 29 kg. For a batch size of 300 g, 5.7 g of zeolites are used.

The LC mixture in accordance with Example 6 is preferably suitable for IPS or FFS applications.

Example 7

| | |
|---|---|
| APUQU-3-F | 8.00% |
| CBC-33 | 3.00% |
| CC-3-V | 34.00% |
| CC-3-V1 | 2.50% |
| CCGU-3-F | 4.00% |
| CCP-30CF$_3$ | 4.00% |
| CCP-3F.F.F | 4.50% |
| CCP-50CF$_3$ | 3.00% |
| CCP-V-1 | 10.00% |
| CCQU-3-F | 10.00% |
| CPGU-3-OT | 6.00% |
| PGUQU-3-F | 4.00% |
| PUQU-3-F | 7.00% |

A batch size of 265 kg of this mixture is treated analogously to Example 1 with 10.6 kg of aluminium oxide (Merck KGaA, pore size 6-10 µm, particle size 40-200 µm).

The LC mixture in accordance with Example 7 is preferably suitable for IPS or FFS applications.

Example 8

| | |
|---|---|
| APUQU-2-F | 5.00% |
| APUQU-3-F | 7.50% |
| BCH-3F.F.F | 7.00% |
| CC-3-V | 40.50% |
| CC-3-V1 | 6.00% |
| CCP-V-1 | 9.50% |
| CPGU-3-OT | 5.00% |
| PGP-2-3 | 6.00% |
| PGP-2-4 | 6.00% |

-continued

| | |
|---|---|
| PPGU-3-F | 0.50% |
| PUQU-3-F | 7.00% |

A batch size of 530 kg of this mixture is firstly purified analogously to Example 1 using 10.6 kg of silica gel RP8 (Merck KGaA, pore size 6-30 µm, particle size 10-40 µm). In addition, 4.3 kg of zeolites (Merck) are required for the subsequent treatment.

The LC mixture in accordance with Example 8 is preferably suitable for IPS or FFS applications.

Example 9

| | |
|---|---|
| APUQU-2-F | 8.00% |
| APUQU-3-F | 8.00% |
| BCH-32 | 7.00% |
| CC-3-V | 43.00% |
| CCP-V-1 | 9.00% |
| PGP-2-3 | 7.00% |
| PGP-2-4 | 6.00% |
| PUQU-2-F | 5.00% |
| PUQU-3-F | 7.00% |

This mixture is purified analogously to Example 1 using 15 g of aluminium oxide (Merck KGaA, particle size 40-63 µm) with a batch size of 3 kg. For a batch size of 100 kg, 4.3 kg of aluminium oxide and 1.7 kg of zeolites (Grace, particle size 100-500 µm) are used.

The LC mixture in accordance with Example 9 is preferably suitable for TN-TFT applications.

Example 10

| | |
|---|---|
| BCH-5F.F | 8.00% |
| CBC-33F | 3.00% |
| CC-3-V | 22.00% |
| CCGU-3-F | 6.00% |
| CCP-3F.F.F | 8.00% |
| CCP-5F.F.F | 4.00% |
| CCP-V-1 | 13.00% |
| CCP-V2-1 | 11.00% |
| CCQU-3-F | 5.00% |
| CCQU-5-F | 4.00% |
| PUQU-3-F | 16.00% |

A batch size of 530 kg of this mixture is purified analogously to Example 1 using 10.6 kg of silica gel RP8 (Merck KGaA, pore size 6-30 µm, particle size 10-40 µm). In addition, 4.3 kg of zeolites (Merck KGaA, particle size 150-350 µm) are required for the subsequent treatment.

The LC mixture in accordance with Example 10 is preferably suitable for TN-TFT applications.

Example 11

| | |
|---|---|
| CBC-33F | 3.00% |
| CBC-53F | 3.00% |
| CC-3-V | 17.00% |
| CC-3-V1 | 4.00% |
| CCP-3F.F.F | 8.00% |
| CCPC-33 | 3.00% |
| CCPC-34 | 3.00% |
| CCP-V-1 | 5.00% |
| CCP-V2-1 | 2.00% |
| CCQU-2-F | 1.50% |
| CCQU-3-F | 10.00% |
| CCQU-5-F | 10.00% |
| CGU-3-F | 6.00% |
| PGP-2-3 | 7.50% |
| PP-1-2V1 | 7.00% |
| PUQU-3-F | 10.00% |

A batch size of 3 kg of this mixture is purified analogously to Example 1 using 147 g of silica gel RP4 (Merck KGaA, pore size 6-30 µm, particle size 10-40 µm).

The LC mixture in accordance with Example 11 is preferably suitable for TN-TFT applications.

Example 12

| | |
|---|---|
| APUQU-2-F | 1.00% |
| BCH-3F.F.F | 15.00% |
| CC-3-V | 33.50% |
| CC-3-V1 | 2.00% |
| CCGU-3-F | 1.00% |
| CCPC-33 | 2.00% |
| CCP-V-1 | 4.50% |
| BCH-2F | 5.00% |
| BCH-3F | 5.00% |
| PGP-2-3 | 8.50% |
| PGUQU-3-F | 7.80% |
| PP-1-2V1 | 11.00% |
| PPGU-3-F | 0.20% |
| PUQU-3-F | 3.50% |

A batch size of 143 kg of this mixture is purified analogously to Example 1 using 715 g of magnesium silicate (Merck KGaA, particle size 150-250 µm).

The LC mixture in accordance with Example 12 is preferably suitable for TN-TFT applications.

Example 13

| | |
|---|---|
| APUQU-2-F | 2.00% |
| APUQU-3-F | 6.00% |
| CC-3-V | 42.00% |
| CCP-3-1 | 3.00% |
| CCP-3-3 | 3.00% |
| CCP-3F.F.F | 8.00% |
| CCP-V-1 | 1.50% |
| CCQU-3-F | 7.00% |
| CCQU-5-F | 3.00% |
| CPGU-3-OT | 6.50% |
| PGUQU-3-F | 5.00% |
| PGUQU-4-F | 4.00% |
| PGUQU-5-F | 4.00% |
| PPGU-3-F | 0.50% |
| PUQU-3-F | 4.50% |

This mixture is treated analogously to Example 1 with 212 g of aluminium oxide (Merck KGaA, particle size 63-200 µm) with a batch size of 3 kg. In addition, 100 g of zeolites (Merck KGaA, particle size 150-350 µm) are used.

The LC mixture in accordance with Example 13 is preferably suitable for IPS or FFS applications.

Example 14

| | |
|---|---|
| CC-3-V | 49.50% |
| CCP-3-1 | 1.50% |
| CCP-V-1 | 6.00% |
| CPGU-3-OT | 7.00% |
| PGP-2-3 | 8.50% |
| PGP-2-4 | 5.50% |
| PGUQU-3-F | 7.00% |
| PGUQU-4-F | 4.00% |
| PP-1-2V1 | 2.50% |
| PPGU-3-F | 0.50% |
| PUQU-3-F | 8.00% |

This mixture is treated with 106 g of aluminium oxide (Merck, pore size 6-15 µm, particle size 40-63 µm) and with 40 g of silica gel (Merck KGaA, particle size 63-100 µm) with a batch size of 1.5 kg. For a batch size of 24 kg, 1.6 kg of aluminium oxide and 0.8 kg of silica gel are used.

The LC mixture in accordance with Example 14 is preferably suitable for TN-TFT applications.

Example 15

| | |
|---|---|
| BCH-32 | 6.00% |
| CCH-23 | 18.00% |
| CCH-34 | 8.00% |
| CCP-3-1 | 12.00% |
| CCP-3-3 | 3.00% |
| CCY-3-O2 | 6.00% |
| CPY-2-O2 | 6.00% |
| CPY-3-O2 | 7.00% |
| CY-3-O2 | 14.00% |
| CY-3-O4 | 8.00% |
| CY-5-O2 | 9.00% |
| PYP-2-3 | 3.00% |

A batch size of 16 kg of this mixture is purified analogously to Example 1 using 460 g of silica gel RP8 (Merck KGaA, pore size 6-30 µm, particle size 10-40 µm).

The LC mixture in accordance with Example 15 is preferably suitable for VA applications.

Example 16

| | |
|---|---|
| CC-3-V1 | 7.98% |
| CCH-23 | 17.95% |
| CCH-34 | 3.99% |
| CCH-35 | 6.98% |
| CCP-3-1 | 4.99% |
| CCY-3-O2 | 12.46% |
| CPY-2-O2 | 7.98% |
| CPY-3-O2 | 10.97% |
| CY-3-O2 | 15.45% |
| RM-17 | 0.30% |
| PY-3-O2 | 10.97% |

This mixture is treated analogously to Example 1 with 2.6 kg of aluminium oxide (Merck KGaA, pore size 6-15 µm, particle size 63-200 µm) and with 1 kg of silica gel (Merck KGaA, particle size 63-100 µm) with a batch size of 132 kg. For a batch size of 500 kg, 16 kg of aluminium oxide and 8 kg of silica gel are used.

The LC mixture in accordance with Example 16 is preferably suitable for PS-VA and PS-FFS applications.

Example 17

| | |
|---|---|
| CC-3-V | 29.50% |
| PP-1-3 | 11.00% |
| PY-3-O2 | 12.00% |
| CCP-3-1 | 9.50% |
| CCOY-2-O2 | 18.00% |
| CCOY-3-O2 | 13.00% |
| GPP-5-2 | 7.00% |

This mixture is treated analogously to Example 1 with 53 g of magnesium silicate (Merck KGaA, particle size 150-250 µm) for a batch size of 1 kg.

The LC mixture in accordance with Example 17 is preferably suitable for VA applications.

Example 18

| | |
|---|---|
| PY-V2-O2 | 12.00% |
| CY-V-O2 | 9.00% |
| CCY-3-O1 | 9.00% |
| CCY-V2-O2 | 8.00% |
| CCY-2-O2 | 8.00% |
| CPY-V-O2 | 10.50% |
| CC-3-V | 36.50% |
| BCH-32 | 6.50% |
| PPGU-3-F | 0.50% |

A batch size of 16 kg of this mixture is purified analogously to Example 1 using 460 g of silica gel RP8 (Merck KGaA, pore size 6-30 µm, particle size 10-40 µm).

The LC mixture in accordance with Example 18 is preferably suitable for VA applications.

Mixture Examples 1 to 18 may additionally also comprise one or more stabilisers, preferably one or two, and a dopant from Tables C and D.

The invention claimed is:

1. A purification device (1) comprising a flow chamber (2) having at least one sidewall, a top wall arranged at one end part of the sidewall, and a bottom wall arranged at the opposite end part of the sidewall, wherein the top wall has an inlet opening (3) and the bottom wall has an outlet opening (4), wherein a direction from the inlet opening to the outlet opening define a flow direction, wherein the inlet opening is suitable for introducing a liquid-crystal mixture into the flow chamber (2) and the outlet opening is suitable for discharging said liquid-crystal mixture, having at least one inlet flow distributor (5) which is arranged in the flow chamber (2) adjacent the inlet opening (3), and having at least one outlet filter (6) which is arranged in the flow chamber (2) spaced above the outlet opening (4), wherein a sorbent which functions as a purification agent is arranged in the flow chamber (2) between the inlet flow distributor (5) and the outlet filter (6), wherein said sorbent is at least one of an aluminum oxide, modified silica gel, magnesium silicate, silica gel and zeolite, an annular seal (9) in sealing contact with an inner surface of the top wall, an inner peripheral surface of the sidewall, and an outer peripheral edge of the inlet flow distributor (5) to seal the peripheral edge of the inlet flow distributor (5) to the sidewall and to prevent the liquid crystal mixture from escaping from the flow chamber (2), wherein the purification device contains said liquid-crystal mixture in the flow chamber and wherein the liquid-crystal mixture in the flow chamber contains at least three liquid-crystalline compounds, and wherein said liquid-crystal mixture is in the flow chamber, and contains a compound of formula I,

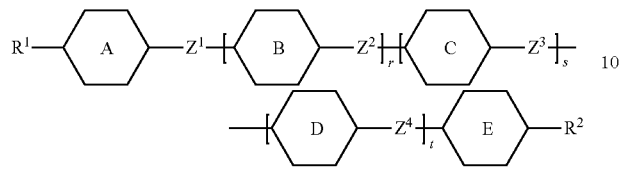

in which
$R^1$ and $R^2$ each, independently of one another, denote H, an alkyl radical having up to 15 C atoms which is unsubstituted, monosubstituted by CN or $CF_3$ or at least monosubstituted by halogen, in which one or more $CH_2$ groups are optionally replaced by —O—, —S—,

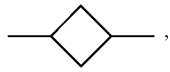

—C≡C—, —CH=CH—, —$CF_2$O—, —O$CF_2$—, —OC—O— or —O—CO— in such a way that O atoms are not linked directly to one another, and one of the radicals $R^1$ and $R^2$ also denotes F, Cl, CN, $SF_5$, NCS, SCN or OCN,
rings A, B, C, D and E each, independently of one another, denote

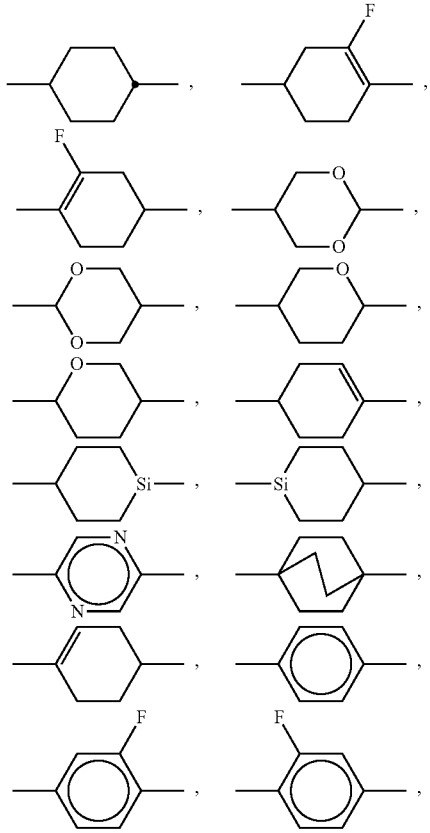

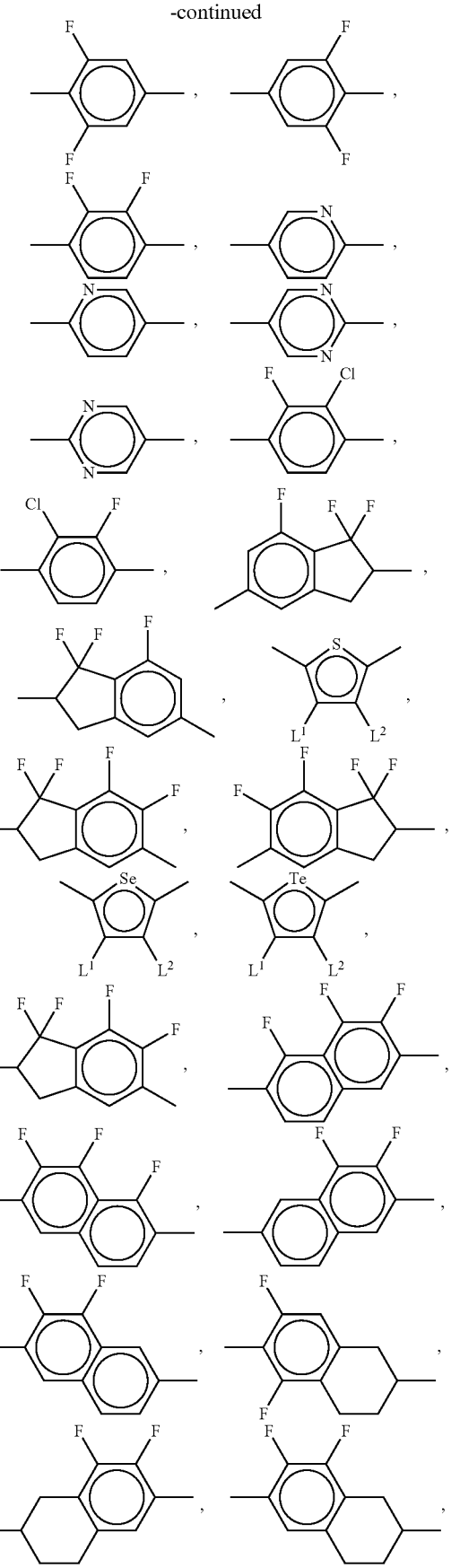

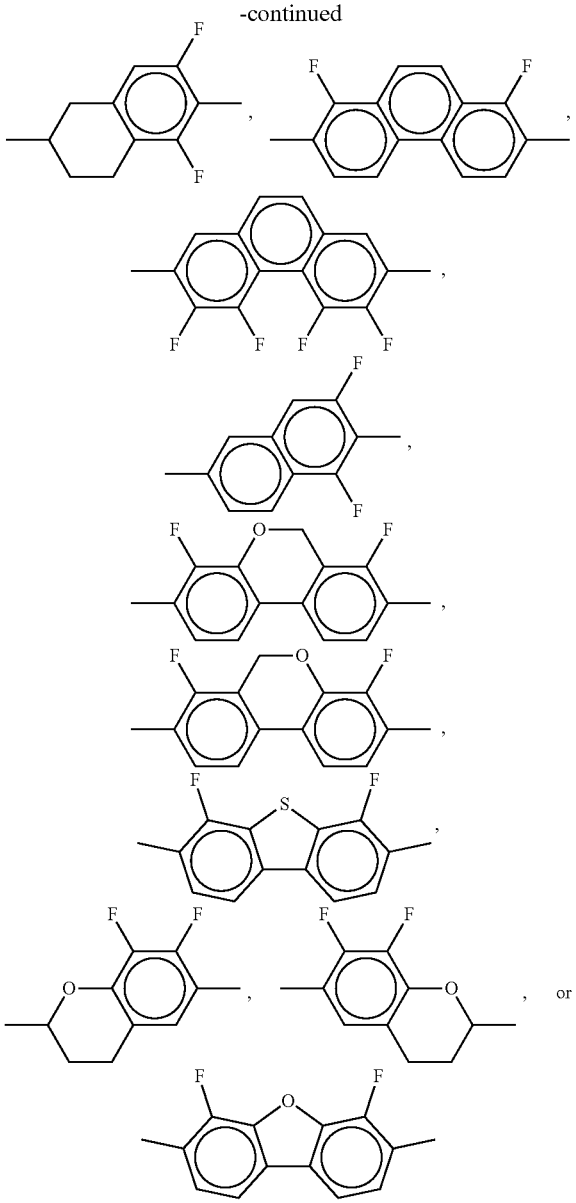

r, s and t each, independently of one another, denote 0, 1, 2 or 3, where r+s+t≤3, $Z^{1-4}$ each, independently of one another, denote —CO—O—, —O—CO—, —CF$_2$O—, —OCF$_2$—, —CH$_2$O—, —OCH$_2$—, —CH$_2$CH—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, and $L^1$ and $L^2$ each, independently of one another, denote H or F.

2. The purification device (1) according to claim 1, wherein the flow chamber (2) or at least a section of said flow chamber has a columnar shape, wherein D in said columnar shape is a diameter.

3. The purification device (1) according to claim 1, having at least inlet one filter (6) arranged in the flow chamber (2) adjacently below and in contact with the inlet flow distributer (5), and having at least one outlet flow distributor (5) arranged in the flow chamber (2) adjacent the outlet opening (4) and adjacently below and in contact with the outlet filter (6).

4. The purification device (1) according to claim 3, wherein a length in the flow chamber (2) measured in the flow direction from the inlet filter (6) to the outlet filter (6), designated as L, is greater than a greatest internal linear dimension of the flow chamber (2) transverse to the flow direction, designated as D.

5. The purification device (1) according to claim 4, wherein L is 2 to 34 times D.

6. The purification device (1) according to claim 1, wherein the sidewall is made from metal, plastic or a metal/plastic composite material.

7. The purification device (1) according to claim 1, wherein the flow chamber (2) has inside surfaces (7), and an adhesion-reducing internal coating is present on said inside surfaces (7).

8. The purification device (1) according to claim 1, wherein the flow chamber (2) has inside surfaces (7), and said inside surfaces (7) have a roughness of less than 1.0 μm.

9. The purification device (1) according to claim 1, wherein heating and/or cooling elements are mounted on the purification device (1).

10. The purification device (1) according to claim 1, wherein the at least one flow distribution element (5) at the inlet opening (3) is carried by the top wall, and wherein the top wall is detachably attached to the sidewall via a clamp connection (8).

11. The purification device (1) according to claim 1, wherein a connector (10) in the form of a hollow cylinder is arranged at said inlet opening 3 and/or said outlet opening 4.

12. The purification device (1) according to claim 1, wherein a connector (10) in the form of a hollow cylinder is arranged at said inlet opening 3 and/or said outlet opening 4, which connector (10) has quick-fit connectors (11) for connection to a container.

13. The purification device (1) according to claim 1, wherein a connector (10) in the form of a hollow cylinder is arranged at said inlet opening 3 and/or said outlet opening 4, which connector is sealed by a cover 12.

14. A method for the purification of a liquid crystal mixture, comprising passing said liquid crystal mixture through the purification device (1) according to claim 1.

* * * * *